United States Patent [19]

Carpenter et al.

[11] Patent Number: 5,544,316
[45] Date of Patent: Aug. 6, 1996

[54] METHOD AND SYSTEM FOR OPTIONALLY REGISTERING A LOCAL PROCESS TO ALLOW PARTICIPATION IN A SINGLE SYSTEM SEMANTIC

[75] Inventors: Eric R. Carpenter, Round Rock; Christopher S. Claussen; James O. Cox, both of Austin, all of Tex.

[73] Assignee: International Business Machines Corporation, Armonk, N.Y.

[21] Appl. No.: 483,783

[22] Filed: Jun. 7, 1995

Related U.S. Application Data

[63] Continuation of Ser. No. 950,331, Sep. 24, 1992, abandoned.
[51] Int. Cl.$^6$ ................................................. G06F 15/163
[52] U.S. Cl. ................... 395/200.03; 395/700; 395/600; 395/650; 364/DIG. 1; 364/DIG. 2
[58] Field of Search ............................ 395/200.03, 700, 395/650, 600

[56] References Cited

U.S. PATENT DOCUMENTS

| | | |
|---|---|---|
| 4,251,858 | 2/1981 | Cambigue et al. . |
| 4,268,905 | 5/1981 | Johann et al. . |
| 4,394,725 | 7/1983 | Bienvenu et al. . |
| 4,413,318 | 11/1983 | Herrington ............................. 395/650 |
| 4,589,068 | 5/1986 | Heinen, Jr. ............................. 364/300 |
| 4,682,330 | 7/1987 | Millham . |
| 4,694,396 | 9/1987 | Weisshaar et al. ..................... 364/300 |
| 4,780,821 | 10/1988 | Crossley . |
| 4,805,107 | 2/1989 | Kieckhafer et al. . |
| 4,825,354 | 4/1989 | Agrawal et al. ....................... 395/650 |
| 4,914,583 | 4/1990 | Weisshaar et al. ..................... 395/650 |
| 4,937,737 | 6/1990 | Schwane et al. . |
| 4,956,772 | 9/1990 | Neches . |
| 5,005,172 | 4/1991 | Kawamoto . |
| 5,025,369 | 6/1991 | Schwartz . |
| 5,032,979 | 7/1991 | Hecht et al. . |
| 5,047,925 | 9/1991 | Kun et al. . |
| 5,062,040 | 10/1991 | Bishop et al. . |
| 5,067,072 | 11/1991 | Talati et al. . |
| 5,072,371 | 12/1991 | Benner et al. . |
| 5,089,954 | 2/1992 | Rago . |
| 5,301,322 | 4/1994 | Hamanaka et al. ..................... 395/650 |
| 5,307,490 | 4/1994 | Davidson et al. ..................... 395/650 |
| 5,325,526 | 6/1994 | Cameron et al. ..................... 395/650 |
| 5,408,602 | 4/1995 | Gideas et al. ......................... 395/157 |
| 5,418,964 | 5/1995 | Conner et al. ........................ 395/700 |

OTHER PUBLICATIONS

Orphan elimination in Distributed object-oriented Systems, Ezzat, 1990 IEEE publication, pp. 403–412.

Distributing A Mobile Robot Simulator Using Remote Procedure Calls by Kulkarni, IEEE 1991 publication, pp. 500–504.

Talking in Unixspeak, by Padovano, IEEE 1990, pp. V23 N8 P21(1).

(List continued on next page.)

Primary Examiner—William M. Treat
Assistant Examiner—Zarni Maung
Attorney, Agent, or Firm—Wayne P. Bailey; Diana L. Roberts

[57] ABSTRACT

A method and system for providing communications services between multiple processes running in multiple computer systems is provided. A single system semantic can be used to access processes, whether such processes reside on a local or remote computer. A mechanism is provided to allow processes to register as part of a distributed context. Registration may be accomplished explicitly by any child process to name its parent in the hierarchy, or automatically by the parent process when spawning children. This mechanism allows the additional flexibility that destination nodes in the distributed environment may be selected at run time without requiring knowledge on the part of the executing process. This allows the ability to cause processes to be distributed based on machine type, facilities available on a specific node or load balancing considerations. This registration mechanism is expandable to allow general purpose server implementations in a distributed environment, thus providing to the user system transparent facilities for control in a distributed environment.

1 Claim, 28 Drawing Sheets

OTHER PUBLICATIONS

Advanced programming in the UNIX Environment by W. Richard Stevens, 1992 publication.

"Architecture Verification Program Automatic Test Case Generation", IBM Technical Disclosure Bulletin, vol. 28, #12, May 1986. pp. 5478–5479.

"Computer System Port Exerciser Tool", IBM Technical Disclosure Bulletin, vol. 25, #2, Jul. 1982, pp. 477–480.

"Multiple Maintenance Library Support System", IBM Technical Disclosure Bulletin, vol. 32, #3B, Aug. 1989, pp. 50–56.

"Synchronization and Alternate Path Control for Multi–User Computer Terminal Test Equipment", IBM TDB, vol. 22, #11, Apr. 1980, pp. 5124–5125.

A. Iwabuchi et al, "Application of Formal Specification Techniques to the Specification of the MHS Test System", Nat'l. Bureau of Standards, Institute for Computer Sciences & Technology, Proceedings of 2nd Internat'l Symposium on Interoperable Information Systems, pp. 255–262.

"Creating, Evolving, and Using Online Large Software System Test Base", IBM TDB, vol. 17, #11, Apr. 1975, pp. 3292–3297.

M. Babb, "New System Integrates Testing", Control Engineering, Apr. 1985, pp. 166–167.

"Software Services Factory", IBM TDB, vol. 19, #2, Jul. 1976, pp. 714–735.

K. F. Donnelly et al, "Pastel and Astra: A Case Study in Test Environment Evolution", ACM Sigsoft, Software Engineering Notes, vol. 13, #1, Jan. 1988, pp. 22–28.

A. Thomasian et al, "Speeding Up Computer System Simulations Using Hierarchical Modeling", ACM Performance Evaluation Review, vol. 12, #4, pp. 34–39.

M. R. Woodward et al, "Experience with Path Analysis and Testing of Programs", IEEE Transaction on Software Engineering, vol. SE–6, #3, May 1980, pp. 278–286.

Root User

Non-root User

Adding Instance of Task sample.t

```
      @  austype   — 206    [task]            Object type
      @  austaskcode — 208  [sample.tc]       Name of task executable
212 ─    FILENAME            file2            The file to be created                * ─ 218
230 ─ *  ausdesc             [Sample task dkfd1>  Object description
         ausbeghook          [ ]              Run code before driver executes       * ─ 218
         auscodedir  — 214   none             Directory where task code resides
         auscompress         [ ]              Type of data to be compressed         # ─ 226
         ausendhook          [ ]              Run code after driver completes       * ─ 218
         ausjournals  — 220  [ 1 ]            List of journals required
         ausloops            all              Total number of iterations            # ─ 226
         aussave  — 216      [ ]              Save task run time information
         austaskparams       [ ]              Parameters to pass task executable
         austime  — 222      5                Total number of hours to execute
         ausverbose — 224                     Journalizing commands verbosity level  *# ─ 226
                                                                              218
```

| Help=F1 | Refresh=F2 | Cancel=F3 | List=F4 |
| F9=Shell | F10=Exit | Enter=Do Add | |

```
b|910311|020145|claussen.austin.ibm.com|shane|||claussen|1||||Beginning the machine with instance (claussen.m.1) iteration (1).    300
b|910311|020148|claussen.austin.ibm.com|shane|||claussen|1|shane|||Beginning the person with instance (shane.p.1) iteration (1).  302
b|910311|020149|claussen.austin.ibm.com|shane|||claussen|1|shane|1|shand|1|Beginning the task with instance (shane.t.1) iteration (1).  304
b|910311|020150|claussen.austin.ibm.com|shane|||claussen|1|shane|1|shane|1|Beginning the task code foo(1).  306
f|910311|020152|claussen.austin.ibm.com|shane|||claussen|1|shane|1|shane|1|1|Finished the task scenario shane.t.1(1) - It failed.  308
b|910311|020157|claussen.austin.ibm.com|shane|||claussen|1|shane|1|shane2|1|Beginning the task with instance (shane2.t.1) iteration (1).  310
b|910311|020210|claussen.austin.ibm.com|shane|||claussen|1|shane|1|shane2|1|Beginning the task code foo(1).
f|910311|020212|claussen.austin.ibm.com|shane|||claussen|1|shane|1|shane2|1|1|Finished the task scenario shane2.t.1(1) - It failed.  312
f|910311|020215|claussen.austin.ibm.com|shane|||claussen|1|shane|1||2|Finished the person scenario shane.p.1(1) - It failed.
f|910311|020219|claussen.austin.ibm.com|shane|||claussen|1||||1|Finished the machine scenario claussen.m.1(1) - It failed.  314
```

FIG. 24

```
l|910319|083314|thelake.austin.ibm.com|eric|||||||shane.t.1|1|-------TASK_CODE_BEGINNING-------
l|910319|083314|thelake.austin.ibm.com|eric|||||||shane.t.1|1|Log message
w|910319|083314|thelake.austin.ibm.com|eric|||||||shane.t.1|1|Warning message
e|910319|083314|thelake.austin.ibm.com|eric|||||||shane.t.1|1|Error message
s|910319|083314|thelake.austin.ibm.com|eric|||||||shane.t.1|1|Severe message
l|910319|083314|thelake.austin.ibm.com|eric|||||||shane.t.1|1|-------TASK_CODE_FINISHED-------
```

```
b|910319|163623|thelake.austin.ibm.com|eric|||||pers.p.1|||1|Beginning the person with instance (pers.p.1) iteration (1).
b|910319|163625|thelake.austin.ibm.com|eric|||pers.p.1|1|try1.t.2|1|1|Beginning the task with instance (try1.t.2) iteration (1).
b|910319|163626|thelake.austin.ibm.com|eric|||pers.p.1|1|try2.t.1|1|1|Beginning the task with instance (try2.t.1) iteration (1).
b|910319|163629|thelake.austin.ibm.com|eric|||pers.p.1|1|try1.t.2|1|1|Beginning the task code try1.sh(1).
b|910319|163630|thelake.austin.ibm.com|eric|||pers.p.1|1|try2.t.1|1|1|Beginning the task code try2.sh(1).
f|910319|163634|thelake.austin.ibm.com|eric|||pers.p.1|1|try1.t.2|1|0|Finished the task scenario try1.t.2(1) - It passed.
f|910319|163634|thelake.austin.ibm.com|eric|||pers.p.1|1|try2.t.1|1|1|Finished the task scenario try2.t.1(1) - It failed.
b|910319|163636|thelake.austin.ibm.com|eric|||pers.p.1|1|try2.t.1|2|Beginning the task with instance (try2.t.1) iteration (2).
b|910319|163638|thelake.austin.ibm.com|eric|||pers.p.1|1|try2.t.1|2|Beginning the task code try2.sh(2).
f|910319|163638|thelake.austin.ibm.com|eric|||pers.p.1|1|try2.t.1|2|0|Finished the task scenario try2.t.1(2) - It passed.
b|910319|163640|thelake.austin.ibm.com|eric|||pers.p.1|1|try2.t.1|3|Beginning the task with instance (try2.t.1) iteration (3).
b|910319|163643|thelake.austin.ibm.com|eric|||pers.p.1|1|try2.t.1|3|Beginning the task code try2.sh(3).
f|910319|163643|thelake.austin.ibm.com|eric|||pers.p.1|1|try2.t.1|3|0|Finished the task scenario try2.t.1(3) - It passed.
f|910319|163643|thelake.austin.ibm.com|eric|||pers.p.1|||1|Finished the person scenario pers.p.1(1) - It failed.
```

FIG. 25

Pk command flow

Unpk command flow

Process Registration

Client Process Table for Server on System 1[1] (S1) — 460

| Status | Handle | Phand | Rhand | PID | PPID | host | phost | Env | Msg | Time |
|---|---|---|---|---|---|---|---|---|---|---|
| 1 | 0 | 0 | 0 | 23 | 0 | S1 | S1 | 0 | 0 | N/A |
| 1 | 1 | 0 | 0 | 101 | 23 | S1 | S1 | 0 | 0 | N/A |
| 1 | 2 | 1 | 0 | 102 | 101 | S1 | S1 | 0 | 0 | N/A |
| 1 | 3 | 2 | 0 | 104 | 102 | S1 | S1 | 0 | 0 | N/A |
| 1 | 4 | 0 | 3 | 105 | 23 | S1 | S2 | 0 | 0 | N/A |

462, 464, 466, 468, 470

Client Process Table for Server on System 2 (S2) — 480

| Status | Handle | Phand | Rhand | PID | PPID | host | phost | Env | Msg | Time |
|---|---|---|---|---|---|---|---|---|---|---|
| 1 | 0 | 0 | 0 | 99 | 0 | S2 | S2 | 0 | 0 | N/A |
| 1 | 1 | 0 | 0 | 201 | 23 | S2 | S2 | 0 | 0 | N/A |
| 1 | 2 | 1 | 0 | 202 | 201 | S2 | S2 | 0 | 0 | N/A |
| 1 | 3 | 2 | 4 | 105 | 202 | S1 | S2 | 0 | 0 | N/A |

472, 474, 476, 478

Status = Current Process Status
Handle = Current process handle
Phand = Parent process handle
Rhand = Remote process handle
PID = Process ID
PPID = Parent's process ID host = System running the process
phost = System where the parent is running
Env = Pointer to environment
Msg = Pointer to message queue
Time = timestamp

FIG. 32

1. Status = Current Process Status

METHOD AND SYSTEM FOR OPTIONALLY REGISTERING A LOCAL PROCESS TO ALLOW PARTICIPATION IN A SINGLE SYSTEM SEMANTIC

This is a continuation of application Ser. No. 07/950,331 filed Sep. 24, 1992, now abandoned.

TECHNICAL FIELD

This invention relates to data processing systems, and more particularly to multi-process communication in a multi-computer data processing system.

BACKGROUND OF THE INVENTION

Testing of computers and networks is becoming increasingly important in today's environment. Users of these systems demand high reliability standards. Data integrity can also be compromised when system failures occur. The testing of a single computer, although complex in itself, is generally known to exist. Various types of power-on, or boot code, will test the computer when the system is first activated.

Diagnostic programs can also be run on a computer or network when a system malfunction has occurred, or is suspected. These diagnostic programs are very specific to the hardware being tested, and information for invoking and/or operating the test procedures are generally hardcoded within the diagnostic program itself. This inability to customize a given diagnostic program for other than its original intended use has greatly limited its usability in a multi-computer network, having multi-computer interconnected to either singularly, or in combination with one another, perform a given task.

It is also known in the art that script files can be written to control application programs. Scripts are quasi-programs within a Unix, or compatible, operating system that define a set of procedures to be performed. These procedures can invoke application programs, receive I/O from a computer user, and make logical decisions based upon parameters. However, these script programs suffer many of the same deficiencies of a regular application program, such as lack of flexibility. Adding an additional step or process requires modifications be made to the program itself, which can not only be complicated, but due to the state of programming, can cause unexpected results in other areas of the program.

To provide interprocess communication support in a multi-computer network, some techniques use the concept of creating process context based on process name. If this context is achieved through a process of inheritance based on process name, then the process context becomes rigid based on the order of process start. There is no concept of a global variable or of extending full process semantics into a distributed environment.

There is a need to provide a flexible, highly modularized, testing mechanism which can support a hierarchical, networked computer environment. There is also a need to provide the ability to simulate real-life operations in such an environment, to aid in detecting architectural, performance, or inter-operability problems.

SUMMARY OF THE INVENTION

It is thus an object of the present invention to provide a hierarchical test framework for a data processing system.

It is a further object of the present invention to provide a modularized test environment.

It is still a further object of the present invention to provide a modularized test environment in a multi-computer data processing system.

It is yet another object of the present invention to provide a common user interface for testing multiple computers in a data processing system.

It is still a further object of the present invention to provide an inter-host communication mechanism in a multi-processing environment.

Disclosed is a method and system for providing a complex testing framework/scaffold. Also included are testing tools that automate and simplify the testing process. The disclosed design handles networking and task concurrency. The testing scaffold is aimed at being a flexible test case driver that can be used to execute functional verification tests on a single host or large networked system level integration tests involving dozens of hosts. The testing scaffold designed to meet the requirements of large scale testing environments. The ability to execute these environments by default allows manipulation of smaller scale environments.

In this context, a complicated testing environment is defined as an environment that executes literally thousands of tests on dozens of hosts for extended periods of time. These types of tests are usually targeted at finding system level integration problems and often fall near the end of the software testing cycle. Looping control, archival and compression options, support for distributed file systems and support for multiple concurrent executions of the same test case on the same machine are only a few of the scaffold functions that support complicated testing environments.

Another strength of the testing scaffold is its ability to closely emulate a real world organization, and yet remain completely automated. Some primary areas of functionality that are included are distributed execution management, scaffolding for customer simulation, collision avoidance within the same name space, automated status collection mechanism, test case independence, common tester interface for multiple types of testing.

The disclosed method and system further provides multiple scenario driver levels that allow the simulations of machines in tightly clustered networked environments, multiple people on the same machine executing concurrently, and the simulation of the actual tasks people are executing. For instance, the ability to be able to execute a single command that begins a forty hour test scenario that actually simulates a large company's work week with users logging in and out of multiple machines, executing tasks, sharing files in a distributed file space, and then having a report produced automatically at the end of the test scenario indicating its precise status is provided herein. The testing scaffold has been designed to automate this type of process.

In order to gain the full functionality of the test scaffold, there must exist a medium for communication between multiple hosts. Without a communication medium, only the machine scenarios and below will be able to run. A mechanism of creating logical process hierarchies within a distributed environment is provided. Extensions beyond the logical process hierarchy are similarly provided.

In this invention, we allow an arbitrary definition of context, such that processes need not be related within the operating system process space by name or any other attribute. Rather, a single system semantic can be used to access processes, whether such processes reside on a local or remote computer. A mechanism is provided to allow processes to register as part of a distributed context. Registration may be accomplished explicitly by any child process to name it's parent in the hierarchy, or automatically by the parent process when spawning children. This mechanism allows the additional flexibility that destination nodes in the distributed environment may be selected at run time without requiring knowledge on the part of the executing process. This allows the ability to cause processes to be distributed based on machine type, facilities available on a specific node or load balancing considerations.

Using this methodology, where processes which choose to participate in this logical hierarchy must register, allows the flexibility that processes may register in several ways. For instance:

A process may register to be a controlled process. That is, a process may elect to run with identical semantics as a normal process. In this mode, the process will have a distributed environment. It may receive normal signals from other processes in the logical process tree, and may cause the expected result on it's logical parent in case of process exit.

A process may register as an interested party to a process or processes that are currently part of a logical process tree. In this mode, using the same communication mechanisms, the process can place itself on a notify only list for a particular event. Also in this mode, the logical parent will not be notified of death of child or other exit events. The process may, however, share in the other logical process groups attributes, such as distributed environment space and message services.

This registration mechanism is expandable to allow general purpose server implementations in a distributed environment, thus providing to the user system transparent facilities for control in a distributed environment.

BRIEF DESCRIPTION OF THE DRAWING

FIG. 14 shows a sample dialogue panel used by the scenario build tool to add an instance.

FIG. 23 shows a sample scenario journal file.

FIG. 24 shows a sample task journal file.

FIG. 25 shows a scenario journal file file used to generate the report shown in Table 32.

FIG. 32 shows client process tables for the two system's internal states as depicted in FIG. 31.

DETAILED DESCRIPTION OF PREFERRED EMBODIMENT

Figure 1:
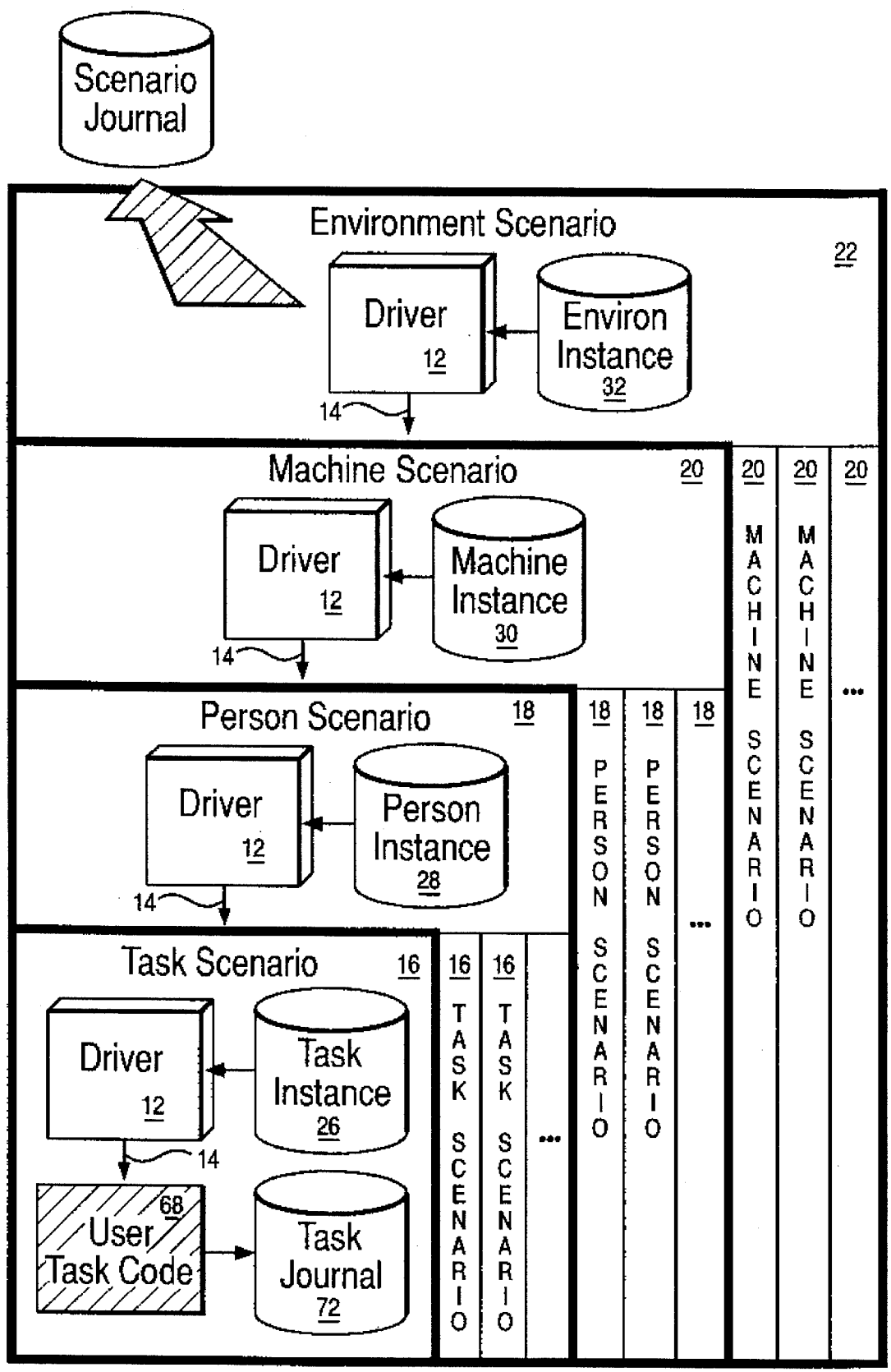
FIG. 1 shows the hierarchical test environment framework.
Figure 2:
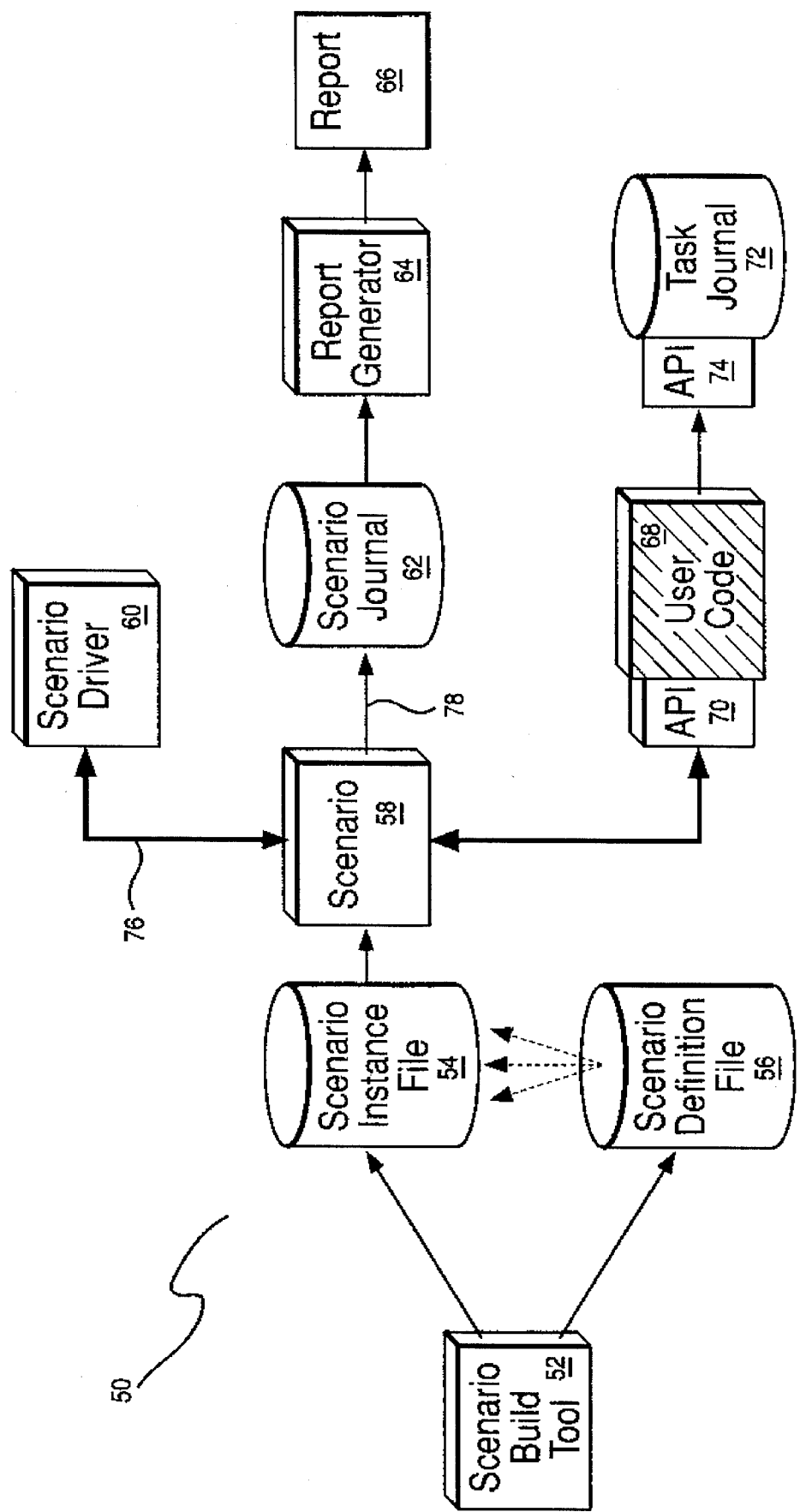
FIG. 2 shows the architectural model for the test environment.

The testing framework of FIG. 1 encompasses the implementation of a complete testing scaffold, which will include scenario drivers 12 for multiple test scenario levels 16, 18, 20 and 22. Also included, as shown in FIG. 2, a scenario build tool52 , a report filter 64, interface definitions for test scenario development that include standard journal programming interfaces 70 and 74, and a complete directory structure. The scope of what the scaffold can control varies from very small test scenarios consisting of a single test program to very large and complex test scenarios that encompass dozens of hosts and thousands of test programs. A scenario driver with four different hierarchical levels is provided for this purpose.

It is important to realize that this invention is aimed at providing a testing environment. No actual test programs are provided. The scaffold has a well defined interface that requires a minimum amount of structure to which test programs may be written. The scaffold places no restrictions on the size and/or complexity of individual test programs. A test program that executes under the scaffold could execute an operating system command and validate its return code or it could begin an environment scenario consisting of a dozen machines.

Architectural Overview

The architecture can best be described in the following three ways:

Terminology
Models
System Requirements

The terminology section provides a glossary of terms used throughout this document. There are two architectural models that describe the components in the models section, and the system requirements section details the requirements imposed by the current architecture.

Terminology

Applications Programming Interface (API)

An applications programming interface is the set of functions or interfaces to an application.

Begin Hook

A begin hook is user code that is executed by the scenario driver prior to executing the test scenario(s) underneath it. It is meant to aid in test scenario customization during the scenario execution stage.

Distributed File Space

A distributed file space is a directory structure that is shared by multiple hosts. Network File System (NFS)[1] the most common UNIX implementation of this concept.

[1] NFS is a trademark of Sun Microsystems, Inc.

End Hook

An end hook is user code that is executed by the scenario driver after executing the test scenario(s) underneath it. It is meant to aid in test scenario customization during the scenario execution stage.

Environment Scenario

An environment scenario is a test scenario level used to group related machine, person, and task scenarios together in a networked environment.

Environment Scenario Driver

An environment scenario driver is an automated program that controls the execution of an environment scenario.

Machine Scenario

A machine scenario is a test scenario level used to group related person and task scenarios together on a single host.

Machine Scenario Driver

A machine scenario driver is an automated program that controls the execution of a machine scenario.

Person Scenario

A person scenario is a test scenario level used to group related task scenarios together to simulate a customer.

Person Scenario Driver

A person scenario driver is an automated program that controls the execution of a person scenario.

Report Filter

A report filter is the generic name given to a program that reads the scenario journal and/or task journal and produces legible reports.

Scenario Build Tool

The scenario build tool is a menu driven program that enables the management of scenario definition files and scenario instance files.

Scenario Definition File

A scenario definition file contains both user defined attributes and scenario driver attributes that define a testing scenario. A definition file contains actual template values for scenario driver attributes and template data about user defined attributes that denote each user defined attribute's type, restrictions, default value, and description. A definition file forms a template for the creation of a scenario instance file.

Scenario Development Stage

The scenario development stage is the stage in which all the user task code and scenario configuration information is developed and debugged.

Scenario Driver

A scenario driver is the generic term given to a program that drives or controls the execution of other lower level scenario drivers or user task code.

Scenario Driver Attributes

Scenario driver attributes are the primary scenario driver configuration method. They are used to define and/or alter the function of the scenario driver.

Scenario Execution Stage

The scenario execution stage is the stage in which test scenarios are executed.

Scenario Instance File

A scenario instance file contains both scenario driver attributes and user defined attributes that define a testing scenario. A scenario instance file contains actual values for both the scenario driver attributes and the user defined attributes.

Scenario Journal

The scenario journal is a standard journal that contains high level data with respect to the scenario execution.

Task Help File

A task help file contains data documenting a task.

Task Journal

The task journal is a standard journal utilized by user task code. There is single task journal for every instance of a task that executes in a test scenario.

Task Scenario

A task scenario is the test scenario level that is comprised of user code. It can be thought of as the equivalent of a testcase.

Task Scenario Driver

A task scenario driver is an automated program that controls the execution of a task scenario.

Task Setup Code

Task setup code is user code used to compile test source code during the scenario execution stage.

Test Scenario

A test scenario is a generic name given to a selected grouping of tests.

User Defined Attributes

User defined attributes are variables used to convey data to user task code.

User Task Code

User task code is the code written by the task scenario developer for testing purposes and is synonymous with what is typically referred to as a test case.

Models

The following two models are used to describe the overall architectural level interactions of the major components of this invention. The first model describes the interactions of each of the scenario drivers, the objects the scenario drivers execute, and the scenario drivers relationship with test scenarios. The second model describes the interactions of the components that constitute this invention.

Scenario Driver Interaction Architectural Model

As depicted in FIG. 1, the scenario driver interaction architectural model 10 describes the interactions of each of the scenario drivers 12, the objects the scenario drivers execute at 14, and the scenario drivers relationship with test scenarios. The rectangles 16, 18, 20 and 22 outlining the components of the model represent test scenarios, the disk icons represent data storage locations 72, 26, 28, 30 and 32, the square blocks 12 represent programs and the shaded square block 68 represents code developed by a scenario developer.

This model shows the relationship between a test scenario 16, 18, 20 and 22, and the corresponding scenario driver 12. Every defined test scenario has a single scenario driver 12 that controls its execution and a single scenario instance file (e.g. 26, 28, 30 and 32) that provides the configuration information needed to define that specific test scenario.

The scenario driver interaction architectural model 10 shows that although the scenario driver component 12 is the same at each of the test scenario levels from the environment scenario level 22 through the task scenario level 16, the scenario instance file differs. In the preferred embodiment, there is a single scenario instance file associated with each scenario driver and although there is one scenario driver component, its actions vary greatly depending on the contents of the scenario instance file.

Scenario drivers that control other scenario drivers can control one or more of those drivers concurrently as the model shows. This allows a hierarchical test suite where test scenarios can be defined that consist of other test scenarios. The task scenario driver that executes the user task code controls only one piece of user task code, therefore, there is a single task scenario driver for each individual component of user task code that will be executed in the test scenario.

One of the most important items to realize from the model is that the scenario driver 12 does much more than control the execution of a single piece of user code. In addition to that function, it also has the capability of controlling an entire set of hosts in a networked environment.

The scenario driver also has the capability to emulate multiple people executing on a single host since multiple person scenario drivers can be executed by the machine scenario driver. Each of these person drivers then has the ability to execute a set of task scenario drivers which then actually execute the scenario developer's test code. This hierarchical model allows unparalleled flexibility and real person emulation in a cohesive networked environment, all centrally controlled and automated from the single environment scenario driver.

Component Interaction Architectural Model

FIG. 2 depicts the component interaction architectural model 50, and details the interactions of all of the major architectural components of this invention. The disk icons 54, 56 and 62 represent data storage locations and the square blocks 52, 58, 60, and 64 represent programs. The shaded program block 68 represents user code that is developed by a scenario developer.

This model shows that the primary interaction with scenario definition files 56 and scenario instance files 54 is accomplished through the scenario build tool 52. The scenario build tool 52 is used to manage the scenario definition and instances and can be accessed by scenario developers.

The scenario definition files 56 define configuration information for scenarios and are used as templates for creating the scenario instance files 54. The scenario instance files are scenario driver input that supply the scenario driver configuration information during the scenario execution stage.

The scenario driver 58 reads the instance data as its input, and either executes another set of scenario drivers 60 and/or user code 68. There is an interface between each of the scenario driver levels (shown in FIG. 1 at 14), as well as the scenario driver and the user code (FIG. 2, at 70). These interfaces vary depending on the scenario driver and executable object combination.

The scenario drivers that are executed by the scenario driver are depicted as a single program at the top edge of the model. However, the scenario driver can execute multiple scenario drivers concurrently. Each of these scenario drivers would then fit into the center piece of the model where the main scenario driver program is located and have the same set of possible interactions as the scenario driver that executed them.

Journalizing from any scenario driver is done to a scenario journal via a scenario journal driver programming interface 78. In the preferred embodiment, all scenario drivers on a machine executing in the same scenario journalize to the same scenario journal 62.

Each of the user code components of the testing scaffold have been grouped into the single user code program box 68 in the model. User code journalizes to the task journal 72, with the exception of begin and end hook user code which journalizes to the scenario journal 62. Each instance of user task code executing in the same scenario journalizes to its own unique task journal.

The format of the scenario journals 62 and task journals 72 is consistent, enabling a report filter 64 to read the journals and produce legible reports 66.

System Requirements

The following is a set of architectural requirements imposed by the above described architecture and design.

Hierarchical File System

The operating system's file system must incorporate the ability to have directories within directories and files within those directories at any given point. A standard Unix operating system provides this function.

Child Processes

The operating system must be able to have a running process be able to create multiple child processes that can execute concurrently. The parent process must also have some control over the child processes. A standard Unix operating system provides this function.

Inter-Host Communication

The inter-host communication executes at the user run level on a particular system. This allows the implementation of the described facilities without the necessity of changing the underlying operating system and gives the additional benefit of being an "open systems" solution since it only relies on basic system services for it's communication channels. The communication mechanism is thus completely independent of communication protocols. Since it is a message passing service, the actual protocol used for message passing is independent from the actual process of passing messages. The API for passing a message is send_packet(). The details of how the packet is delivered is up to the implementer of send-packet for a given machine/operating system implementation. On example is shown by using sockets to effectuate the communication mechanism. Additional flexibility provided by this characteristic is that multiple protocols may be used in the message system to allow the system to dynamically select the best performance communication in a given situation. For example, we may want to use sockets to communicate across system boundaries and use shared memory or message queues for in the box communication. The architecture allows the same call to send_packet to perform both tasks transparent to the calling process.

Since theological process space can be dynamically rearranged, with the ability to arbitrarily insert processes into the logical process space, a new dimension in distributed process control opens up. With this level of control, we can now perform several functions not currently possible.

Central control over normally unrelated processes is now possible, as well as maintaining a complete view of the logical process family from the top node.

Communication to parent (recurslye)
Communication with immediate logical process family
Communication to peers in current family
Arbitrary communication to any member in the logical process tree.

Start processes and dynamically assign a context
Runtime manipulation of the logical hierarchy
Handle processes from a failed processor
Server failures
Changing notification path
Changing environment data dynamically on a global basis
Process notification
Load balancing An additional element in the logical family representation is the extended PID. On a single multi-processing system, various mechanisms are employed to insure that each process runs with a unique process ID. These mechanisms do not continue to function when more than one operating system instance is present in the environment. In the case of the distributed logical process tree, a combination of machine name with the machine unique process ID is used to identify a process in this context. Given the guarantee of a unique process ID on any single operating system instance and a methodology of unique machine IDs, we can guarantee a unique ID for a process in a distributed environment.

Given the structure of the logical process hierarchy, we have available additional functionality that is not normally available. With the flexibility in this system, we can have recovery scenarios that allow us to dynamically reassign processes to new parents in the case of controlled processes. This allows similar semantics to existing multiprocessing systems, which cause inheritance of a process if the parent of the process dies. Except in this case, the recovery scenarios may be specified ahead of time to allow backup and redundant processes to inherit the children of dead parents. This allows the logical process hierarchy to persist across server or controlling process failures in a predictable and controlled manner.

Additional benefits of the above described communication architecture include the ability to (i) use the registration process for purposes other than to participate in a logical family hierarchy, and (ii) dynamic reassignment of processes in the event of a node failure.

The following describes the mechanism used to implement the control process chosen for message passing and interprocess communication used by the distributed test environment driver.

The goal of the test driver is to allow any available tests to be driven, tracked and controlled on many systems with a point of control for the overall environment simulation that can be on a single system. To do this, it is necessary to establish a communication mechanism to allow the drivers in the environment to communicate in much the same way that you would except from driving a test environment on a single machine.

In order to simplify the implementation of the driver itself, this communication mechanism is implemented as a library of functions available to the test drivers with a control daemon on each machine to provide the distributed ipc. By using this implementation technique, we have isolated the communication functions into the library and the control functions into the control daemon so the driver will not have to be aware of the network type or protocol type used to pass messages within the distributed environment.

Control Daemon Overview

Figure 28:
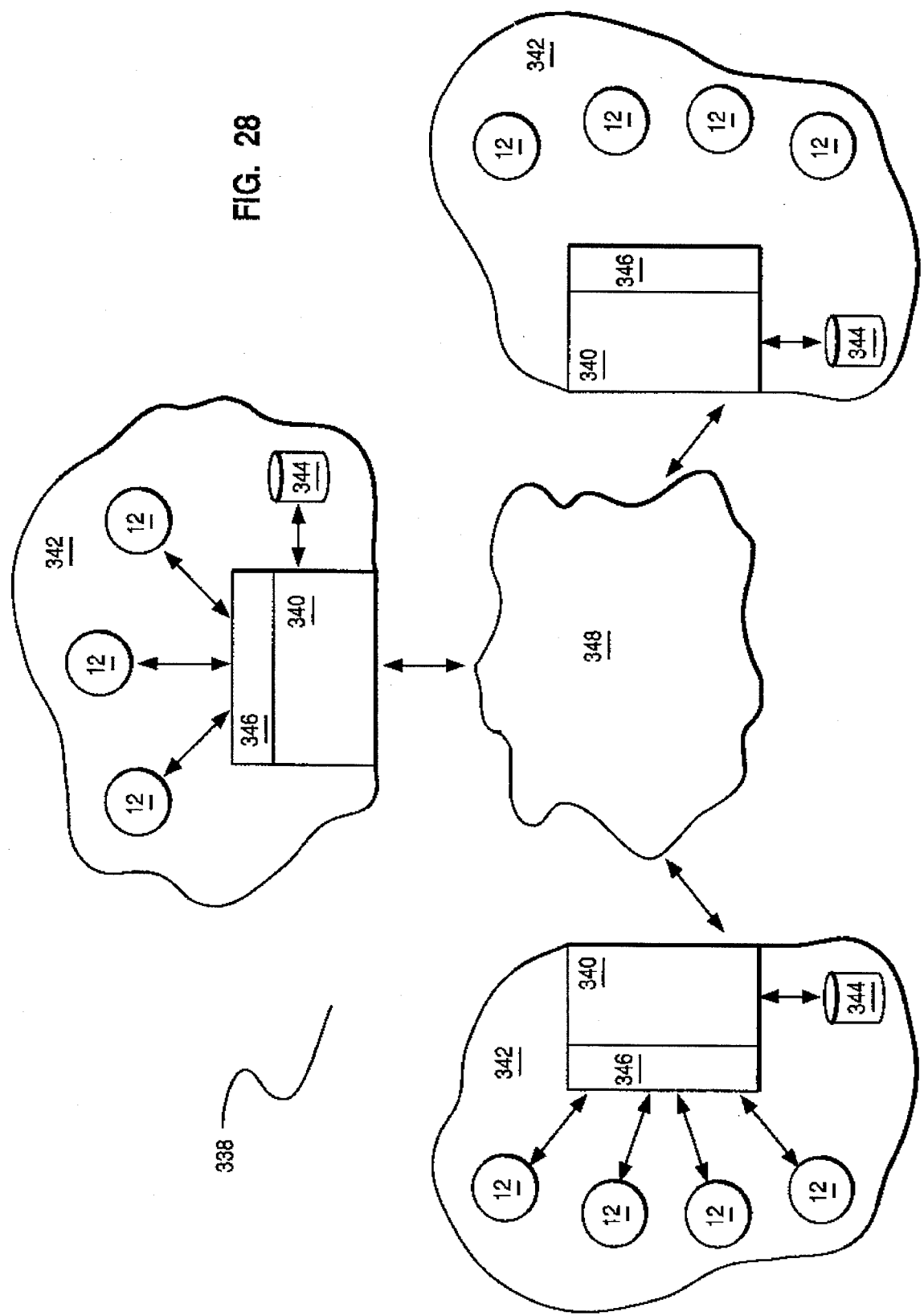
FIG. 28 shows a multi-computer data processing system.

Referring now to FIG. 28, a control daemon (server) 340 runs on each machine 342 that is expected to participate in the distributed testing. Test drivers 12 that are under control of the distributed environment 338 are expected to register with the server 340 on the machine 342 where they are executing. All communication with other processes and other processors is done via the server for the machine on which the test driver 12 is executing. This allows child processes to be spawned on remote machines and death of child to be received on the parent machine upon completion of processing. Using the registration technique, we can also support children that are not direct descendents of the parent process either on the same processor or on a remote processor. By controlling the execution and termination of driver tasks through a central point, we are able to get return code information from any task driver 12 that is running under this distributed environment 338.

The control daemon 340 also has facilities 344 for individual message queues for each registered process, as well as the maintenance and retrieval of environment variables across the test environment 338.

In order to participate in this environment, a process must register with the server 340. This is accomplished by issuing the register function call in the library. Once a process chooses to register, a client record is created in the server and a handle assigned to that client for server use. The handle is returned to the registering process and must be used for further communication with the server.

When the controlled process has finished processing, it must issue a terminate command to the server to indicate that processing has completed. The terminate command requires passing a return code of the current process. Once a process issues the terminate command, the terminating process will block and the server will enqueue a message on the parents message queue that a child is terminating and wait for the parent process to terminate the child. The parent will issue a release_child function call with the childs handle upon receipt of the message. Once the server receives the release_child command, the child will be signaled that it is ok to terminate and the client data structures will be freed in the server.

IPC Library Function Overview

Access to the distributed ipc layer are accessed via the IPC library functions (ipclib.a). These functions provide the user level API 346 (FIG. 28) for access to communication 348 and services facilities provided by the server.

The following are available from ipclib, and are broken down according to the control flow within a test driver.

Initialization set_signals( )

The set_signals command is used to initialize the signal handler, the signal handler is build in the library and had facilities for handling messages sent from the server to the client, handling death of child and terminating the process. Using this methodology, the driver developer need only include this call in the driver code and all signal handling will be done automatically using the ipclib signal vectors.

Registration and Termination register_client(int handle)

This is the normal registration command once the process is started, it must be registered with the local control daemon (server) to participate in the ipc communication channels. Issuing this command may have different results based on the value of the handle.

Figure 30:
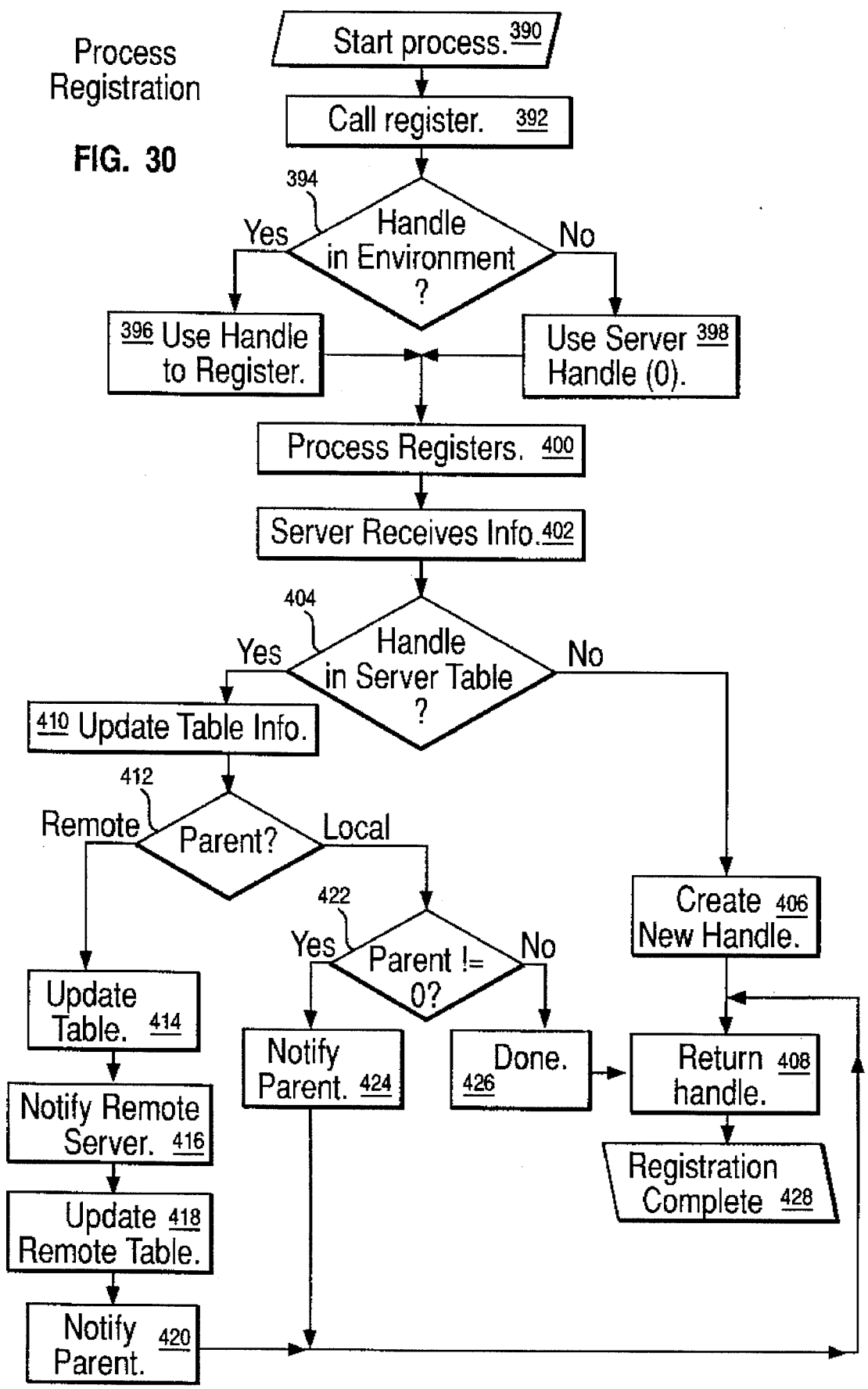
FIG. 30 shows the control flow for registering a process.

Referring to FIG. 30, when a process is started at 390 via the start_process function call, an environment variable is set (AUS_PHANDLE) which contains the value of the handle to be used by that process. When registering at 392, the process uses the handle given in the environment variable 396. This handle was created by pre-registering a child with the server and is already known by the parent. When this is done, the client record in the server is updated and the parent notified that a child started. If the correct handle is passed in this instance, the register_client routine will return the same handle that was passed.

When a process is started as a top level process, as determined at 394, the value of handle will be zero. This indicates that this is a top level process and the server will act as the parent of this process, as shown at 398. In this instance, the register_client routine will return a new handle value, indicating the handle to be used for this client in the future.

Beginning at 400, the client process prepares a registration packet and forwards it to the server where it is received 402. Upon receipt of the registration packet, the server will determine if the handle contained in the packet already exists in the server client table 404. If the handle does not exist, the server will construct a new handle at 406, initialize a new client record in the server client table and return the handle at 408 in the registration packet to the client. If the server determines that the handle exists in the client table at 404 the server will update the server client table. The update process may take on two forms depending on the current state of the process indicated by the handle. If the table entry that matches the handle is in the pending state, then that entry is marked valid and processing continues. If the table entry that matches the handle is in the pending state, then that entry is marked valid and processing continues. If the table entry is marked valid, then a new handle is created for this client and a new table entry is created in the server client table. The value assigned to the handle in this case will be the value of the new table entry. Once the local server client table has been updated, the server will check the parent host of the process and decide if the parent of this process is local or remote at 412. If the parent is on the local system, the server will check the parent's handle at 422. If the parent is not the server, then the parent process will be notified at 424. This notification is accomplished by enqueueing a message on the parent's message queue and processing a signal to the parent process that a message is pending. The parent will retrieve the message and create a local child status record. The registration packet with the handle for this process is then returned to the registering process at 408. In the case of the parent being the server as determined at 422, no notification of the parent process is necessary and the handle is returned to the registering process at 426.

Returning to 412 on FIG. 30, if the parent is determined to be remote, the local server client table is updated to indicate that the process has registered at 414. A registration packet is prepared by the local server and forwarded to the remote server at 416. The local server will then wait until the remote processing is complete. Upon receipt of the packet, the remote server will update the remote server client table to indicate that the process has registered at 418. Since the parent process exists on the remote computer, the notification of the parent process is carried out by the remote server at 420. Once the notification has been enqueued, the remote server will return the registration packet to the local server who will in turn update the packet with the final information relative to the local system and return the packet with the handle of the registering process at 408, thus completing registration 420.

Two other situations are possible:

1) The handle is invalid. In this case, the process will be adopted by the server and a new handle returned.
2) The handle is already in use. In this case, the handle passed will be interpreted to be the parents handle, the child will be registered as a child of the handle passed and a new handle returned.

xx_terminate(int handle, int rc)

The terminate is used prior to exit of the process. The handle of the process terminating and the return code to be passed back to the parent are used as parameters. The intent of the terminate command is to allow return codes to be passed back to the parent process. In order to insure that the parent has received notification that a child has died, the terminating process will block waiting on a signal. The server will notify the parent process by enqueueing a message to the parents message queue and signaling the parent that a message is pending. The parent signal handler will catch the signal, get the message, update the parents child data table and issue the release_child command. Using this command will cause the server to clean UP the client table entry for the terminating process and send the SIGUSR2 signal to the child.

Upon the receipt of this signal, the child process will complete it's exit. The signal handler used to catch this signal is also part of the ipclib and no user coding is necessary to handle it.

NOTE: As we speak of message passing, notification, registration, or any function handled by the server on behalf of the clients, it is always assumed that the action will take place on the appropriate machine. The server takes care of understanding where processes are running and will forward the request for the proper server instance to make sure the command completes. Next is described the notify command used in the server. The notify command has the syntax of notify(handle,sigval). We will look at the clients data structure in detail later, but for now all we need to know that the server has a parent host and client host associated with each client record. When this command is issued, the server will look up the client host name indicated by the handle, if it is the same as the host name of the server then a kill <sigval> pid is issued to notify the client. If the host name does not match, then the command packet is forwarded to the host name indicated by client host name in the client data Structure. The command packet is received by that host and the kill issued on the machine with the process.

Sample Process Flow

Figure 31:
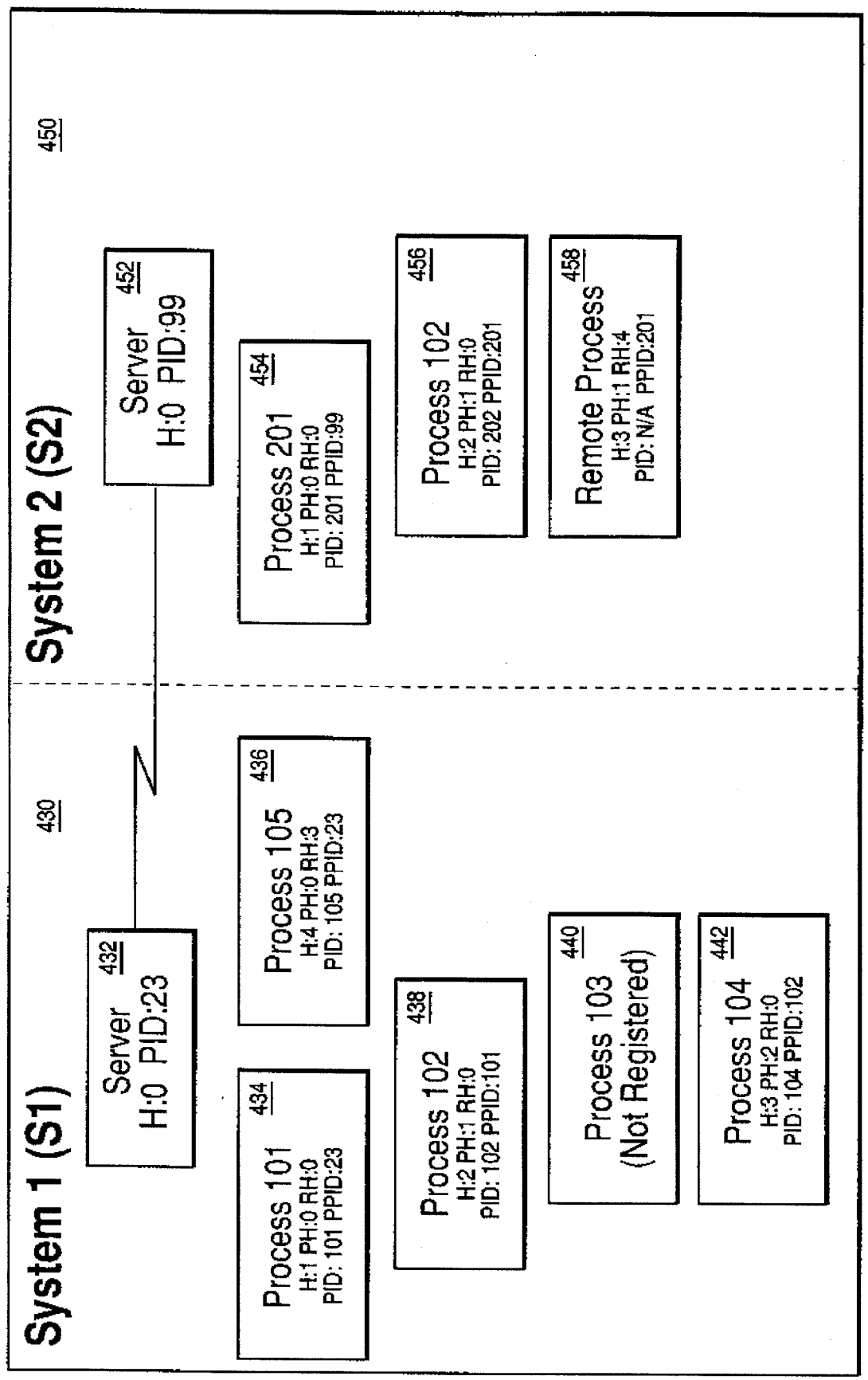
FIG. 31 shows the internal state of two systems in a multi-process data processing system.

FIGS. 31 and 32 show a sample process flow and resulting status. Referring to FIG. 31, the interrelationships that exist between server and client processes is shown. This figure is a snapshot of the system state after some processes have been started using the distributed communication facilities. Each system, System 1 430 and System 2 450 has an instance of the server running on it. For System 1 (S1), the server is 432; for System 2 (S2), the server is 452. The following scenario was followed to arrive at the system state shown in FIG. 31.

On System 1 (S1)

0. Server initializes client table and adds itself as handle 0
1. Process 101 (434) started on S1
2. Process 101 registers
3. Process 101 starts Process 102 (438)
4. Process 102 registers
5. Process 102 starts Process 103 (440)
6. Process 103 starts Process 104 (442)
7. Process 104 registers On System 2 (S2)

0. Server initializes client table and adds itself as handle 0
1. Process 201 (454) started on S2
2. Process 201 registers
3. Process 201 starts Process 202 (456)
4. Process 202 registers
5. Process 202 starts process on S1
6. S2 server requests S1 server to start process
7. S1 starts Process 105 (436)
8. Process 105 registers The reason for this illustration is to provide a reference point to describe the mechanisms used to provide single system semantics in a distributed environment. The base communications path is the same regardless of the information being communicated. This allows service of messages, environmental data, signals, or anything else that may be required, to use the same model. A key element of the communication model is the logical parent-child relationships that are preserved in this model. A key limitation that this model overcomes is the problem of getting status information from processes that are more than one generation removed from the parent process. To solve this problem, processes that are interested in participating in this logical family tree must register with the local server. Processes that register with the server are assigned a handle and inserted into the server's client table. The server tables created from this registration process, and that reflects the system snapshot of FIG. 31, will now be described.

The client process table for server 432 on S1 430 is shown at 460 of FIG. 32. Remembering that handle 0 is used for the server daemon process (432 of FIG. 31), the information for this server is shown in row 462 of client process table 460. Here, it is seen that server 432 has registered, has a current process handle of 0, has a parent process handle of 0 (since no parent, a remote process handle of 0 (since not initiated by a remote process), a process ID of 23, a parent process ID 0 (since no parent), the system name S1 which is running this process, the system name S1 where the parent is running (S1 since server process), a pointer to the environment (0, since no environment is defined; if values were defined for environments or message queues, this field would contain a pointer to the head of the current message queue, a pointer to a message queue, and a timestamp.

Referring now to handle 1 464 of the client process table 460 of FIG. 32, it is seen that this registration entry is for Process 101 (434 of FIG. 31). This is determined by examining the associated PID column. The other interesting information for Process 101 that can be observed from this table is that the parent process's handle (Phand) is 0, and the parent process's ID (PPID) is 23, both of which refer to the server process 432. The information in columns 466 (for Process 102 of FIG. 31) and 468 (for Process 104 of FIG. 31) show similar types parent process relationships based on the same Phand and PPID information.

Before analyzing the last entry of client process table for S1 server 460, we first look at the client process table for the S2 server 480. It can be seen that the S2 server 452 (of FIG. 31) has an entry at 472 similar to that for the S1 server at 462. The differences between the two being the Process ID, which is 99, and the system name, which is obviously S2 in this case.

Entries 474 and 476 indicate local processes on system 2 and are similar to the table entries already described for system 1. Entry 478 is an entry describing a remote process. The handle is 3, indicating the handle by which the process is known to this server. The parent handle is 2 indicating a logical parent of process 202 (FIG. 31, 456) on S2. The remote handle is 4, indicating the handle describing this process on the remote system. The process id is 105 and is the same as the process id shown in 170 which is the S1 client process table 460. The parent process id is 202. The process host is S1, indicating that this is a remote process and the parent host or the host of the parent process is S2. S2 is the process host for process 202.

Referring back to the client process table for server S1 460 of FIG. 32, and specifically to row 470, it is seen that the process having a handle of 4 corresponds to process ID 105 (item 436 of FIG. 31). For this Process 105, it is further seen that the parent process handle is 0 (indicating a server process), the remote process handle is 3 (indicating that this process is the same as a remote process having a handle of 3), that the parent process ID is 23 (which is the local server, as all processes initiated from a remote machine funnel through the local server), that the local system name is S1 and the system where the parent is running is S2 (i.e. it was initiated from a remote process). In other words, the information shown in row 470 is used by the S1 server 432 when accessing/managing Process 105, and the information used for this same process 105 is stored at 478 and is used by the S2 server 452 when accessing/managing such process. Thus, a single system semantic is used by both local and remote systems for accessing processes in a distributed environment.

Now that the inter-host communication mechanism has been described, we return back to describing the internals of the testing environment.

Environment Variables

The library provides the capability to have environment variables within the distributed environment. These variables are maintained within the parent/child relationship as seen by the distributed environment. This facility allows changing an environment variable at a level within the test environment that will be seen at every level below where the change was made. Access to the environment variable facilities is as follows:

xx_putenv(name, value, handle)

This routine updates the environment for the client indicated by handle on the local server.

xx_getenv (name,handle)

This routine will return a character pointer holding the value associated with the environment variable name passed. The getenv function will look in the environment indicated by the handle to get the information, if it is not found, then it will follow it's family tree back to the server level looking for the environment variable. If it is not found then this function will return NULL.

NOTE: If the process is a child of a remote parent, then the search will continue remotely once the child fails to resolve the variable name. The server with the getenv request will forward the request to the remote parents host and finish walking the environment tree on the remote host.

xx_freenv (name,handle)

This routine will delete the environment variable indicated by name for the client indicated by handle on the local host.

Starting Child Processes

Another facility available in the library is the start_process facility. At the process level, we have the ability to track the progress of any children started by the process. The data structure used for that control is as follows.

TABLE 1

| struct | child_data | /* Child data tracking structure */ |
|---|---|---|
| | { | |
| | short handle; | |
| | char. status; | |
| | char plug; | |
| | int rc; | |
| | pid_t pid; | |
| | pid_t fpid; | |
| | }; | |

The important information to the user of a driver process is the return code and the status field of a child data structure. This information allows the driver to understand what child processes are outstanding and the current status of those processes. Once a child has completed, the return code from that process will be available in the child_data structure for that process.

TABLE 2

| Field descriptions: | |
|---|---|
| handle - | Childs handle |
| status - | Current child process status |
| S_PEND - | Mark a client entry as pending |
| S_VALID - | Mark a client entry as valid (running) |
| S_TERM - | Mark a client as terminated (valid exit) |
| S_SIGD - | Client received a child died signal (invalid exit) |
| S_DONE - | Child processing is complete (valid exit) |
| rc - | Return code from child process if valid exit. |
| pid - | Process id of the registered child process, this is the process id used to communicate with the child for normal operations and to notify when the child terminates |
| fpid - | Process of the forked process id that the child was invoked through. This information is maintained in case the process exits before registering with the server, in the case of abnormal termination of the child process, the death of child will yield this process id as the dieing process and will be used to clean up the child processes. |

Functions reserve_slot(handle)

The reserve_slot routine is used by a parent process to reserve a client slot for the child being started in the server. The reserve_slot function is called using the parent's handle. The return from this function is a new handle to be used for the child.

The reserve_slot routine is called by the start process routine and will not normally be used by a user program. When called, the reserve_slot routine also sets up a child_data record in the parent that will be used to associate the driver child data with the server client information.

start_process(hostname,command,handle)

The start process command should be used to start all child processes. As you can see, the start_process command has three parameters:

hostname—Indicated the hostname where you wish the child process to execute.

command—Gives the command with parameters to execute to start the child process.

handle—This is the parent process handle.

Figure 29:
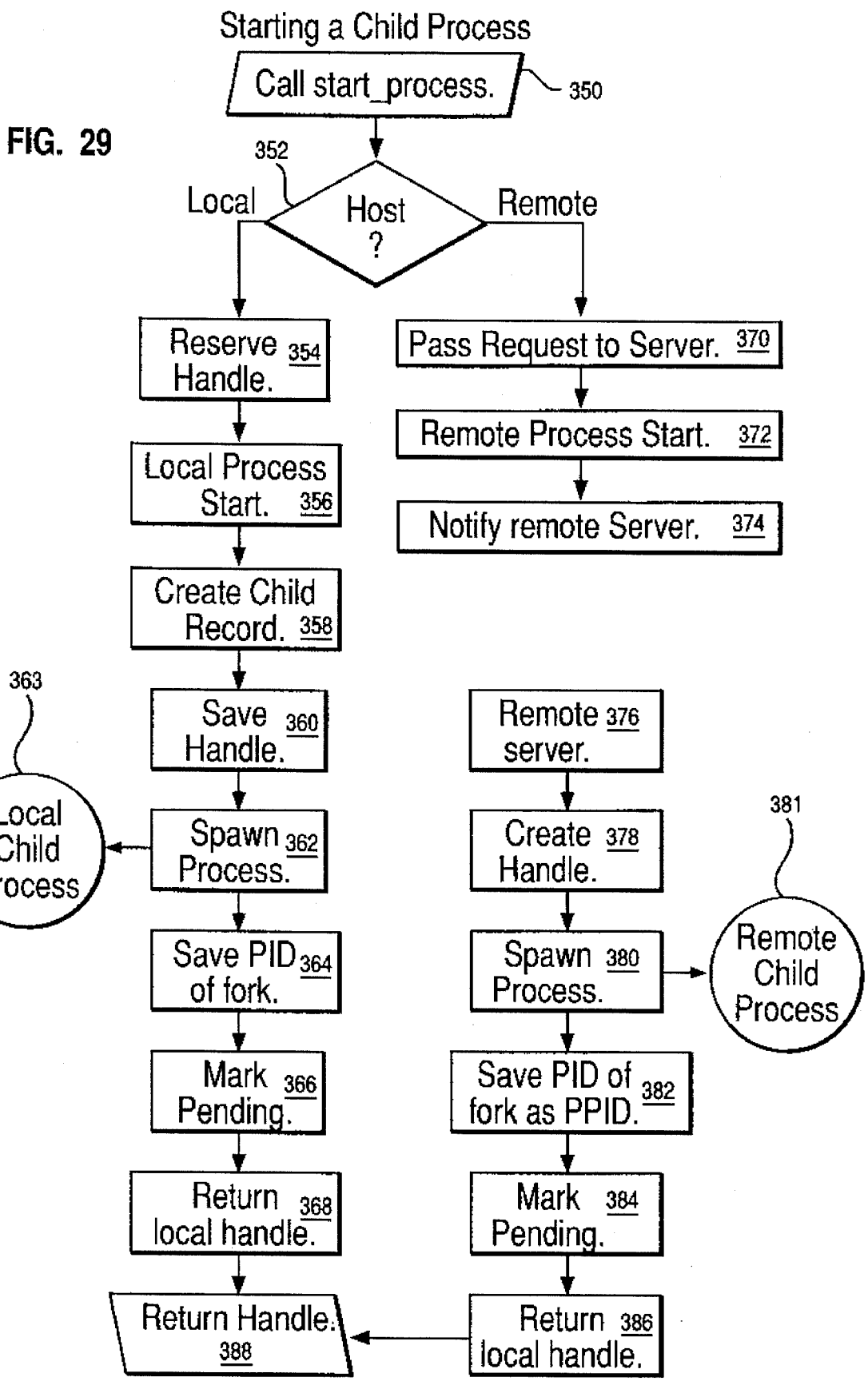
FIG. 29 shows the control flow for starting a child process.

As depicted by FIG. 29, once the start_process command is issued at 350, the following sequence occurs:

1) The hostname is checked at 352 to determine if you wish the process to be started on the local host or on a remote host.

If the process is to run on the local host:

2) reserve_slot is called to get a child handle at 354.

3) A local process is started at 356, and a child record is created at 358.

4) The new handle is put into the shell environment using putenv at 360.

5) A new process is forked at 362 and the process id is captured.

6) The command passed to start_process is execed at 363.

7) The parent's child_data table is updated with the handle and the forked process id at 364, and put in a pending state at 366.

Once the child 363 starts, it will register with the server (see above) and the child_data table entry will be in the valid state.

If the process is to run on a remote host, as determined at 352, the following sequence occurs:

2) The remote_command function is called to send the request to start a remote process to the server at 370.

3) The local server will build at 372 a client record for the remote process and send the command packet to the server at 374 indicated by hostname.

4) The remote host will receive the command packet and process the remote execute function on the server at 376.

5) The remote host will create a slot in the clients table for the process at 378.

6) The new handle is put into the shell environment using putenv at 378.

7) The new process is forked at 380, and the process id is captured.

8) The command passed to in the command packet is execed at 381.

9) The forked process id is stored in the parent's pid slot in the client data table at 382, and the table entry changed to pending state at 384.

For either the local or remote process, the command packet is returned to the originating host server (368 for local; 386 for remote) with a good return code. The client information is updated at 388 to indicate the remote handle and the client information on the originating host is marked as valid.

At this time, the parent process has no knowledge of the state of the forked process. All state information is held in the servers until the process registers on the remote system. Next is described what happens when a remote process registers to complete the picture.

Register of Pending Remote Process

The process that was exec'ed on the remote machine will register. When that happens, the client record on the remote server will be updated to reflect the pid of the actual registering process and the status of the client record will become valid. The remote server will then forward a command packet to the originating host server that a child has started. The server on the originating host will enqueue a message that the child has started and signal the parent process. The signal will be caught by the signal handler and a child_data record will be created for the parent with a valid status.

At this time, in either the local or remote case, the start_process command will return the handle of the child that was started. The handle will always be the handle relative to the local server view of that process.

Referring now to FIG. 30

The above description provides interprocessor communication support for multiple processes in an multi-computer complex.

Directory Structure

This test environment includes the designation of an all encompassing, somewhat complex, directory structure. The structure contains all the user task code, the scenario tools (including the scaffolding tools), and a structure that accumulates data during the scenario execution stage.

Top Level Directory Structure

Figure 3:
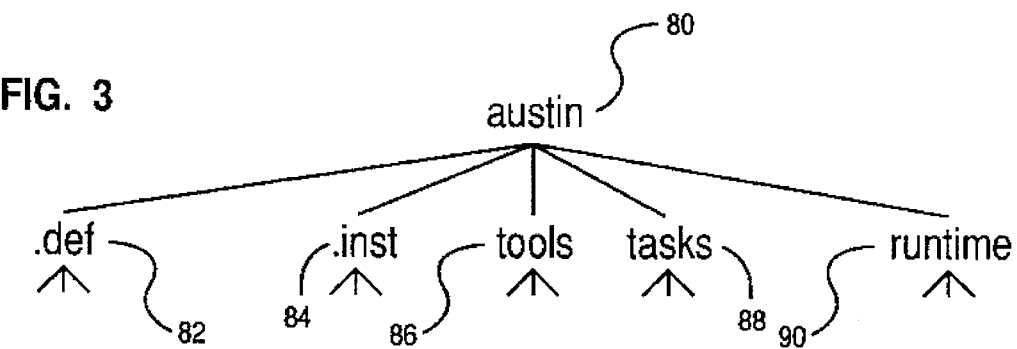
FIG. 3 depicts the top level directory of the test scaffold data structure stored on a direct access storage device (DASD).

Reference in now made to FIG. 3, to describe the preferred embodiment of the directory structure. It is known to those of ordinary skill in the art that differing structures could similarly be used to achieve a similar overall-hierarchical structure as disclosed herein.

By default, the parent level directory structure for the test scaffold is /austin 80. Five directory structures are located in the /austin directory. These structures are named /austin/.def 82, /austin/.inst 84, /austin/tools 86, /austin/tasks 88, and /austin/runtime 90. It is possible to change the default location and/or the name of any of these directories, as described below. How these five directory structures are used will now be described.

The .def Directory

The definition directory 82 contains scenario definition files. The default location for the definition directory is /austin/.def.

The .inst Directory

The instance directory 844 contains scenario instance files, which are the files that describe a scenario. The default location for the instance directory is /austin/.inst.

The Tools Directory

Figure 4:
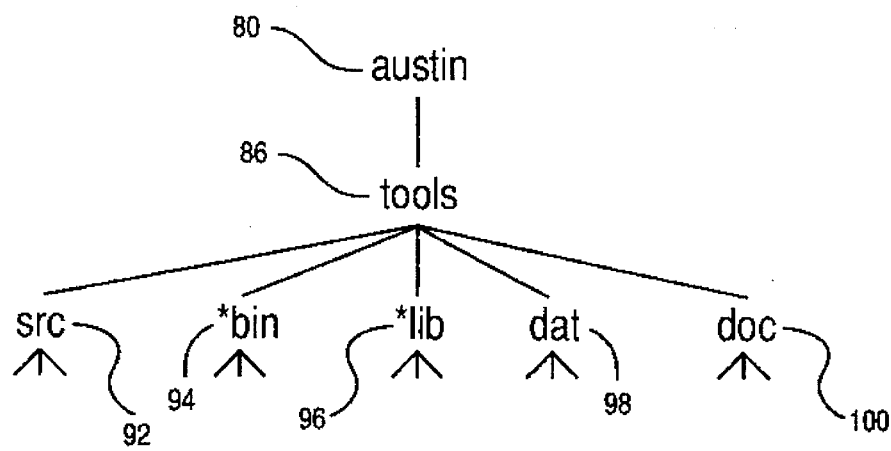
FIG. 4 depicts the tools directory structure for maintaining standardized scaffolding tools.

The tools directory 86 is the repository for all the standardized scaffold tools and any other tools that are needed by the executing scenario. The structure is denoted by the name /austin/tools. In the /austin/tools directory 86, as shown in FIG. 4, there are the following five directories: src 92 for source code, *bin 94 for executables and shell scripts, dat 98 for data files, doc 100 for documentation, and *lib 96 for libraries. The /austin/tools directory is installed at installation time, and rarely changes. Any tools needed by task code can be standardized and placed into this directory structure.

The denotation *bin and *lib is used to represent multiple bin and lib directories. In place of the *, a set of characters is used to indicate what type of executables or libraries are iD the directory. For example, currently, the tools directory structure has two directories named rsbin and rslib where RISC System/6000[2] 2 executables and libraries are placed. If the testing scaffold is compiled on a SUN SparcStation, two other directories, sunbin, and munlib could be used for the SUN executables and libraries.

[2]An IBM RISC-based computer system

The advantage of having multiple binary and library directories is that the executables and libraries can be served from a single host in a network, and the client that is mounting the information can set their local environment variables or PATH environment variable such that they access the appropriate directories based on the client's operating system and hardware platform.

The Tasks Directory Structure

Figure 5:
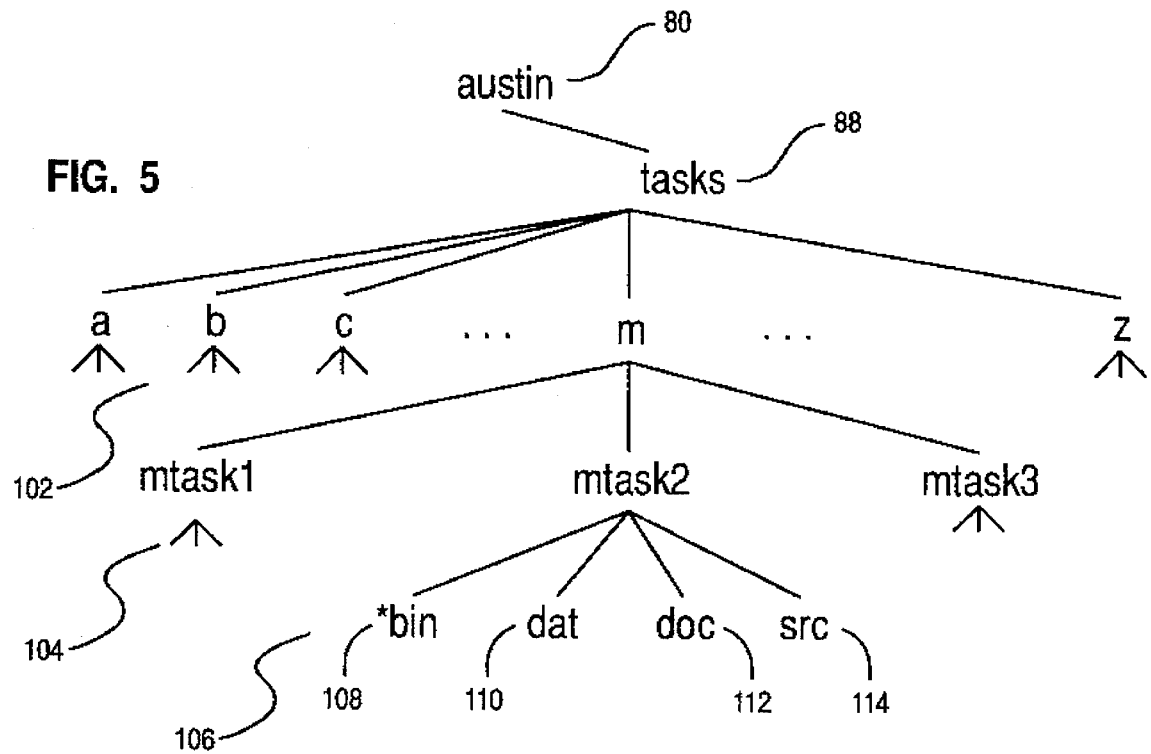
FIG. 5 depicts the task directory structure for maintaining user task code.

The tasks directory structure 88, as depicted in FIG. 5, is a repository for all the scenario developer's user code (tasks). Twenty-six directories 102 can be found in the /austin/tasks directory in the preferred embodiment. These directories at 102 are named a–z and are used to separate tasks via the first letter of their respective names. A task must have its own separate directory 104 in the tasks directory structure under the character directory 102 that is the same as the first letter of the task's name. Here, the task m is shown to have separate directories 104 called mtask1, mtask2 and mtask3. The directory the task creates should be the same as its name. The files 106 that make up the task are separated into the following four directories in the task name directory: src 104 for source code, *bin 108 for executable modules and shell scripts, dat 110 for data files, and doc 112 for documentation.

The entire tasks directory structure changes quite often during the task development stage. However, during the scenario execution stage, the task scenario driver provides an interface that allows writing in a completely different directory structure so it is not necessary to write in the tasks directory structure at all. This helps eliminate any corruption of the tasks structure that might occur during the scenario execution stage. To further ensure that no writing is occurring in the tasks directory during the scenario execution stage, the directory structure can be made read-only by changing its permissions; or, if the scenario is being executed in a distributed environment, the tasks directory structure can be mounted read-only from the environment server. Note that the scenario driver does not explicitly ensure that the structure is read-only during the scenario execution stage.

EXAMPLE

Figure 6:
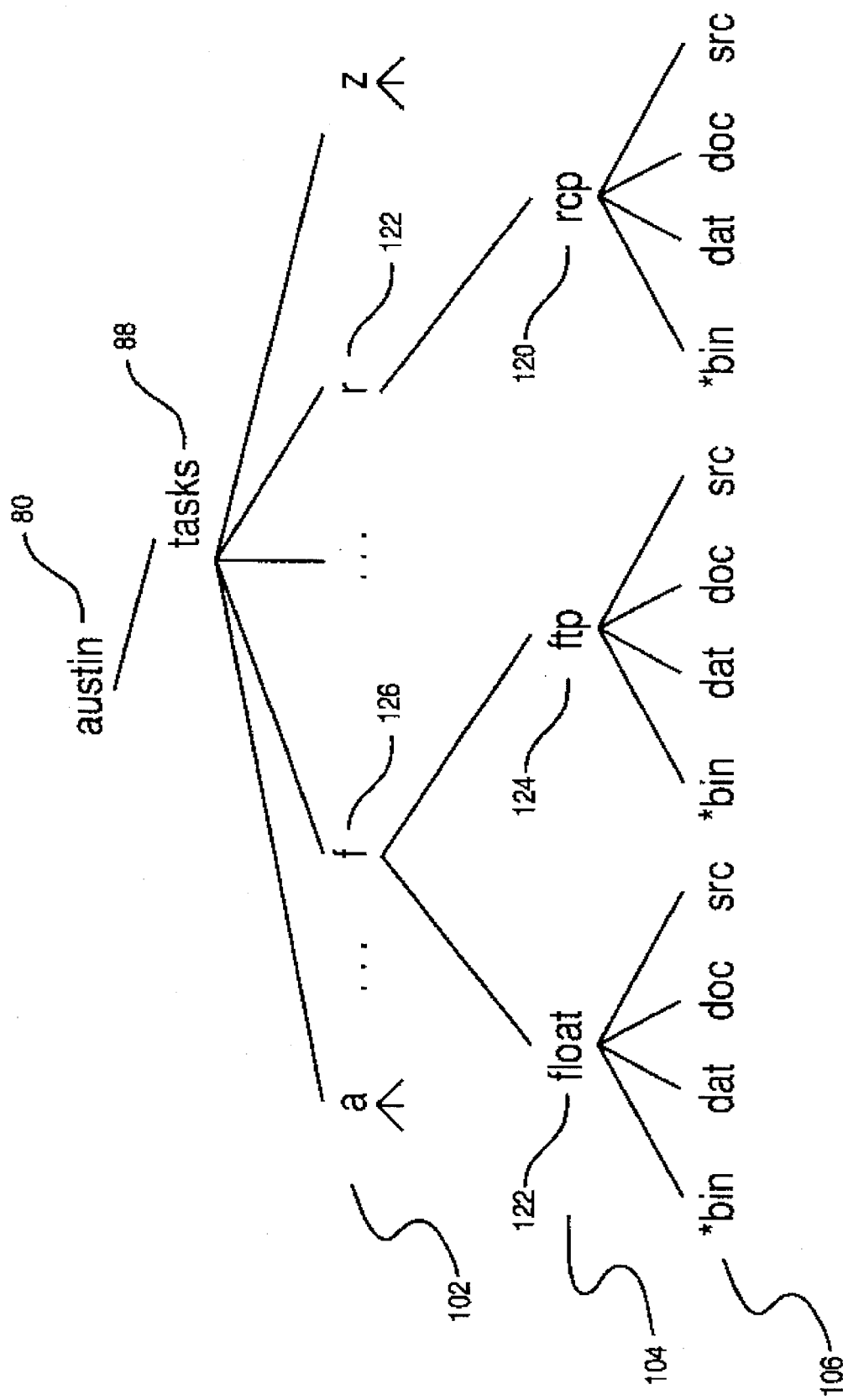
FIG. 6 shows a particular user task's underlying directory structure.

As shown in FIG. 6, a task named rcp 120 would be found in the directory /austin/tasks/r 122, and the tasks named float 122 and ftp 124 would be found in the directory /austin/tasks/f 126. Every task in the tasks structure 104 is a directory name under its appropriate character directory 102. For example, for a task named rcp, there is a directory named /austin/tasks/r/rcp 120 that contains all the information 106 pertaining to the rcp task. This directory is referred to as the AUSCODEDIR directory (see later discussion).

The Runtime Directory Structure

Figure 7:
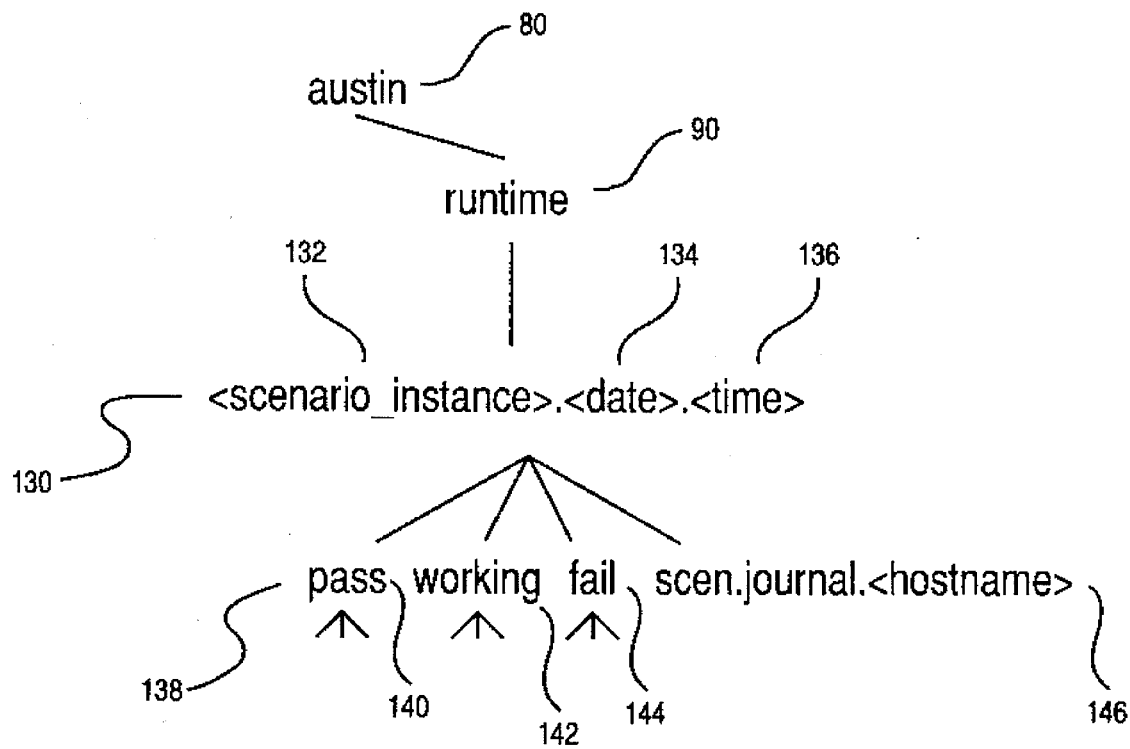
FIG. 7 depicts the runtime directory structure, used to maintain the scenario directory.

The runtime directory structure 90, as depicted in FIG. 7, is used extensively during the scenario execution stage. When the top level scenario driver begins execution, it creates a directory 130 in the /austin/runtime directory 90 consisting of the name of the scenario instance 132 followed by the date 134 and time 136. This directory 130 is referred to as the scenario directory, and its full tree is referred to as the scenario directory structure. The time stamped scenario directory guarantees that scenario data may be kept from n number of scenario executions (barring system resource constraints).

There are three directories 138 in the scenario directory 130 named pass 140, working 142, and fail 144 and a file 146 named scen.journal.<hostname> (i.e. one journal file per machine in the scenario). The working directory 142 is where all the runtime task activity takes place. Following the completion of a task, the files associated with the task are moved from the working directory 142 to either the pass 140 or fail 144 directory depending on the save configuration attribute and their success rate, as described below. The file scen.journal.<hostname> 146 is where the scenario journal information is recorded. This directory structure 138 is created at scenario execution time by the top level scenario driver, as will be described later.

The Runtime Task Directory Structure

Figure 8A:
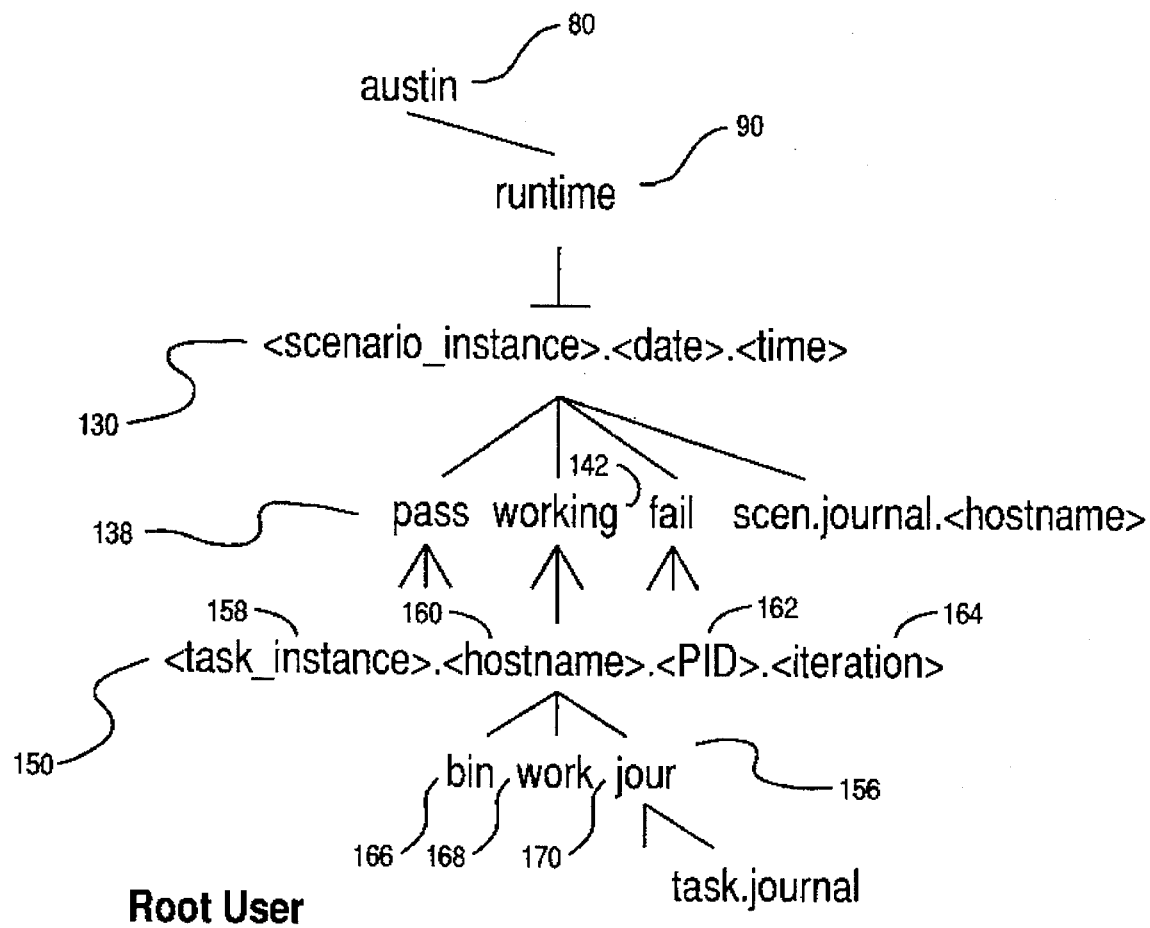
FIGS. 8A–8B depicts the task directory, used to maintain task information.
Figure 8B:
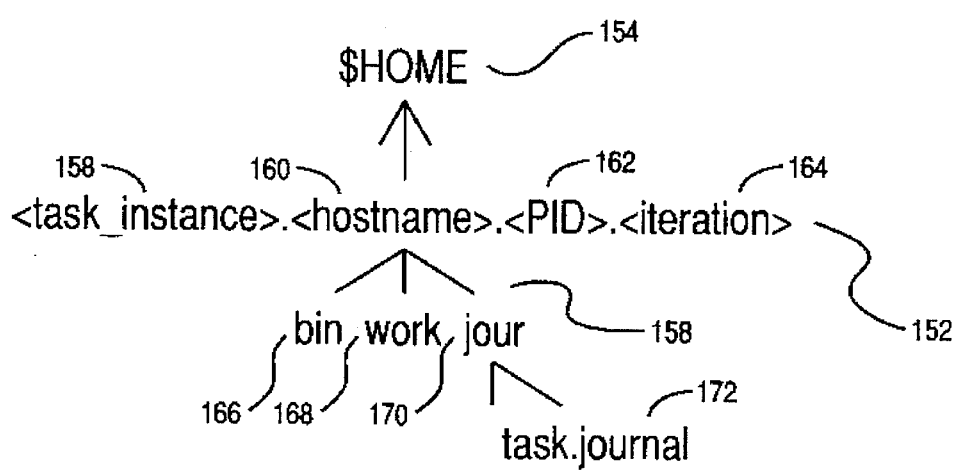

When a task scenario driver executes, it creates a unique directory 150 in the scenario directories working directory 142 if the task is running as the root user, as shown in FIG. 8A. If the task is running as a non-root user, as shown in FIG. 8B, the unique task directory structure 152 is created in the user's home directory 154 (denoted by the environment variable HOME). This directory 150 or 152 is referred to as the task directory and its respective directory tree 156 or 158 is referred to as the runtime task directory structure (not to be confused with the task directory structure described earlier). The unique task directory name is created by combining the name of the task instance 158, the host 160 that task is executing on, the task's process identification number (PID) 162, and the task's iteration 164.

This task directory uniqueness allows the same task to be executing on the same host at the same time or to be using the same scenario directory file space at the same time. The iteration allows uniqueness once the unique task directory structure is moved to the pass or fail directories. If the scenario is executing in a distributed runtime file space, and one of the fields used in creating the name of the task directory structure was not used, it would be possible to have tasks "stepping on each other." This unique working directory file space is one of the powerful aspects of the testing scaffold.

Beneath the unique task directory three more directories 156 or 158 can be found—the bin 166, work 168, and jour 170 directories. The bin directory 166 is created for use by the task setup code for outputting compiled executables, as later described. The work directory 168 is where the user will be placed when their code begins execution. Unless it is warranted, the user should not change directories out of the work directory. The jour directory 170 is where the standard task journal 172 (task.journal) is located (also 72 of FIG. 1) as well as all journals created by the task scenario driver using the ausjournals configuration attribute, as will be later described.

This entire runtime task directory structure is created by the task scenario driver. When the execution of the task scenario is complete, the unique directory structure for that task is moved to the scenario directories' pass or fail directory depending on the task's success and the value of the scenario driver save attribute. It is then compressed depending on the value of the scenario driver compress attribute. Note that no matter what the attributes are, the task directory structure is always removed from the scenario's working directory (for root users) or the $HOME directory (for non-root users). The movement of the information to the pass or fail directory is also a function performed by the task scenario driver.

Multiple Runtime Scenario Directory Structures

Figure 9:
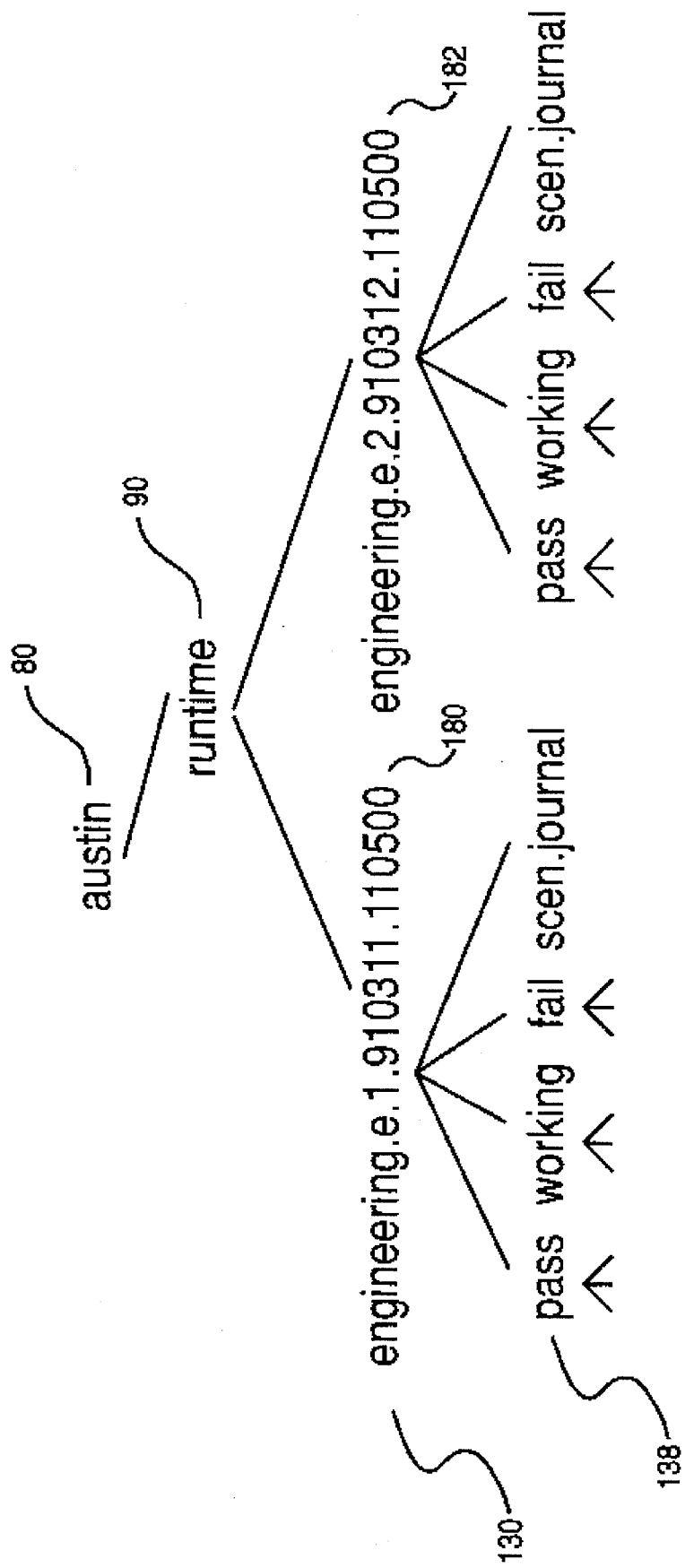
FIG. 9 shows the resulting runtime directory structure for multiple scenario instances.

In FIG. 9, two different scenarios 180 and 182 have executed or are executing. The scenarios originated from the same scenario definition file for the engineering environment scenario, but different scenario instance files. This is apparent because the first field of the directory name is the same, indicating the same scenario definition, but the third field is different, indicating different instances (engineering.e.1 versus engineering.e.2), as was previously described. It is also apparent from the directory name that the scenario engineering.e.1 began Mar. 11, 1991, at 11:05 AM (the 910311.110500 date/time stamp), and that the second scenario began Mar. 12, 1991, at 11:05 AM (the 920312.110500 date/time stamp). Therefore, the scenarios began execution exactly twenty-four hours apart.

When the two scenarios that are using these two directory structures 180 and 182 both finish, these structures will be left in the runtime file space 90. The scenario driver provides options for task scenario cleanup (described below), but does not automatically remove a scenario directory structure.

The following section will look at the execution of some of the tasks found in the tasks directory structure that are executing in environment scenario 180 in FIG. 9 (engineering.e.1.910311.110500).

Scenario Directory Working Directory Structure

Figure 10A:
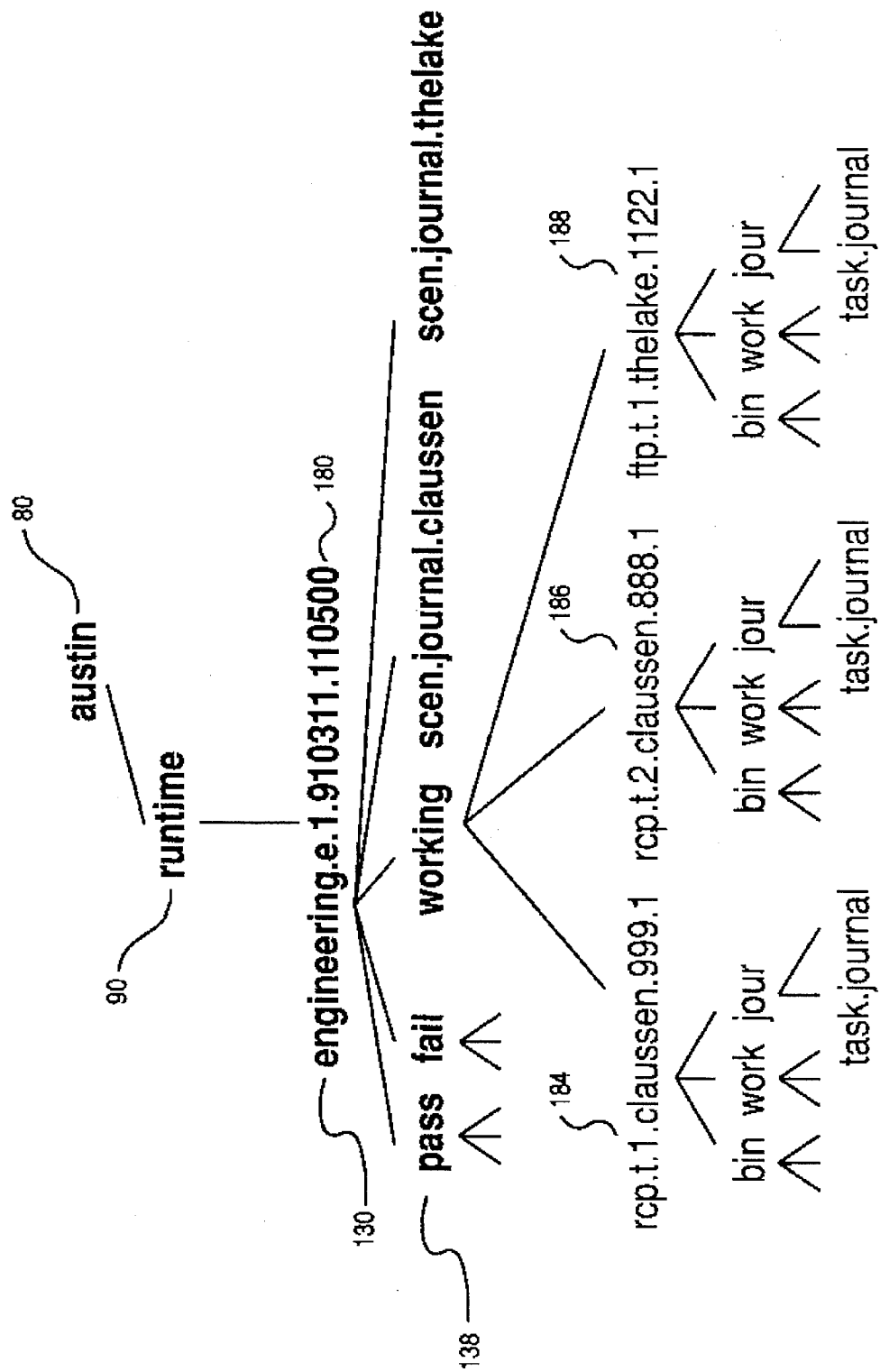
FIGS. 10A–10D shows the resulting task directory structure for multiple tasks.

Referring now to FIG. 10A, it is apparent that three tasks 184, 186, 188 are executing in the engineering environment scenario 130. Executing tasks will always be located under the directory named working in the scenario directory if the task executes as the root user, otherwise they will have a directory in the user's $HOME directory, as previously described.

It can also be observed that the engineering scenario of FIG. 10A is executing using a distributed runtime file space because unique task directory names contain different host names, as well as the runtime directory containing multiple scenario journal files. If the scenario was not distributed, the task directories would contain the same host name. In the example shown, two of the tasks 184, 186 are executing on the host claussen and one of the tasks 188 is executing on the host the lake.

Sample Runtime pass/fail Directory Structures

Figure 10B:
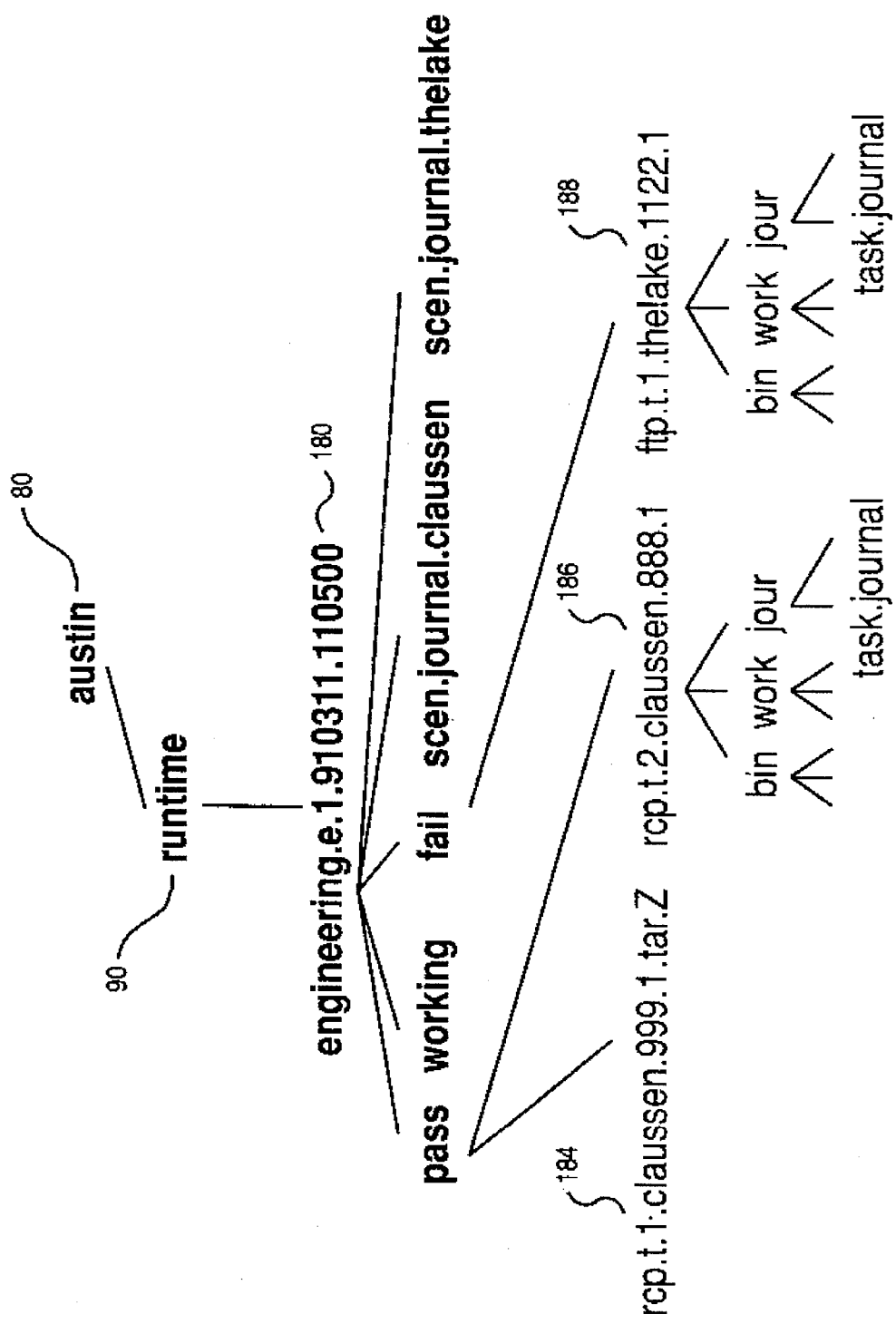

FIG. 10B depicts the post-execution location of the unique task directories described above. Several items can be deduced from FIG. 10B. First of all, two of the tasks that were previously executing passed (rcp.t.1.claussen.999.1 as shown at 184, rcp.t.2.claussen.888.1 as shown at 186), and one failed (fp.t.2.thelake.1122.1 as shown at 188). Secondly, the scenario driver attribute aussave had the value all or pass for the tasks rcp.t.1 (184) and rcp.t.2 (186) and it had the value all or fail for the task ftp.t.1 (188). The third thing that can be observed from FIG. 10B is that the scenario driver attribute auscompress option was set to pass or all for the task rcp.t.1 (184) and was set to either none or fail for the task rcp.t.2 (186) and none or pass for ftp.t.1 (188). For more information on the save and compress scenario driver attributes, see below.

Directory Structure Environment Variables

Referring back to FIG. 3, the parent directory structure /austin 80 and each of the five directory structure's beneath it can all be moved to different locations and/or renamed if the need exists. Six environment variables are provided and need to be set to the new location of the directory structures if they are moved and/or renamed. The environment variables follow:

AUSROOT
  Value is the new location of the/austin directory 80.
AUSDEF
  Value is the new location of the/austin/.def directory 82.
AUSINST
  Value is the new location the/austin/.inst directory 84.
AUSTOOLS
  Value is the new location of the /austin/tools directory 86.
AUSTASKS
  Value is the new location of the /austin/tasks directory 88.
AUSRUNTIME
  Value is the new location of the /austin/runtime directory 90.

If the default locations are used, no environment variables need to be set.

The procedure that the scenario driver and the scenario build tool use to determine the location of the five directory structures beneath the /austin directory follows:

1) Check to see if the environment variable for that structure is defined. If it is, that is the value of the directory structure. If it is not defined, continue to step 2.

2) Check to see if the environment variable AUSROOT is defined. If it is, append the proper default directory name to the end of the directory specified by the AUSROOT environment variable, and that is the value of the directory structure. If AUSROOT is not defined, continue to step 3.

3) The value of the directory structure being searched for is the default.

The above means that if the scenario build tool is searching for an instance, it will first check to see if the AUSINST environment variable is defined. If AUSINST is defined, the scenario build tool will expect the instance file to be located in the $AUSINST directory. If AUSINST isn't defined, the scenario build tool will then check to see if the AUSROOT environment variable is defined. If it is, then the instance is searched for in the SAUSROOT/.inst directory. If the AUSROOT environment variable is not defined, the instance is searched for in the /austin/.inst directory.

Scenario Definition and Instance Files

Definition and Instance File Interactions

Figure 11:
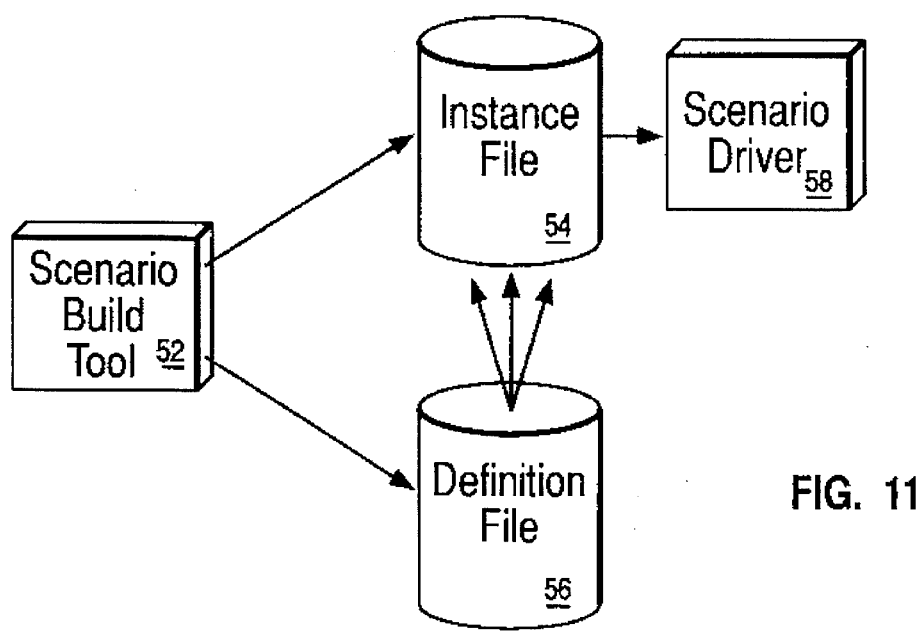
FIG. 11 depicts the scenario build tool used to create files for input to the scenario driver.

FIG. 11 shows the interactions that scenario definition files 56 and scenario instance files 54 have with the other components in the test scaffold. Definition and instance files are created, modified, and deleted through the scenario build tool 52, and instance files are used as configuration input to the scenario driver 58.

The creation of definitions is a necessary step during the scenario development stage. These definitions are then used as templates for the creation of scenario instances. The creation of scenario instance files is also a necessary step during the scenario development stage. Without a scenario instance file, a scenario driver will fail to execute, and without a scenario definition, it is impossible to create a scenario instance (unless the scenario build tool is circumvented).

Once instances have been instantiated from definitions, they are used as configuration information for the scenario driver. When each scenario driver is executed, it is passed one instance that defines the actions of that scenario driver.

Each definition and instance is a separate file in the /austin/.def directory (for definitions) or the /austin/.inst directory (for instances). The name of the file is the name of the definition or instance. Within the file, a stanza can be found that is similar in nature to a stanza in /etc/filesystems (Note: this is a standard stanza commonly known and used by a UNIX compatible operating system). The name of the stanza is the same as the file name, or the instance/definition name. The stanza then contains several attribute name/value pairs, one per line.

The attributes that begin with aus are referred to as scenario driver attributes, or scenario driver configuration attributes. The aus prefix is reserved for scenario driver attributes. Any other attributes that are found in the definition or instance file are referred to as user defined attributes. The purpose of both user defined attributes and scenario driver attributes is explained fully below.

Definition files differ slightly from instance files as mentioned in the first paragraph above. The values for the user defined attributes in a definition file are not actually the values that will be found in the instantiated instance file of the definition. Instead, each of the values of the user defined attributes in the definition file represent a syntax that describes the user defined attribute type, its restrictions, its default value, and a short description of what the user defined attribute is used for. All this information is used by the scenario build tool when that variable is given an actual value by the at instantiation time. The scenario build tool insures that the actual value of the user defined attribute, as entered by the task developer at instantiation time, meets the criteria set up when the definition of that user defined attribute was defined.

File Name Syntax

Definition files consist of an arbitrary given name (must begin with a character and followed by zero or more alphanumeric characters, the underbar, or periods) followed by a period and the extension e, m, p, or t. The extension is placed on the definition file depending on whether the definition defines an environment scenario (e), machine scenario (m), person scenario (p), or task scenario (t).

Instance files consist of the definition file name described above followed by a period and an extension which is a unique integer value for the current definition. For example, if a definition named foo.e had been instantiated twice, the instances foo.e.1 and foo.e.2 would exist. If it was instantiated a third time, a new instance named foo.e.3 would be created.

TABLE 3

Scenario Definition and Instance File Grammar

| | |
|---|---|
| <def_or_inst>: | <identifier>:<attributes> |
| <attributes>: | <attributes> |
| | \| <attribute> <attribute> |
| <attribute>: | <instance_user_def> |
| | /* instance files only */ |
| | \| <definition_user_def> |
| | /* definition files only */ |
| | \| auscodedir = <qstring> |
| | \| ausbeghook = <qstring> |
| | \| auscompress = |
| | <comp_and_save> |
| | \| ausdesc = <qstring> |
| | \| ausdistributed = |
| | <true_or_false> |
| | \| ausendhook = <qstring> |
| | \| ausjournals = <qstring> |
| | \| ausloops = <integer> |
| | \| ausmode = concurrent \| |
| | sequential |
| | \| ausobjlist = <qstring> |
| | \| ausbjnumlist = <qstring> |
| | \| aussave = <compress_and_save> |
| | \| austaskcode = <qstring> |
| | \| austaskparams = <qstring> |
| | \| austime = <integer> \| <real> |
| | \| austype = environment \| |
| | machine \| person \| task |
| | \| aususer = <qstring> |
| | \| ausverbose = <integer> |
| | \| auswindows = <true_or_false> |
| <instance_user_def>: | <identifier> = <qstring> |
| | \| <identifier> = |
| <definition_user_def>: | <identifier> = <req> <type> |
| | <restricts> <default> |
| | <desc> |
| <true_or_false>: | true \| false |
| <comp_and_save>: | none \| fail \| pass \| all |
| <req>: | req \| opt |
| <type>: | uns \| int \| flt \| chr \| str |
| <restricts>: | /* nothing */ |
| | \| <restrict> <restricts> |
| <restrict>: | <item>:<item> |
| | \| <item> |
| <item>: | <unsigned> |
| | \| <integer> |
| | \| <real> |
| | \| <character> |
| | \| <qstring> |
| <default>: | /* nothing */ |
| | \| <qstring> |
| <desc>: | @[ \n]*\n |
| <identifier>: | [A – Za – z][A – Za – z0 – 9_ .]* |
| <real>: | [–+]?[0–9]*"."[0–9]+ |
| <integer>: | [–+]?[0–9]+ |
| <qstring>: | "[ "\n]*["\n] |
| <character>: | [ \n] |

EXAMPLE

The following is an example of a task definition file, using a typical stanza syntax.

TABLE 4

| sample.t: | |
|---|---|
| austype = | task |
| ausdesc = | "Tests NFS mounts from clients to a server." |
| austaskcode = | "nfstest" |
| SERVER = | req str @ NFS server, exports directories |
| CLIENTS = | req str @ List of NFS clients, mounts directories |

TABLE 4-continued sample.t:

| | |
|---|---|
| FILESIZE = | opt int { 512 1024 2048 4096 } 512 @ Files size in Bytes |

As can be seen from the sample definition file, the task has three reserved attributes defined and three user defined attributes (SERVER, CLIENTS, and FILESIZE). The user defined attribute SERVER is required, is of type string, has no restrictions, and has no default value. The user defined attribute CLIENTS is also required, is of type string, has no restrictions, and also has no default value. The third user defined attribute, FILESIZE, is optional, is of type integer, is restricted to either 512, 1024, 2048, or 4096, and has a default value of 512. The descriptions for the three attributes provide some information also.

The name of this definition file is sample.t. By default, it would be located in the /austin/.def, and could be manipulated by the scenario build tool. Normally, creation and manipulation of the definition would be done completely through the scenario build tool.

The following is an instantiation of the task definition file from above:

TABLE 5 sample.t.1:

| | |
|---|---|
| austype = | task |
| ausdec = | "Tests NFS mounts from clients to a server." |
| austaskcode = | "nfstest" |
| auscompress = | none |
| ausjournals = | "klog elog SPOOL:spooljour" |
| ausloops = | 1 |
| austaskparams = | "–e 1 –f 16" |
| aussave = | all |
| ausverbose = | 7 |
| SERVER = | "arsenio" |
| CLIENTS = | "carson leno oprah" |
| FILESIZE = | "512" |

The exact meaning of all the reserved attributes and the way the driver uses this instance file is described in detail below. As shown by this example, during the instantiation stage the scenario developer specified the host "arsenio" as the SERVER, the hosts "carson", "leno", and "oprah" as the CLIENTS, and a FILESIZE of 512. The scenario developer did not have to change the FILESIZE variable. By default, it would have been created with the value 512.

Scenario Build Tool

The scenario build tool presents a natural language, task-oriented interface to managing the scenario definition files and scenario instance files. The scenario build tool uses a hierarchical structure. This hierarchical structure consists of menu panels and dialog panels. Menus successively refine the task to be performed. Dialog panels allow data to be entered for definition and instance attributes. The basic functions that can be performed on both instances and definitions are adding, changing, removing, and listing.

Figure 12:
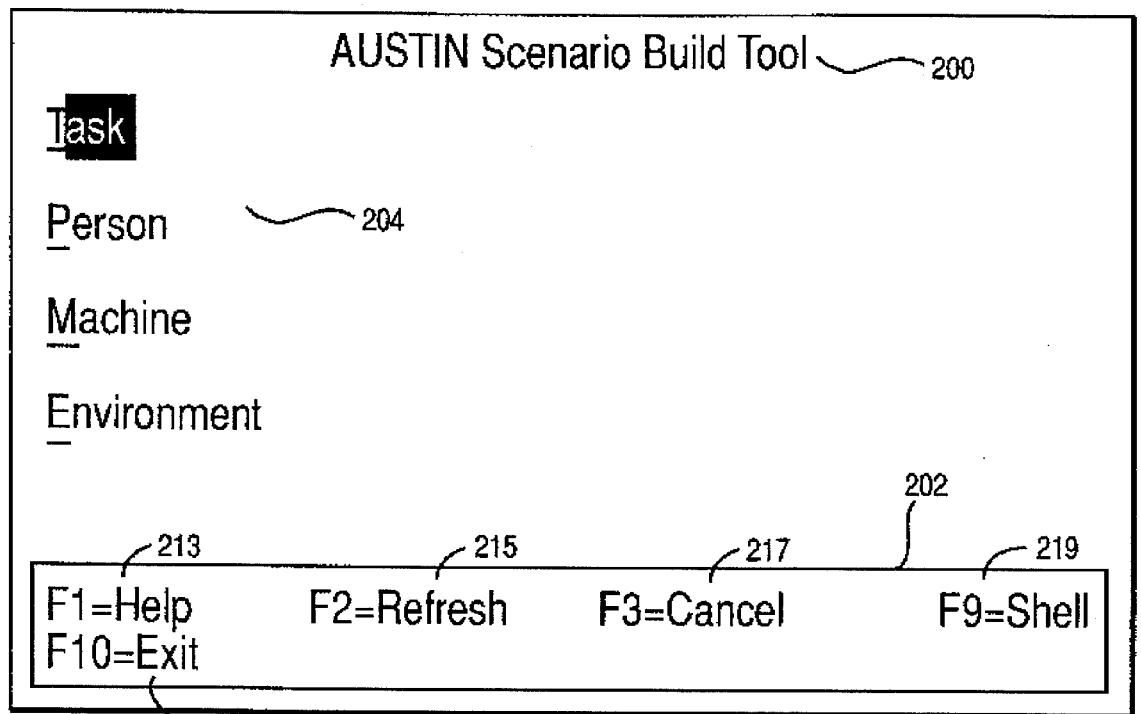
FIG. 12 depicts a sample user dialogue panel for the scenario build tool.
Figure 13:
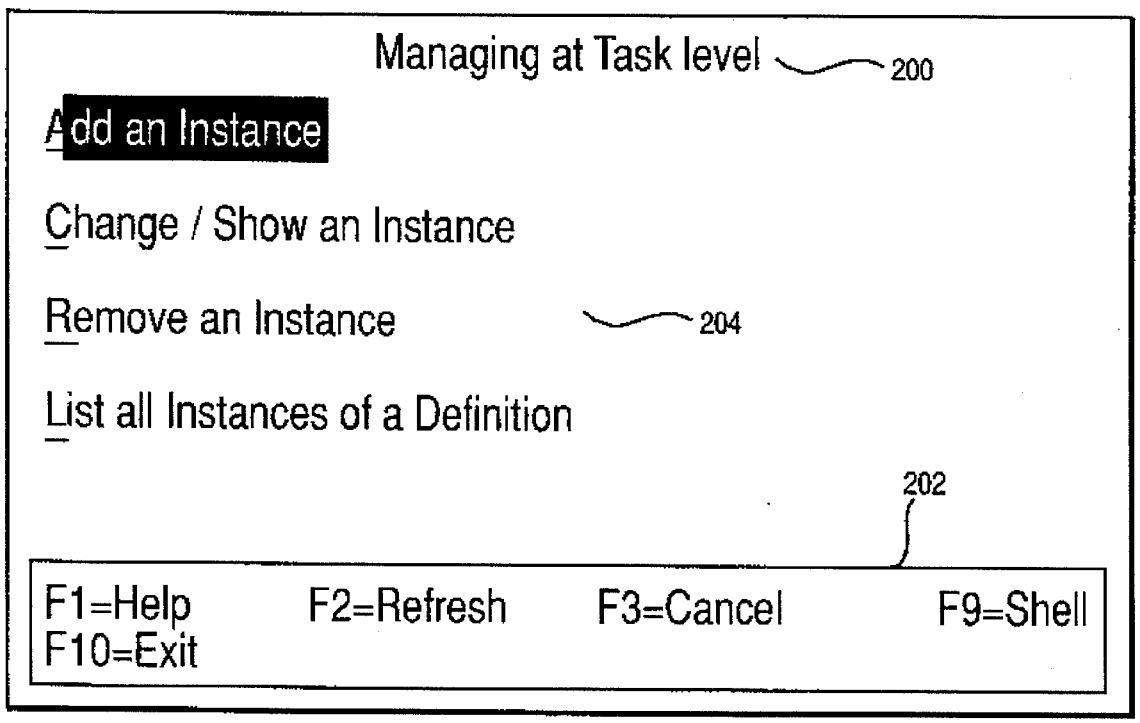
FIG. 13 shows a sample dialogue panel used by the scenario build tool to manage a task.

The scenario build tool is invoked in the traditional manner of entering a command name (e.g. aussbt) at the data processing system prompt. Upon invocation, as depicted in FIG. 12, the top line 200 of the scenario build tool displays the current menu panel or dialog panel title. At the bottom 202 of the menu or dialog panel the allowable function keys for the current menu or dialog are displayed. A list of task-oriented items is displayed in the menu panels at 204. FIG. 13 shows the resulting menu panel, after the task item was selected in FIG. 12. In the dialog panels, such as the one shown in FIG. 14, attribute names are displayed on the left and entry fields are displayed to the right.

The dialog panel allows values for attributes to be supplied. Symbols are used to indicate various types of fields. The symbols may be displayed in various places in the dialog panel.

TABLE 6

| Symbol | Meaning |
|---|---|
| [ ] | Indicates beginning and end of a typeable field. |
| < | Indicates there is more text to the left of the visible field. |
| > | Indicates there is more test to the right of the visible field. |
| * | Indicates that a value is required. |
| + | Indicates a list of choices or option ring is available. Press F4 to display list or tab to toggle through the option ring. |
| @ | Indicates the attribute is read-only. |
| # | Indicates a real or integer value is required. |

EXAMPLE

FIG. 12 is an example of what the first menu panel of the scenario build tool looks like. The function keys 202 along the bottom of the screen vary from panel to panel. However, the five function key definitions on this main menu remain consistent throughout the panels in the preferred embodiment. Context sensitive help on a per panel basis is always available with the F1 213 key. The F2 215 key is used to refresh the screen. The F3 217 and ESC (not shown) keys always move back a panel. The F9 key 219 temporarily exits to the shell (return by typing 'exit'), and the F10 key 221 will quit the scenario build tool at any panel.

FIG. 13 is another menu panel. This particular menu panel is accessed by selecting Task from the first menu and Manage Instances from the second menu. It can be observed from this menu panel that each of the menu items has a character with an underbar. If this character is selected on the keyboard, that item will automatically be selected.

FIG. 14 is a sample dialog panel. This particular dialog panel is what would be displayed by the scenario build tool for the task instance file previously described. To a new instance of the task definition called sample.t, the scenario developer would type aussbt to enter the build tool and then select Task, Manage Instances, Add an Instance, and select the sample.t definition. The sample.t.1 instance, and the dialog panel of FIG. 14 would then be displayed. The attributes austype 206 austaskcode 208 are all read-only during the task instance management stage. This is denoted with the '@' character 212 in the far left column. They are read-only because they are the attributes that define the scenario, and changing them would mean creating a different scenario definition, and to do that, the Task/Definition/Create option would be chosen instead. This panel only allows the instantiation of a predefined scenario (i.e. a scenario that already has an existing scenario definition file). Attributes auscompress 214, aussave 216 and ausverbose 224 have toggle rings represented by the '+' character 218 in the far right hand column. This means you can use the tab key to select a different value or use the F4 key to get a list of the possible values. Scenario driver attributes ausloops 220, austime 222, and ausverbose 224 all require numeric values. This is indicated by the '#' character 226 in the far right hand column. There is one user defined attribute, FILENAME 228, and it is required in the preferred embodiment. This is indicated by the '*' 230 in the far left-hand column. Note that FILENAME 228 also has a toggle ring ('+') 218 in the far right-hand column, indicating that a user can use the tab key to select a different value or use the F4 key to get a list of the possible values.

Once the information for this instantiation is complete, the Enter key is pressed and the instance file is actually created and can then be used to control a task scenario driver.

Scenario Driver

Figure 15:
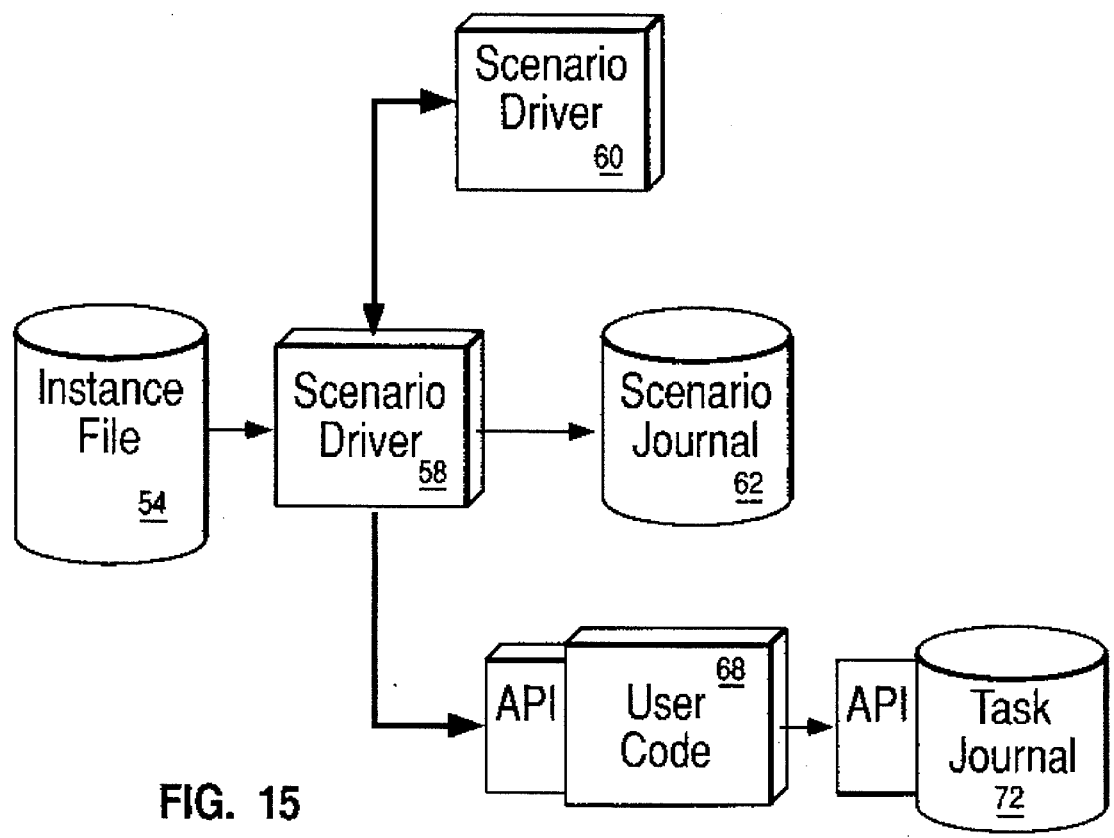
FIG. 15 shows the interactions with the scenario driver.

Referring now to FIG. 15, the scenario driver 58 is the primary component of the testing scaffold. The scenario driver can control the execution of four different scenario levels as was described above in the architectural overview.

The scenario driver is a single executable whose actions are determined by a scenario instance file 54. The instance file gives the scenario driver a sense of identity. For example, one instance will cause the scenario driver to control the execution of a fifty host networked environment scenario that executes tasks that test an entire operating system while another instance will cause the scenario driver to control the execution of a single ten line shell script that functionally verifies a specific piece of an operating system.

The advantage of the scenario driver is multi-fold. First of all, it sets up a scaffolding system that allows the automation of an entire environment scenario across multiple hosts. This scaffolding system simulates people performing daily tasks in an organization consisting of multiple hosts.

Secondly, the scenario driver handles problems that occur in system test like environments where the same tasks are being executed at the same time as the same user on the same host or in the same network. The scenario driver does its best to set up an environment in which these tasks do not interfere with each other. The third advantage of the scenario driver is that much of the code that would previously have been found in tasks is now migrated to the scenario driver. For instance, instead of each task needing code for iteration purposes, this code has been moved into the scenario driver and its interface has been standardized. The creation of working directories, and the cleaning up of the runtime area, is no longer a problem that the user task code must address. It is controlled completely and consistently at the scenario driver level, and is variable depending on the needs of the scenario.

The scenario driver also provides a set of standardized journals 62. Since the journals have a standard format, they can then be run through standard report filters to examine the execution results.

The scenario driver can be executed beginning at any level from the environment level through the task level depending on the control that is needed in the current testing environment. In the preferred embodiment, the scenario driver has a dependency that its location be provided in the PATH environment variable. By default, the scenario driver is located in the austin/tools/rsbin directory. This directory can be added to the PATH environment variable using the following command:

PATH=/austin/tools/rsbin:$PATH ;export PATH

The scenario driver provides two usage statements. The first usage statement occurs when an error is detected on the command line. The information from the usage is printed to standard error (stderr). The second usage statement is the help usage statement that occurs when the 'h' flag is passed to the scenario driver. The information from the help usage is printed to standard output (stdout). If the 'h' flag is specified with a valid task scenario instance name, the help for that instance is displayed to standard output (stdout), as will be later described. The error usage statement follows:

TABLE 7

Usage: ausdriver [–c <nlf|p|a>] [–d <t|f>]
 [–e ExcString] [–l Loops]
 [–m <s|c>] [–r RunString] [–s <nlf|p|a>] [–t Hours]
 [–u User] [–v Level] [–w <t|f>] <instance>

For driver help, a user would enter:

ausdriver -h

For task help, a user would enter:

ausdriver -h <task_instance>

The information provided when the 'h' flag is passed to the scenario driver with no <task_instance>follows:

TABLE 8

Project AUSTIN V1.00

Usage: ausdriver [command_options] <instance>
The ausdriver command_options are:

| | |
|---|---|
| –c <nlf|p|a> | Compress option (n—none, f—fail, p—pass, a—all). |
| –d <t|f> | Distributed environment (t—true, f—false). |
| –e | ExcString Excludes instances mapped to the integers in ExcString. |
| –h | Gives help on task if the instance is on the command line, otherwise, prints out message describing all possible options. |
| –l Loops | Loops to execute for. |
| –m <s|c> | Mode of execution (s—sequential, c—concurrent). |
| –r RunString | Executes instances mapped to the integers in RunString. |
| –s <nlf|p|a> | Save option (n—none, f—fail, p—pass, a—all). |
| –t Hours | Hours to execute for. |
| –u User | User to execute the person scenario as. |
| –v Level | Sets the verbosity to the value of Level (0-7). |
| –w <t|f> | Window option (t—true, f—false). |

For driver help, enter:
 ausdriver –h
For tast help, enter:
 ausdriver –h <task_instance>

The following defines the set of configurable scenario driver options. The configuration options communicate to the scenario driver 58 what test scenario level it is controlling, what it is to execute, and how it is to perform the execution. All configuration options can be communicated to the scenario driver by specifying them in the scenario instance file 54 that is associated with each scenario driver. Some of these configuration options can also be specified by command line flags when the scenario driver is called directly from the command line. In most situations however, unless the task driver is being executed stand-alone or the scenario driver that is being executed is the top level scenario driver in the scenario, the scenario drivers are called by higher level scenario drivers and thus they receive most of their configuration information from their associated instance. However, if command line flags that have been passed to the higher level scenario driver are pertinent, that scenario driver will automatically pass them to the scenario drivers it executes. Command line flag configuration attributes will override any instance file configuration attributes if there is a conflict. If the same flag is specified multiple times on the command line, or if the same attribute is specified multiple times in the instance, a warning message is issued and the last flag or attribute is used.

Each attribute below is described first by the English phrase associated with the attribute. On the same line as the configuration attribute name in parenthesis can be found the corresponding scenario instance file attribute name and the command line flag if it exists. Following the configuration attribute name is a table that shows at which scenario driver levels the attribute is pertinent, which scenario driver levels it is required, and its default value at each level. The syntax for the instance attribute is then given and the syntax of the command line flag is given if there is one associated with the attribute. Next, a description of the attribute is given, and in most cases, there are examples showing how to use the attribute.

The following is the syntax used throughout this section:

TABLE 9

| | |
|---|---|
| <op1> | Indicates that op1 is required and <op1> is replaced by user's data. |
| [op1] | Indicates that op1 is optional and [op1] is replaced by user's data. |
| op1 ¦ op2 | Indicates logical or-ing of op1 and op2. |
| op1 . . . | Indicates zero or more of op1. |
| N/V | Indicates that the attribute has no default value. |
| italics | Italicized words are replaced by user's value. |
| bold | Bold faced text indicates that the text should be taken literally |

TABLE 10

| Begin Hook (ausbeghook) | | | | |
|---|---|---|---|---|
| | Environment | Machine | Person | Task |
| Required | NO | NO | NO | NO |
| Default | — | — | — | — |

Instance Attribute Syntax ausbeghook="<begin_hook>"

Command Line Syntax

None

Description

The begin hook provides a way in which user code can automatically be executed by the scenario driver prior to the scenario driver executing the next level of scenario drivers or the user task code. The begin hook would typically be used do some type of automated setup specific to the test scenario that is being executed. This allows customization of test scenarios. To perform the execution of the begin hook, the scenario driver passes the information in the double quoted string denoted by <begin_hook> in the syntax diagram above to the system for evaluation. If a return code other than zero is received from the begin hook, the scenario driver terminates execution and passes control back to its parent scenario driver (or the AIX shell if it was the top level scenario driver).

EXAMPLE 1 ausbeghook="/austin/tool s/rsbin/setup"

In this example, the begin hook /austin/tools/rsbin/setup would be executed. If the program returns a return code other than zero, the scenario driver halts execution as described above. If /austin/tools/rsbin was already in the system path (via the PATH environment variable), the begin hook could have been specified as follows:

ausbeghook="setup"

EXAMPLE 2 ausbeghook="check. tcpip; check nfs"

This example is a little more complicated. The string is sent to the system, and instead of one program getting executed, two programs will get executed sequentially. The two programs are actually the same program (check), but it is getting passed different parameters each time. The return code from the second of these programs will be returned from the begin hook execution. If, it is important that the scenario driver halts if either of these two programs fail, the developer could create a shell script that calls each of these programs, checking their return codes, and would then exit with that return code. The name of that shell script would then be placed in the ausbeghook.

TABLE 11

| User's Base Code Directory (auscodedir) | | | | |
|---|---|---|---|---|
| | Environment | Machine | Person | Task |
| Required | N/V | N/V | N/V | NO |
| Default | N/V | N/V | N/V | See Description |

Instance File Syntax auscodedir="<directory>"

Command Line Syntax

None

Description

The user's base code directory provides a way for the task developer to indicate the location of the task code if it does not reside in the default location. The string contains the value of the base level directory where the developer's task directory structure resides for the current task. The default value for this scenario driver attribute is computed by the task scenario driver at runtime using the location of the scenario's task directory structure (see section 4.5) and the name of the current instance. The directory is set to:

<scenario's_task_directory_structure>/<first_letter_of_the_instance> /<instance_base>
where the <instance_base> is the instance name without the '.t.<int>'extension (see section 5.1).

EXAMPLE 1

For example, if the task scenario driver is executed with the instance sampletask.t.1, and the default AUSTIN directory structure has not been modified by environment variables, the default task code directory structure for the sampletask.t.1 instance would be /austin/tasks/s/sampletask.

Beneath that directory structure should reside the bin, dat, doc, and src directories that form each task code directory structure.

EXAMPLE 2

If the task developer wished to have the tasks located in a different location because the tasks were in the task development stage, this could be accomplished by changing the auscodedir attribute. For example, if the developer was storing all the tasks in a directory named tasks in the home directory, the base code directory for the task named sampletask might be /u/username/tasks/sampletask. Beneath that directory the directories bin, dat, doc, and src would reside. To inform the scenario driver that this change has taken place, the attribute auscodedir would look as follows in the scenario instance file:

TABLE 12 auscodedir = "/u/username/tasks/sampletask"

Compression (auscompress, -c)

|  | Environment | Machine | Person | Task |
|---|---|---|---|---|
| Required | NO | NO | NO | NO |
| Default | none | none | none | none |

Instance File Syntax auscompress=<none¦pass¦fail¦all>

Command Line Syntax

-c<n¦p¦f¦a>

Description

The scenario driver compression configuration attribute determines whether or not saved task information is compressed following the execution of a task. If the value of the scenario driver save option (see section 7.2.12) is such that the task information is saved after the user task code is done executing, the compression option determines whether it will be compressed. The compression determination is based on whether the user's task passed or failed and the value of the compression attribute. Compression can be set with the auscompress instance attribute or the 'c' command line flag to never perform compression (none or n), perform compress on passed tasks only (pass or p), perform compression on failed tasks only (failed or f), or always perform compression (all or a). The compression algorithm uses the AIX tar command to make the entire unique task working directory structure into a single unique file and then uses the AIX compress command to compress that file. This is a valuable option for an environment where information needs to be saved but the amount of information created during the scenario execution stage can be immense after running for extended periods of time.

Two utilities exist that allow the compressed information to be uncompressed and recompressed (see section 12.1, 12.2).

EXAMPLE 1

A scenario where thousands of tasks are going to be executing for multiple days might want to set the compression attribute such that all the task runtime information for the entire environment gets compressed. To do this, the auscompress attribute would be set to all in each of the machine instance files. Information in machine instance files automatically filters down to each of the task scenarios that are in the machine scenario. The following line would have this effect in the machine scenario instance files:

auscompress=all

EXAMPLE 2

In another situation, an environment scenario might be executing that has hosts that have varying hard disk resources. In this situation, the compress option might be set so that a host that has a massive amount of disk space compresses nothing (none or n), but a machine that has a small amount of disk space compresses everything (all or a). To accomplish this, the following attribute would be placed in the instance file of the host that has few disk resources:

auscompress=all and the following attribute would be placed in the instance file of the machine that has a lot of disk resources:

auscompress=none

EXAMPLE 3

In this example, the machine scenario that is running very rarely looks at passed task information, so that information could be compressed by placing the following attribute in the machine scenario instance file:

auscompress=pass

EXAMPLE 4

It is important to note that the same task that is executing in an environment may have different compression options because it is associated with different instance files. For instance, the task rcp that executes on two different machines could have completely separate compression attributes because the first of the two task instances is associated with an instance that sets the compression attribute to pass, thus it only compresses the task files when the task passes. This would be done with the following scenario instance attribute:

auscompress=pass

The second instance of the task is associated with an instance file that sets the compression algorithm to all, thus all task files are compressed without respect to their success. This would be done with the following scenario instance attribute:

TABLE 13 auscompress = all

Description (ausdesc)

|  | Environment | Machine | Person | Task |
|---|---|---|---|---|
| Required | NO | NO | NO | NO |
| Default | — | — | — | — |

Instance File Syntax ausdesc="<description>"

Command line Syntax

None

Description

The ausdesc attribute allows the information entered into the scenario build tool at scenario instance file creation time that describes each defined scenario to be kept in the instance file. This data is for informational purposes only. It is the "text" that describes the differences between instances.

33

EXAMPLE

The following is a sample description text for a scenario instance file:

ausdesc="This instance sets the compress attribute to pass and save to all."

The following is another sample description text from a different scenario instance file that originated from the same scenario definition file:

ausdesc="This instance sets the compress attribute to all and save to all."

Distributed Runtime File Space (ausdistributed, -d)

TABLE 14

|  | Environment | Machine | Person | Task |
|---|---|---|---|---|
| Required | NO | N/V | N/V | N/V |
| Default | false | N/V | N/V | N/V |

Instance File Syntax ausdistributed=<true¦false>

Command Line Syntax

-d<t¦f>

Description

The distributed runtime file space attribute communicates to the environment scenario driver whether the intention is for the environment scenario to be executing with a distributed /austin/runtime file space or whether the /austin/runtime file space resides at each machine in the network.

Note that no mounts are actually done by the scenario driver whether the distributed attribute is true or false. The value only communicates to the scenario driver what the user's intention is with respect to distributing the file space during the scenario execution stage. The actual distribution of the /austin/runtime file space is a good application of the begin hook.

EXAMPLE 1

The following is an excerpt from an environment scenario instance file that is not distributing the /austin/runtime file space during the scenario execution stage:

ausdistributed=false

EXAMPLE 2

The following is an excerpt from an environment scenario instance file that is distributing the /austin/runtime file space during the scenario execution stage:

ausdistributed=true

TABLE 15

| End Hook (ausendhook) | | | |
|---|---|---|---|
| Environment | Machine | Person | Task |

| Required | NO | NO | NO | NO |
|---|---|---|---|---|
| Default | — | — | — | — |

34

Instance File Syntax ausendhook="<end_hook>"

Command Line Syntax

None

Description

The end hook provides a way in which user code can automatically be executed by the scenario driver after executing the next level of scenario drivers or the user task code. Other than the time that the hooks get executed, the same information applies to both the begin and end hooks (see section 7.2.1).

TABLE 16

| User Defined Journals (ausjournals) | | | |
|---|---|---|---|
| Environment | Machine | Person | Task |

| Required | NO | NO | NO | NO |
|---|---|---|---|---|
| Default | — | — | — | — |

Instance File Syntax ausjournals="[<env_var:journal_name¦journal_name>. . . ["

Command Line Syntax

None

Description

The ausjournals attribute is used to define any journals that the user's task code may want to use other than the default standard journal file that the journal commands write to. Prior to executing the user's task code, the task scenario driver will set environment variables, based on the value of the ausjournals reserved attribute. These environment variables contain the path of the user defined journal. This path is in the jour directory of the unique task runtime directory structure. This directory contains the standard task journal (named task.journal) and each of the user defined journals defined with the ausjournals command. The actual location of these files is not pertinent to the user's task code since the user refers to the journals using environment variables.

The syntax for the ausjournals command is somewhat complex at first glance, but the following description and the examples should help to convey its meaning. The value of the ausjournals command is a double quoted string that contains a list of one or more items. These items can have either the format env_var:journal_name or simply journal_name. The scenario driver parses through this list of items and if the first form is found, it sets an environment variable named env_var equal to the path of the current jour directory followed by the file name journal_name. If the second form of the item is found, the scenario driver sets an environment variable which is the uppercase version of the journal_name equal to the path of the current jour directory followed by the file named journal_name. In this case, the env_var is capitalized to follow "normal" UNIX environment variable naming conventions.

EXAMPLE 1

In this example, the task developer requires the use of three journals for his/her task other than the default journal file. The value he/she might supply for ausjournals follows:

ausjournals="Spooljour:spooljour cmdjour DiffResults:diff_jour"

This value contains both of the forms discussed above. The scenario driver would read this instance attribute and then set the following three environment variables to the values shown:

Spooljour="/austin/runtime/<scenariodir>/working/<taskdir>/jour/spooljour"
CMDJOUR="/austin/runtime/<scenariodir>/working/<taskdir>/jour/cmdjour"
DiffResults="/austin/runtime/<scenariodir>/working/<taskdir> >/jour/diffjour"

EXAMPLE 2

In this example, the scenario developer needs two journals named elog and klog. The following would be specified in the task scenario instance file:

ausjournals="elog klog"

This would result in the following environment variables with the following values:

ELOG="/austin/runtime/<scenariodir>/working/<taskdir>jour/elog"
KLOG="/austin/runtime/<scenariodir>/working<taskdir>/jour/klog"

The user could then write to these files. The following is an excerpt from a shell script that uses the above files:

ls -alt foofile>$ELOG diff $ELOG $AUSCODEDAT/expected.results>>$KLOG if ["$?"!="0"]; then auserror "The ls -alt foofile command failed." else auslog "The ls -alt foofile command was successful." fi

TABLE 17

| Loops to execute (ausloops, -l) | | | | |
| --- | --- | --- | --- | --- |
| | Environment | Machine | Person | Task |
| Required | NO | NO | NO | NO |
| Default | 1 | 1 | 1 | 1 |

Instance File Syntax ausloops=<integer>

Command Line Syntax

-l <integer>

Description

The loops to execute attribute communicates to the scenario driver how many times to execute the instances in the scenario attribute ausobjlist (see section 7.2.10) or how many times to execute the user's task code in the scenario attribute austaskcode (see section 7.2.13). Note that there is also a time to execute attribute. If both are specified within the same instance file or on the command line, the time to execute attribute takes precedence. If either is specified on the command line, they will take precedence over either in the scenario instance file. The integer value for ausloops must be positive.

EXAMPLE

If the loops to execute attribute has the following value in a task scenario instance file that was executed by a person scenario driver:

ausloops=20 the user task code will be executed 20 times before returning control to the person driver. The sequence of operation would find the person driver executing its begin hook, and then executing the task driver. The task driver would execute its begin hook, and then execute its user task code twenty times, execute its end hook, and then return control to the person scenario driver. If the person scenario driver had a loops value of more than one, the task scenario driver would then be executed again and it would go through the same process a second time, executing its begin hook, its user task code twenty times, its end hook, and then return execution control back to the person scenario driver.

TABLE 18

| Execution mode (ausmode, -m) | | | | |
| --- | --- | --- | --- | --- |
| | Environment | Machine | Person | Task |
| Required | NO | NO | NO | N/V |
| Default | sequential | sequential | sequential | N/V |

Instance File Syntax ausmode=<concurrent¦sequential>

Command Line Syntax

-m<c¦s>

Description

The execution mode attribute allows lower level scenario drivers to be executed sequentially or concurrently. If concurrent is specified, the scenario driver will begin the execution of all the instances in its ausobjlist (see section 7.2.10) at the same time and wait for them all to finish. If sequential is specified, the scenario driver executes the instances in ausobjlist sequentially. Once all objects in the just have executed and finished, whether it was concurrent or sequential, that makes up one loop of the scenario driver.

EXAMPLE 1

If a person scenario consists of five task scenarios, and had the following value in the person scenario instance file:

ausmode=concurrent it would begin the execution the five task scenarios concurrently. If the person scenario file was set to loop twice with the following attribute:

ausloops=2 it would wait for each of the five tasks to complete their execution and then it would begin the same process a second time. By the end of the second iteration, the five tasks would have each been executed two times. It is important to note that when concurrent execution is used, a second iteration of all the lower level drivers is not begun until each of the previous executions of those drivers has completed. Thus, if four of the five task scenarios in this example took only 10 minutes to complete and the fifth took 30 minutes, two iterations of the person scenario would take a full hour. After beginning execution, the first four would finish after ten minutes and the fifth would continue executing for another 20 minutes before the five tasks would be executed for the second time.

EXAMPLE 2

Using the example above of a person scenario with five tasks, four of which take ten minutes to execute and one of which takes thirty, this example shows the length of time it would take the same person scenario to execute two loops in sequential mode. To cause the driver to execute in sequential mode, the following attribute would be used in the person scenario instance file:

ausmode=sequential

The five tasks would be executed back to back, thus each iteration of the person scenario would take approximately seventy minutes. Thus, the two iterations of the person scenario would take approximately one-hundred forty minutes, or more than double the amount of time the concurrent execution took.

TABLE 19

| Object list (ausobjlist) | | | | |
|---|---|---|---|---|
| | Environment | Machine | Person | Task |
| Required | YES | YES | YES | N/V |
| Default | N/V | N/V | N/V | N/V |

Instance File Syntax ausobjlist="<instance> . . . "

Command Line Syntax

None

Description

The object list attribute is very important to the scenario drivers that execute other scenario drivers (environment, machine, and person). The object list instance attribute named ausobjlist contains a list of one or more items. These items are the names of the instances that describe scenarios that the current scenario driver will control. When the scenario driver is ready to begin execution of other scenario drivers that run lower level scenarios, it goes through the ausobjlist and executes a scenario driver passing it the name of the current instance. The object list is what defines a scenario at the top three test scenario levels because it contains the core of what the test scenario will be executing.

EXAMPLE

In this example, a machine scenario is executing and its object list is the following:

ausobjlist="person1.p.1 person1.p.2 person2.p.1 "

After running through the scenario driver steps, the machine scenario driver will get to the point where it is ready to execute the lower level scenario drivers. To do this, it will examine the list above and begin three scenario drivers, either concurrently or sequentially that will be passed the instances person1.p.1, person1.p.2, and person2.p.1 respectively. This will cause three person scenario drivers to be executing and those scenario drivers will be controlled by the current machine scenario driver. Note that person1.p.1 and person1.p.2 are two instances of the same person.

TABLE 20

| Object Number List (ausobjnumlist, -e, -r) | | | | |
|---|---|---|---|---|
| | Environment | Machine | Person | Task |
| Required | NO | NO | NO | N/V |
| Default | See Description | See Description | See Description | N/V |

Instance File Syntax ausobjnumlist="<integer> . . . "

Command Line Syntax

-r<integer>¦-r "<integer><integer>. . . "
-e<integer>¦-e "<integer><integer>. . . "

Description

The object number list allows members of the ausobjlist attribute to be executed or excluded from the current scenario execution. This is done by specifying a list of integers that map to the items in the ausobjlist. By default, the object number list attribute is set to the list of integers corresponding to all the instances in the ausobjlist attribute, thus during execution, they will all get executed. The object number list configuration attribute is provided to allow a configurable object list during the instance creation/modification stage yet keep the template of instances in the ausobjlist unchanged since that list is what "defines" the current scenario and should not be modifiable during the instance management part of the scenario build tool.

EXAMPLE 1

If a person instance contained the following ausobjlist and ausobjnumlist:

ausobjlist="task1.t.1 task2.t.1 task3.t.1 task4.t.1 task5.t.1 task6.t.1"
ausobjnumlist="1 2 3 6"

when the person scenario driver executes, it will only begin four task scenario drivers although there are six task instances in the ausobjlist for that person because the ausobjnumlist has only four integers in it. The four tasks that will be executed will be task1.t.1, task2.t.1, task3.t.1, and task6.t.1, thus members four and five of the ausobjlist would be excluded.

EXAMPLE 2

If the person scenario driver described above was executed with -r "1 2 3 4 5 6" on the command line, then the command line flag would override the ausobjnumlist instance attribute and all six task scenario drivers would be executed.

EXAMPLE 3

Now, if the person scenario driver was described above was executed with -e "1 6" on the command line, the command line flag would again override the ausobjnumlist instance attribute and the first and sixth member of the ausobjlist would be excluded from execution and thus the rest of the tasks in the list would be executed.

TABLE 21

| Save (aussave, -s) | | | | |
| --- | --- | --- | --- | --- |
| | Environment | Machine | Person | Task |
| Required | NO | NO | NO | NO |
| Default | all | all | all | all |

Instance File Syntax aussave=<none¦pass¦fail¦all>

Command Line Syntax

-s<n¦p¦f¦a>

Description

The save option is used to communicate to the task level scenario driver whether or not to save the unique runtime directory structure that was created for the task execution. The decision on whether to save the task runtime information is based on whether the user's task passed or failed and the value of the save attribute. The save attribute can be set with the aussave instance attribute or the 's' command line flag to never perform the save (none or n), perform the save on passed tasks only (pass or p), perform the save on failed tasks only (fail or f), or always perform the save (all or a). The save function works hand in hand with the compression function to determine what information is saved at task runtime and what information gets compressed that is saved.

EXAMPLE

A machine scenario may want to keep only the task information in the machine scenario from tasks that fail. In this situation, the machine instance attribute aussave would be set as follows:

aussave=fail

Note that although this attribute isn't really doing anything at the machine scenario driver level, it is passed on down to the task scenario driver level where it is then used to determine whether or not to remove or save the task runtime directory structure.

TABLE 22

| Task Code (austaskcode) | | | | |
| --- | --- | --- | --- | --- |
| | Environment | Machine | Person | Task |
| Required | N/V | N/V | N/V | YES |
| Default | N/V | N/V | N/V | N/V |

Instance File Syntax austaskcode="<task_file_name>"

Command Line Syntax

None

Description

The task code parameter is vital to the execution of the task scenario driver. It is similar to the object list parameter that was specified for the other three scenario driver levels in that it contains the information detailing what is to be executed. The difference between the object list configuration attribute and the task code parameter is that the task code parameter contains the actual file name of the user's code that it is to execute.

The actual path to the task file name should not be specified because the location of this file is determined in the following way: The runtime task bin directory structure denoted by $AUSBIN is checked first followed by the bin directory of the task code directory structure denoted by $AUSCODEBIN.

EXAMPLE

If the rcp task was executed by running the shell script foobar whose location was /austin/tasks/r/rcp/bin/foobar, the following would be specified for the austaskcode attribute in the task scenario instance file:

austaskcode="foobar"

TABLE 23

| Task Parameters (austaskparams) | | | | |
| --- | --- | --- | --- | --- |
| | Environment | Machine | Person | Task |
| Required | N/V | N/V | N/V | NO |
| Default | N/V | N/V | N/V | — |

Instance File Syntax austaskparams=parameters>"

Command Line Syntax

None

Description

Although the testing scaffold is set up primarily around passing information to user task code via user defined attributes that are mapped into environment variables, the scenario driver and the scenario build tool also support the ability to pass parameters to the user task code via command line parameters. To do this, the task parameters configuration attribute is used. The value of this scenario driver instance attribute is passed directly on the command line when the user task code is executed.

EXAMPLE

If the user task code for a task was foobar, and it needed a magnitude parameter passed via the command line, the following attributes from the instance file would handle this situation:

austaskcode="foobar" austaskparams="-m 20"

When the command foobar was executed, it would be executed with "-m 20" appended to the command line.

TABLE 24

| Time to execute (austime, -t) | | | | |
| --- | --- | --- | --- | --- |
| | Environment | Machine | Person | Task |
| Required | NO | NO | NO | NO |
| Default | — | — | — | — |

Instance File Syntax austime=<reallinteger>

Command Line Syntax

-t <real|integer>

Description

The austime attribute specifies the length of time that the user wishes to continue executing the scenario driver. When austime is specified, the scenario driver will execute the items in its ausobjlist or austaskcode, and wait for their completion. Upon completion of all instances, the scenario driver will check to see if the time elapsed since the scenario driver's start time is less than the time specified by the time attribute. If it is, the scenario driver will execute all items in the ausobjlist again. Note that the value for the time attribute must be positive.

EXAMPLE

If the task developer specifies two hours as the time to execute a task for, and the user's task code takes approximately forty-five minutes to execute, then the entire task will execute for three iterations or approximately two hours and fifteen minutes. As was stated in the description, this occurs because after the second iteration, time still remains, so the next iteration is begun, but following that iteration, the time to execute has run out, so execution is halted.

TABLE 25

| Scenario Driver Type (austype) | | | | |
|---|---|---|---|---|
| | Environment | Machine | Person | Task |
| Required | YES | YES | YES | YES |
| Default | N/V | N/V | N/V | N/V |

Instance File Syntax austype=<environment|machine|person|task>

Command Line Syntax

None

Description

The scenario driver type attribute is the most important instance attribute. It tells the scenario driver which scenario level is executing. This is very important because the scenario driver's actions vary depending on what scenario level it is executing.

TABLE 26

| User (aususer, -u) | | | | |
|---|---|---|---|---|
| | Environment | Machine | Person | Task |
| Required | N/V | N/V | NO | N/V |
| Default | N/V | N/V | Current User | N/V |

Instance File Syntax aususer="<user_name>"

Command Line Syntax

-u <user_name>

Description

The user attribute allows a group of tasks to be executed as the user user_name. If this attribute is used at the person level, the scenario driver will attempt to change to the user user_name before executing the task instances in the ausobjlist. If this user change is unsuccessful, the scenario driver will issue an error and return control to the machine driver (or the AIX shell if it was the top level scenario driver).

TABLE 27

| Verbosity (ausverbose, -v) | | | | |
|---|---|---|---|---|
| | Environment | Machine | Person | Task |
| Required | NO | NO | NO | NO |
| Default | 5 | 5 | 5 | 5 |

Instance File Syntax ausverbose=<integer>

Command Line Syntax

-v <integer>

Description

The verbosity option allows varying degrees of information to be placed in the journals and to be sent to standard output (stdout) and standard error (stderr). The varying levels of verbosity are accomplished through the manipulation of the journalizing commands. There are eight total degrees of verbosity.

TABLE 28

| Windows (auswindows, -w) | | | | |
|---|---|---|---|---|
| | Environment | Machine | Person | Task |
| Required | NO | NO | NO | NO |
| Default | — | — | — | — |

Instance File Syntax auswindows=<true|false>

Command Line Syntax

-w<t| f>

Description

The windows configuration attribute determines whether or not the scenario driver should try to take advantage of a windowing environment if it is present. If the value is true, and the DISPLAY environment variable is set, every time the scenario driver executes the members of it it's ausobjlist, thus beginning a new scenario driver, it attempts to open up the new scenario driver in a different window.

User Defined Attributes

User defined attributes can be specified at any level in the test scaffolding. They are inherited by the lower levels from the machine level on down. They are specified by placing an identifier in the scenario instance file that is not a scenario driver attribute and then giving it a value. If one of the drivers encounter a user defined attribute in a configuration file, it simply places the user defined attribute into the environment, thus it is inherited to any child processes that get executed.

The concept of user defined attributes is particularly useful at the task instance scenario file level in passing information to the user task code. As was stated in section 5, the contents of the user defined attributes can be tightly controlled through the scenario build tool because the user defined attributes are defined during the scenario definition stage and must be given a type and an optional or required flag. The user defined attributes can also be defined to have restrictions and a default value. In addition to using user defined attributes at the task level, they are perfectly valid at all the other levels. This capability allows user defined attributes to be specified only once at the person scenario level and then used by each of the task scenarios that make up the person scenario.

An entire machine scenario could use an environment variable such as SCALEFACTOR to determine the level of stress that all the task scenarios that make up that machine scenario are executing at.

Attribute Summary

The following is a table of the complete set of driver attributes and what level those attributes are valid. Grey represents that the particular attribute is valid at the given scenario level while black represents it is not. Attributes that are valid can also be REQUIRED and thus must be specified at the given level. A few attributes are valid at the given driver level but do nothing but pass their value to the next scenario (these attributes are represented by the arrows).

TABLE 29

Reserved Attribute Summary Information

| Attribute | Environment | Machine | Person | Task |
|---|---|---|---|---|
| ausbeghook | | | | |
| auscodedir | N/V | N/V | N/V | |
| auscompress, -c | => | => | => | |
| ausdesc | | | | |
| ausdistributed, -d | | N/V | N/V | N/V |
| ausendhook | | | | |
| ausjournals | N/V | N/V | N/V | |
| ausloops, -l | | | | |
| ausmode, -m | | | | N/V |
| ausobjlist | REQUIRED | REQUIRED | REQUIRED | N/V |
| ausobjnumlist, -r, -e | | | | N/V 4 |
| aussave, -s | => | => | => | |
| austaskcode | N/V | N/V | N/V | REQUIRED |
| austaskparam | N/V | N/V | N/V | |
| austime, -t | | | | |
| austype | REQUIRED | REQUIRED | REQUIRED | REQUIRED |
| aususer, -u | N/V | N/V | N/V | N/V |
| ausverbose, -v | => | => | => | |
| auswindows, -w | => | => | => | N/V |

The following is the sequence that the scenario driver executes independent of its scenario level:
1. Perform all the necessary internal initialization.
2. Create a temporary journal file if needed.
3. Parse the command line.
4. Give scenario driver detailed help if the 'h' flag is found and no instance file is present.
5. Read the instance attributes.
6. Check the validity of the instance reserved attributes.
7. Place all user defined attributes found in the instance file into the environment.
8. Determine the scenario driver configuration attributes for the current level.
9. Show task help if asked for.
10. Execute the begin hook if present.
11. Perform scenario setup functions if this is the top level scenario driver.
12. Make the necessary modifications to the ausobjlist if the need exists.
13. Execute the next level (this is step where looping will occur).
14. Execute the end hook if present.
15. Exit with a return code signifying execution status.

Environment Scenario Driver

Figure 16:
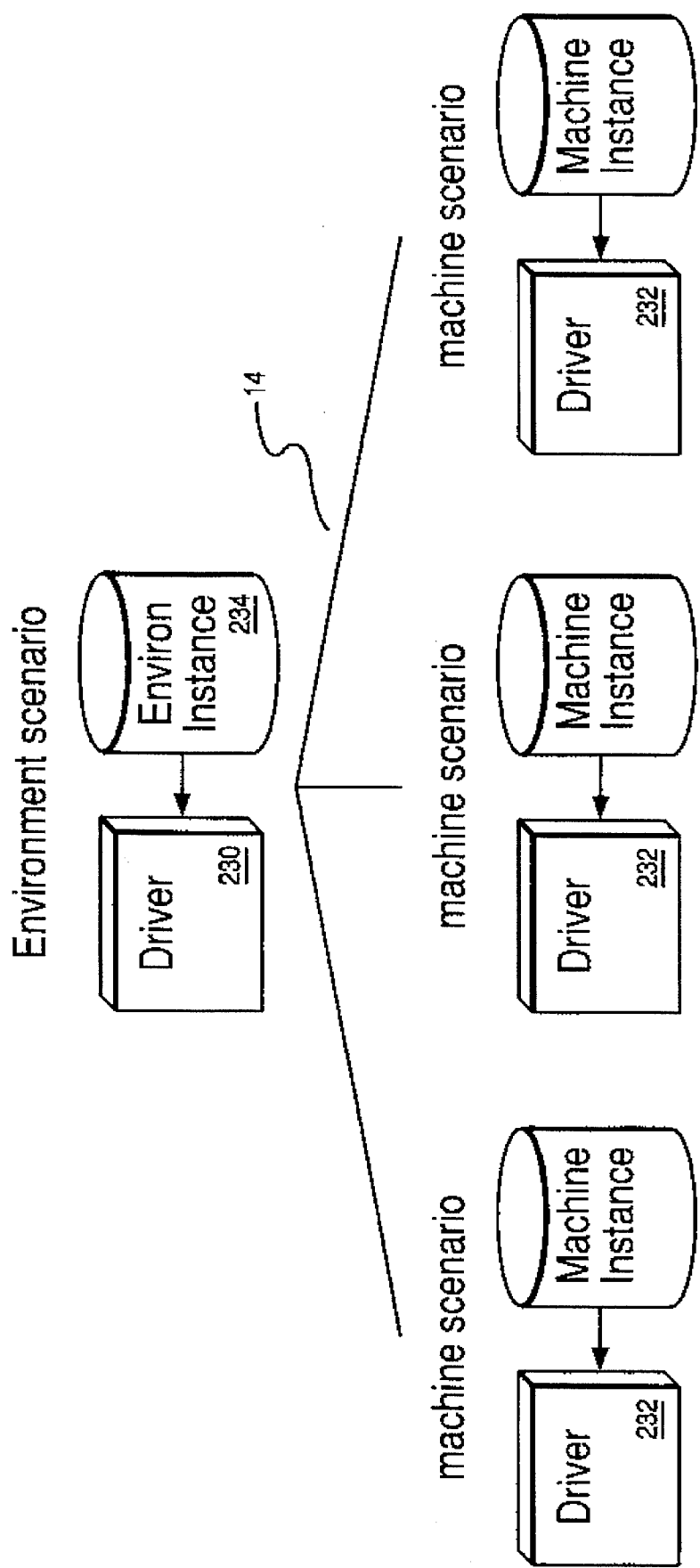
FIG. 16 depicts the top hierarchical level, the environment scenario, of the testing scaffold.

Referring now to FIG. 16, the environment scenario driver 230 (and also the 12 within block 22 of FIG. 1) is used when automated testing control is needed on a cluster of hosts. One of the hosts in the environment should be designated as the environment server and the other hosts in the environment should be designated as environment clients. The environment server is the host that the environment scenario driver executes on and the environment clients are the hosts that the machine scenario drivers execute on (note that the environment server could also be an environment client).

The environment scenario driver relies on internet sockets and a daemon named ausdriverd, as previously described, on the environment clients for communication 14. This communication method is required to allow the environment scenario driver 230 to initiate the execution of the machine scenario drivers 232 on the environment clients and to receive the return codes from the machine scenario drivers once they have finished execution.

Assuming the default directory structure and a RISC System/6000 platform, the following command can be used to start the scenario driver daemon on the environment clients in the network:

/austin/tools/rsbin/ausdriverd &

If the invention of the environment scenario is to execute all of its machine scenarios in X-Windows taking full advantage of concurrent xterms, the ausdriverd daemon should be started with the DISPLAY environment variable of the X-Windows server already set in the environment. This can be done several different ways.

First of all, if X-Windows is started, executing the ausdriverd command in one of the xterms will have this effect since the initialization of X-Windows sets the DISPLAY environment variable to the X-Server. This is the safest method of assuring that the ausdriverd daemon has the DISPLAY environment variable in its environment and that the variable has the correct value; however, it is also more difficult to automate.

If it is known that the X-Server will always be the same, for instance, unix:0, then an alternative method is recommended. Create a file named/etc/rc.aus and place in it the following command:

DISPLAY=unix:0 ausdriverd & and then add the following command to the end of the /etc/inittab file:

rcaus: 2: wait: sh /etc/rc. aus

This will result in the ausdriverd daemon getting executed at boot time with the DISPLAY environment variable set to the predetermined X-Server, unix:0.

The instances 234 in the environment scenario driver's object list (ausobjlist) have special significance. The name of the instance (prior to the.m.<int>, as described above) must be the host name of the machine that the instance is going to be executed on. Thus, for an environment scenario driver 230 to begin execution of a machine scenario 232 on the machine named foobar, the name of one of the instances 234 in the environment scenario driver's object list (ausobjlist) must be 'foobar.m.<int>' where <int> is the specific foobar machine scenario instance number. The environment scenario driver assumes that foobar is the name of the host where the foobar.m.<int> machine scenario should be executed.

There are many ways in which the file system can be distributed in a cluster at runtime. For instance, one possibility is for the entire file system to be located on each host in the network. Another possibility is for the file system to be physically located on a single host in the network and then be distributed via the Network File System (NFS) (or an equivalent) to all the hosts in the network, as is commonly known in the art. However this distribution is done, it is required that all of the information be present on all the hosts in the network in the same location.

The environment scenario driver performs different actions depending on whether the /austin/runtime directory structure is distributed or not during the environment scenario execution. If the structure is distributed (via NFS or something like NFS), then whenever any of the scenario drivers executing on any of the hosts in the entire environment write to the scenario journal file, the physical write will actually occur on the same file which is located on the /austin/runtime directory structure server.

If the environment scenario does distribute the /austin/runtime directory structure with something like NFS, the ausdistributed reserved attribute in the environment scenario instance file should be set to true.

The begin and end hooks at the environment scenario driver level can be used as very integral pieces to the execution of the environment scenario and to customize the scenario driver execution to a specific environment. For instance, the begin hook could run scripts that automatically do an entire set of environment setup like getting tasks, establishing network mounts, verifying network readiness, beginning X-Windows on all the clients, verifying the existence of the ausdriver daemon on all the clients, etc. The end hook could gather up status files, automatically run reports, clean up the environment by taking down network mounts, etc.

If the environment scenario driver 230 loses contact with a machine scenario driver 232 for some reason, such as the host which the machine scenario was running on crashing or the network interface failing, the environment scenario driver will never finish because its wait implementation is currently stateless. It will continue waiting until it receives word from the machine scenario driver via the internet socket communication medium that the machine scenario driver is finished executing.

Machine Scenario Driver

Figure 17:
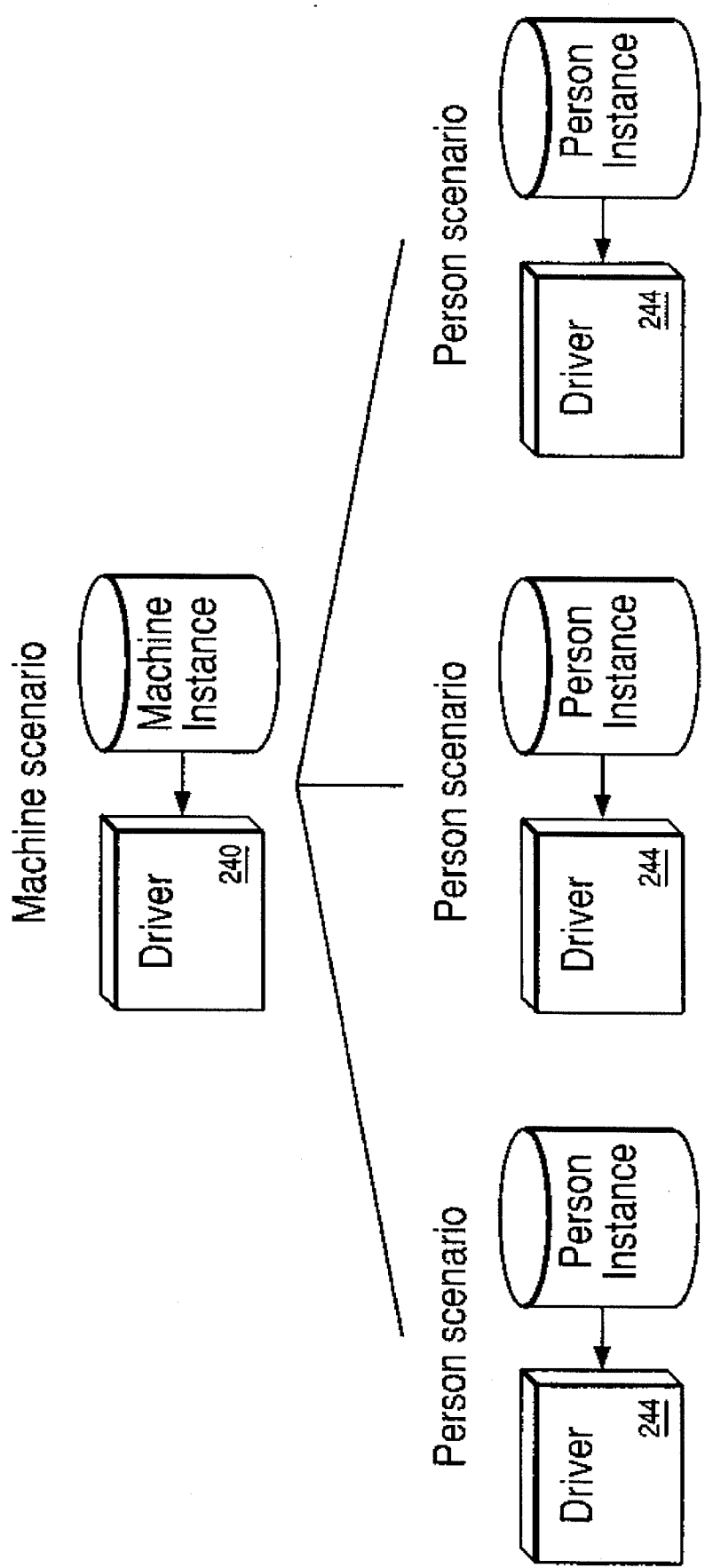
FIG. 17 depicts an intermediate hierarchical level, the machine scenario, of the testing scaffold.

Referring now to FIG. 17, the machine scenario driver 240 (also item 12 of block 20 in FIG. 1) is used when it is appropriate to control the execution of multiple person scenarios 244 on a host automatically. The machine scenario driver allows the grouping of information into machine scenarios so status can be tracked at that level, and a determination about the success rate of "machine scenarios" can be made.

Person Scenario Driver

Figure 18:
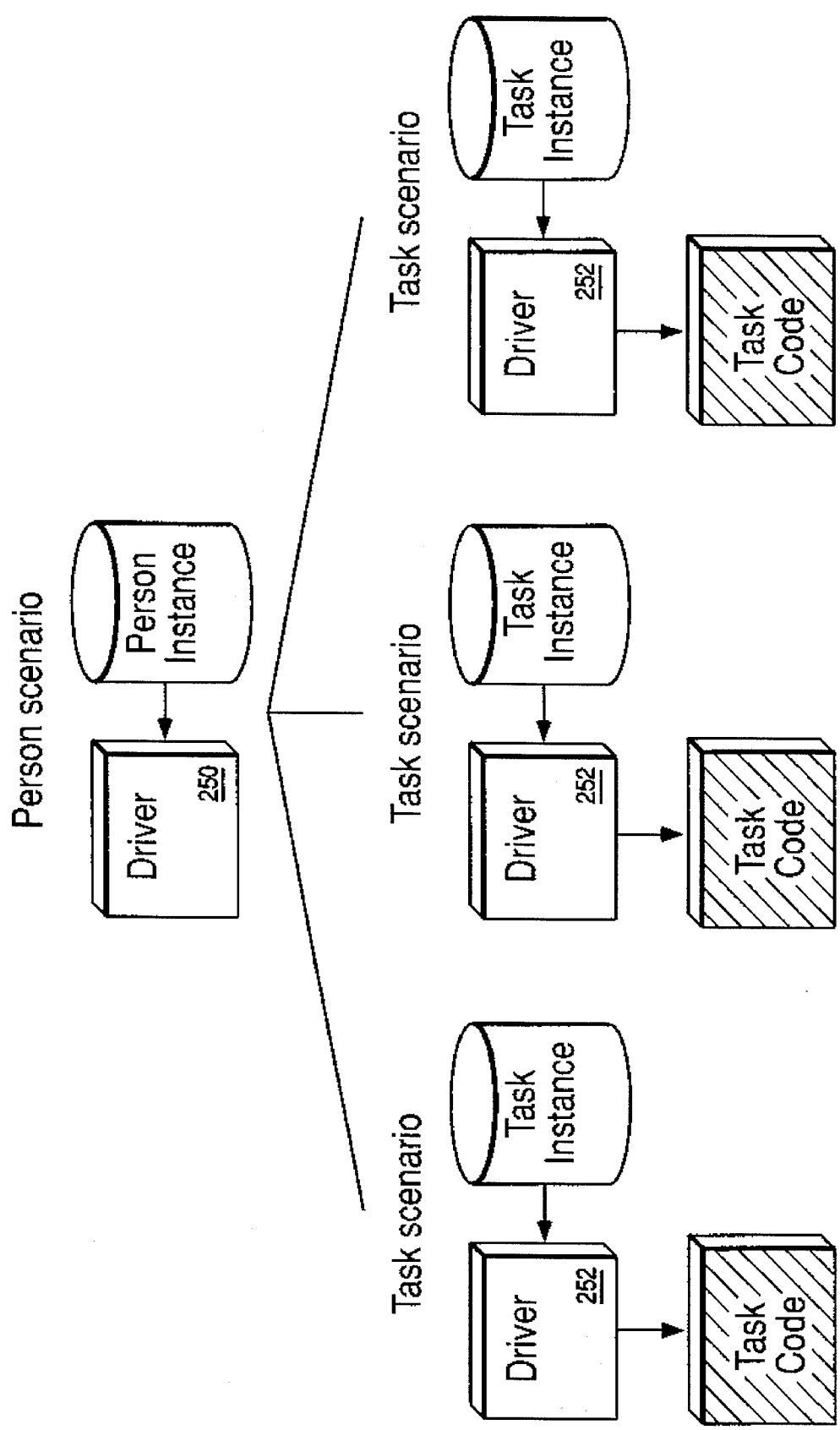
FIG. 18 depicts a second intermediate level, the person scenario, of the testing scaffold.

Referring to FIG. 18, the person scenario driver 250 is used when it is appropriate to control the execution of multiple task scenarios 252 on a machine automatically. The person scenario driver also allows the grouping of tasks into a person like scenario so status can be tracked at that level, and a determination about the success rate of "person scenarios" can be made.

A person scenario driver performs an additional step if the user configuration attribute has a value. In this situation, the person scenario driver simulates a "login" into the user account specified by the value of the user configuration attribute. This allows all the tasks that run below the person scenario driver level to actually be running as the user specified at the person level. If changing user's, the driver requires root privilege to execute. If a user is specified by the reserved attribute aususer in the person instance, that user id must exist on the system. The person scenario driver does not automatically add that user to the system.

Task Scenario Driver

Figure 19:
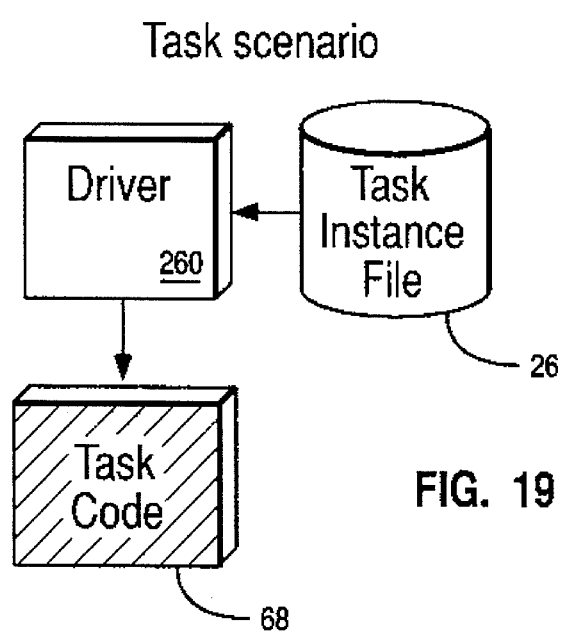
FIG. 19 depicts the bottom level, the task scenario, of the testing scaffold.

As shown in FIG. 19, the task scenario driver 260 is used to execute user task code 68. It allows much of the function typically performed by the scenario developer in user task code to be handled automatically. For instance, there is no sense in coming up with another way to loop, another way to journalize, or another way to create a unique working space, the task scenario driver inherently handles all of these design details, and thus allows the user's code to concentrate solely on "testing."

Figure 20:
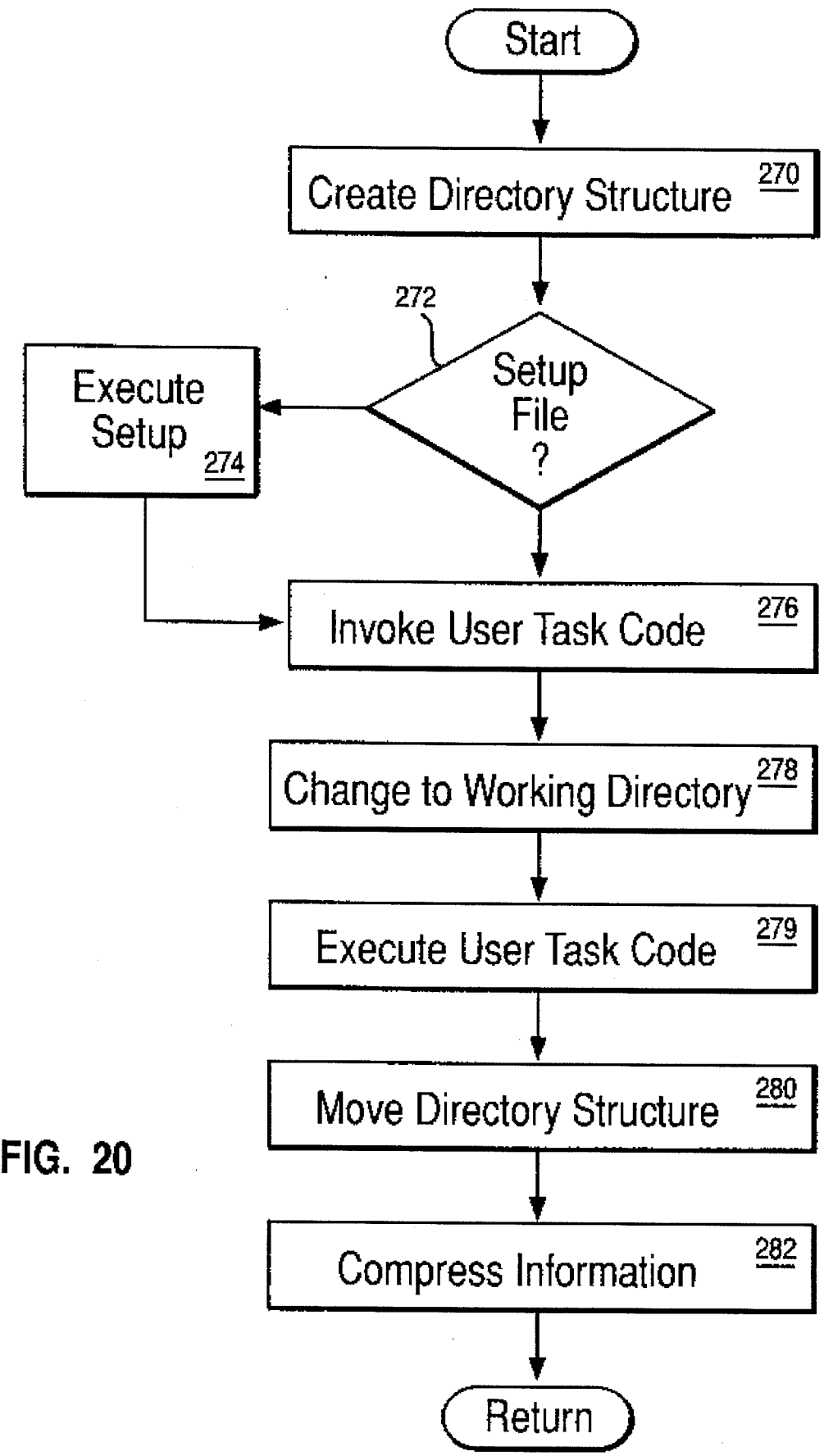
FIG. 20 depicts the task driver flow of operation.

When the task driver begins executing the user task code, it performs several steps that differ from the other scenario drivers, as shown in FIG. 20. One of the major differences is that the task creates a unique directory structure 270 under which it performs all of its work. This directory structure is created using the task name, the name of the host it is executing on, its process id number, and the task's iteration. It is found under the scenario directory structure's directory named working. Beneath this task directory, three more directories are created, the bin, jour, and work (see, e.g. FIG. 8A).

Prior to executing the task code, the task driver checks at 272 for the existence of the setup file in the user's bin directory. If it exists, the task scenario driver executes it at 274. This program must return a return code of zero for the task driver to continue execution.

When the user task code is invoked at 276, it is first looked for in the AUSBIN directory. If it is there, it is executed from that location, otherwise, the AUSCODEBIN directory is searched. If it is there, it is executed, otherwise, an error is issued.

Prior to executing the User task code at 279, the task scenario driver changes directories at 278 to the runtime task directory structure's work directory.

Once the user task code has completed, the task driver moves the runtime task directory structure to the runtime scenario directories' pass or fail directory at 280 depending on whether the user task code passed or failed and the value of the aussave scenario driver attribute. The task scenario driver also compresses the information at 282 in the work and pass directory depending on the value of the auscompress scenario driver attribute.

Journalizing

Figure 21:
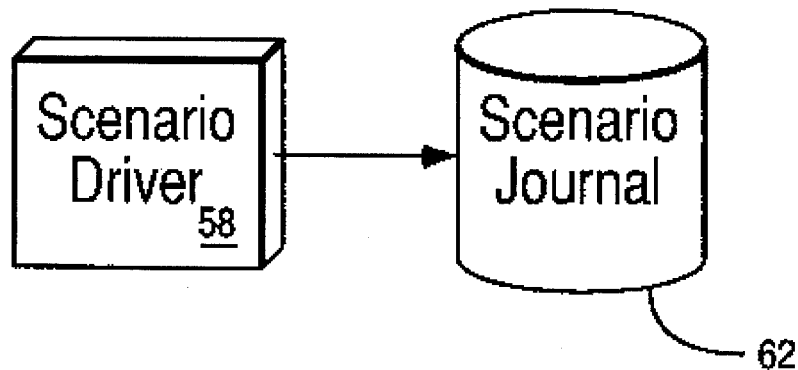
FIG. 21 depicts a scenario driver's interaction to create a scenario journal.

Referring to FIG. 21, the scenario driver 58 uses a set of six journal commands to journalize to the scenario journal 62. These commands are begin, log, warning, error, severe, and finish. All scenario drivers executing in the same scenario log to the same scenario journal file 62 in a distributed environment, otherwise, there is a scenario journal file for each machine which all the scenario drivers on that machine journalize to.

X-Windows Resource Customization

All valid xterm resources can be used to modify the way the xterms that the scenario driver executes in by prepending them with ausdriver_machine, ausdriver_person, and ausdriver_task. If these resources aren't used, the xterm resources used by the scenario driver for these three levels will be the default xterm resources in the .Xdefauits file.

EXAMPLE

The following are a sample set of resources used to control the machine, person, and task scenario driver xterms when running in X=Windows with the windows configuration attribute set to true.

TABLE 30

| # Scenario Driver Resources |
|---|
| ausdriver_machine.background: navy |
| ausdriver_machine.foreground: white |
| ausdriver_machine.iconStartup: false |
| ausdriver_machine.pointerColor: yellow |
| ausdriver_machine.font: rom8.500 |
| ausdriver_machine.geometry: 80 × 25 |
| ausdriver_machine.scrollBar: true |

TABLE 30-continued

| # Scenario Driver Resources |
|---|
| ausdriver_person.background: red |
| ausdriver_person.foreground: white |
| ausdriver_person.pointerColor: yellow |
| ausdriver_person.font: rom8.500 |
| ausdriver_person.iconStartup: false |
| ausdriver_person.scrollBar: true |
| ausdriver_task.background: green |
| ausdriver_task.foreground: navy |
| ausdriver_task.pointerColor: yellow |
| ausdriver_task.font: rom14.500 |
| ausdriver_task.iconStartup: false |
| ausdriver_task.scrollBar: true |

Scenario Journal

Figure 22:
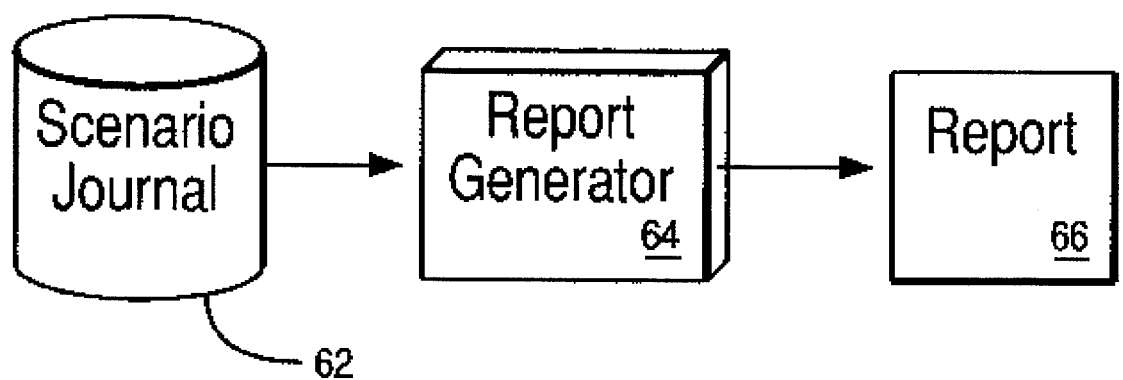
FIG. 22 shows a scenario journal's interaction to create a report.

The scenario journal file 62 of FIG. 22 is an ASCII text file. In environments that are executing with a distributed runtime file space, this file only exists on the environment server, and all scenario drivers journalize to it. In a non-distributed environment, there is one scenario journal for each machine in the environment and all the drivers executing on a single machine journalize to their respective scenario journal.

Format

There are two different record types in a scenario journal file—(i) those produced by the journalizing functions begin, log, warning, error, and severe, and (ii) those produced by the scenario driver finish function. The following is the format of the record written by the first five commands:

TABLE 31

| Field | Description |
|---|---|
| 1 | First character of journal command (b, 1, w, e, or s). |
| 2 | Current date in the format YYMMDD. |
| 3 | Current time in the format HHMMSS. |
| 4 | Current host name (same as the hostname command). |
| 5 | Current user (from the $LOGNAME environment variable). |
| 6 | Environment scenario instance name. |
| 7 | Environment scenario iteration count. |
| 8 | Machine scenario instance name. |
| 9 | Machine scenario iteration count. |
| 10 | Person scenario instance name. |
| 11 | Person scenario iteration count. |
| 12 | Task scenario instance name. |
| 13 | Task scenario iteration count. |
| 14 | Text string from the journal command. |

The only difference with the finish function record is that there is another field between fields 13 and 14 above that is the return code of the object that finished.

Each of the fields is separated by the character '|' (the pipe character) There is no pipe character before the first field or following the last field.

EXAMPLE

FIG. 23 depicts an example of a scenario that was produced by running the machine scenario denoted by the file claussen.m.1 300. This machine scenario then executed one person scenario, shane.p.1 302, and that person scenario executed two task scenarios, shane.t.1 304, and shane2.t.1 308, both of which failed at 306 and 310, respectively. Thus, the person scenario and machine scenario also failed at 312 and 314, respectively. The only journal entries for this particular example are begins and finishes because of the verbosity level.

Based on this standard format, a general purpose report generator 64 (FIG. 22) can be used, independent of the actual test cases being run, to generate reports 66 (FIG. 22).

User Code Interfaces

The API 70 of FIG. 2 provides an interface between a scenario driver 58 and user code 68. This interface is not a traditional API, or application programming interface, but rather is a set of system variables. These system variables are set by the scenario driver prior to invoking user task code. The user task code can access these variables to determine the state of, or environment, of the system. The following environment variables are provided for use by user code.

AUSCODEDIR

The AUSCODEDIR directory structure is the top level structure at which the user's task code should be located. For example, for the task admin1, this directory structure by default would be /austin/tasks/a/admin1. The default location of this structure can be changed with the instance attribute auscodedir.

AUSCODESRC

The AUSCODESRC directory is the location of the user's task src directory under the AUSCODEDIR directory, It can be used to reference files in this structure at runtime.

AUSCODEBIN

The AUSCODEBIN directory is the location of the user's task bin directory under the AUSCODEDIR directory. It can be used to reference files in this structure at runtime.

AUSCODEDAT

The AUSCODEDAT directory is the location of the user's task dat directory under the AUSCODEDIR directory. It can be used to reference files in this structure at runtime.

AUSCODEDOC

The AUSCODEDOC directory is the location of the user's task doc directory under the AUSCODEDIR directory, It can be used to reference files in this structure at runtime.

AUSBIN

The AUSBIN directory structure is a structure that the driver creates automatically at runtime. The purpose of this directory is to allow a locate on for any source code compilation that needs to be done at runtime since the /austin/tasks directory structure will be read only at runtime, This environment variable is usually used in the task setup program,

AUSLIB

The AUSLIB directory is the location of the libaus.a library used to link into C programs, It can be used in the task setup code or the task code itself.

AUSPASS

The AUSPASS variable points to the scenario's archival directory structure for tasks that have passed.

AUSFAIL

The AUSFAIL variable points to the scenario's archival directory structure for tasks that have failed.

AUSWORKING

The AUSWORKING variable points to the scenario's working directory structure which contains all tasks in progress.

AUSSCENARIO

The AUSSCENARIO variable points to the scenario's top level directory structure which contains the scenario journal file(s).

AUSTASK

The AUSTASK variable holds the name of the current task scenario being executed.

AUSPERSON

The AUSPERSON variable holds the name of the current person scenario being executed.

AUSMACHINE

The AUSMACHINE variable holds the name of the current machine scenario being executed.

AUSENVIRONMENT

The AUSENVIRONMENT variable holds the name of the current environment scenario being executed.

AUSTPHIDIR

The AUSTPHIDIR variable points to the top of task runtime directory structure that the task driver will create at runtime.

AUSWORK

The AUSWORK variable points to the work directory within the task runtime directory (AUSTPHIDIR). This is the directory that the task is place in at execution time.

AUSJOURNAL

The AUSJOURNAL variable holds the name of the scenario journal file. This variable should not be modified.

Journal Programming Interface

A standard journalizing programming interface 74 (FIG. 2) exists for task developers. This journalizing interface consists of four commands that have both C and shell bindings. These journalizing commands produce a standardized journal 72. The advantage of a standardized journal is the ability to have a set of enhanced reporting filters that can analyze its contents. It should be noted that the scenario journal 62 has the same internal format as the task journal 72. This scenario journal also has the same API as provided at the task journal 72, albeit used only by the scenario driver 58 as opposed to a user task.

The standard journalizing programming interface consists of the following commands:
auslog
auswarning
auserror
aussevere C Language Bindings The following is the syntax of the C language journal functions:

void auslog( char *Format [,Value, . . . ]);

void auswarning( char *Format [,Value, . . . ]);

void auserror( char *Format [,Value, . . . ]);

void aussevere( char *Format [,Value, . . . ]);

The syntax of these commands is similar to that of the printf() system call. You may pass each of these routines a variable number of arguments, which will be evaluated in the routine. For example, you may call auslog() in the following manner.

auslog( "Calling function %s at %d.", function_name, time );

If the task code is written in the C language, it can gain access to these journalizing functions by linking with the library/austin/tools/rslib/libaus.a.

Shell Language Bindings

The following is the shell language bindings for the journalizing commands:

auslog <string>
auswarning <string>
auserror <string>
aussevere <string>

To use these functions, the tools bin directory should be in the system path using the PATH environment variable (i.e. PATH=$PATH:/austin/tools/rsbin).

Description

The following is a brief description of the intended use of each of the four journalizing commands:

auslog

The auslog command is provided to enable the task code to make a journal entry that does not signify an error conditions. The auslog command will primarily be used as a debugging aid to enable a trace of actions being performed during task execution.

auswarning

The auswarning command is provided to enable the task code to make a journal entry that indicates an error condition that is not severe enough to cause the entire task to fail. The auswarning command will primarily be used to indicate an unexpected result, but one not significant enough to warrant failure.

auserror

The auserror command is provided to enable the task code to make a journal entry that indicates any error condition that will cause the executing task code to fail. The auserror command should be used to indicate an unexpected result the magnitude of which should cause the task to fail, but should not halt the continued execution of the task.

aussevere

The aussevere command is provided to enable the task code to make a journal entry that indicates an error condition that will cause the executing task code to fail. The aussevere command should be used to indicate an unexpected result the magnitude of which should cause the task to fail and should halt the execution of the task. An exit or return command would be typical following a aussevere command in the task code.

Begin and End Hooks

The begin and end hooks are executed by the driver. They have access to user code journal programming interface 74 of FIG. 1. The journal entries for the begin and end hooks are logged to the scenario journal file instead of the task journal file. This is the only user code that journalizes to the scenario journal 62 instead of the task journal 72. Note that the verbose level effects scenario journal entries different than it effects task journal entries.

The driver uses the value returned by the begin and end hook scripts to determine whether it should proceed or not. If the value is anything other than zero, the driver halts execution.

The begin and end hooks at the machine scenario driver level can be used to begin and halt the execution of scripts that can be used to monitor the system resources of the particular host during the executing of the machine scenario as well as other specific setup and cleanup items that are specific to the particular machine scenario. The begin and end hooks at the machine scenario level are also a good place to do specific task setup steps for tasks that can execute as any user but require some minimal root user authority to perform some setup and cleanup. This is because the machine scenario driver will normally be running with root authority and the task scenario driver probably will not.

Tasks

The user's task code may use the four user code journal programming commands and log to the standard task journal as described above. The environment variables previously described are available for locating any files that the task code will need to manipulate. It is mandatory that the task code return a return code to the task driver indicating whether it passed or failed. A value of zero indicates success, any other value indicates failure. The task driver then journalizes this pass or fail value to the scenario journal.

The task setup code acts very similar to the actual task code with respect to its interfaces. The task code has access to the journal programming interface detailed above. The journal entries for the task setup code are logged to the task journal.

If the task code is in source format at runtime, the purpose of the task setup code is to compile that source code and place it in the runtime directory structure for binary compiled source code represented by the environment variable AUSBIN.

The syntax of the setup file is the name of the task followed by the string ".setup". It should be in the task's bin directory (denoted by the environment variable AUSCODEBIN). If this file exists when the task driver runs, it will automatically be executed prior to the execution of the task code.

The driver uses the value returned by the task setup code to determine whether it should proceed or not. If the value is anything other than zero, the driver does not execute the task code.

The task help file interface exists to enable on-line, softcopy, task help through the driver. To receive this type of help, the ausdriver command is executed with the 'h' command line flag and a task instance file. The instance file is used to determine the expected location of the task help file and it is then sent to stdout.

The syntax of the help file is the name of the task followed by the string ".help". It should be in the task's doc directory (denoted by the environment variable AUSCODEDOC). This file is just a simple ASCII file. It is usually a good idea to have a specific help file format but the information in this type of help file would be dependent upon the organization doing the testing.

Task Journal

The task journal file is an ASCII text file. There is one task journal file associated with each instance of a task that executes in a test scenario during the scenario execution stage.

All entries in the task journal file have the same record format and are produced by the four task journalizing commands, auslog, auswarning, auserror, and aussevere. The format of the fields of the task journal follow:

TABLE 32

| Field | Description |
| --- | --- |
| 1 | First character of journal command (b, 1, w, e, or s). |
| 2 | Current date in the format YYMMDD. |
| 3 | Current time in the format HHMMSS. |
| 4 | Current host name (same as the hostname |

TABLE 32-continued

| Field | Description |
|---|---|
| | command). |
| 5 | Current user (from the $LOGNAME environment variable). |
| 6 | Environment scenario instance name. |
| 7 | Environment scenario iteration count. |
| 8 | Machine scenario instance name. |
| 9 | Machine scenario iteration count. |
| 10 | Person scenario instance name. |
| 11 | Person scenario iteration count. |
| 12 | Task scenario instance name. |
| 13 | Task scenario iteration count. |
| 14 | Text string from the journal command. |

Each of the fields is separated by the character '!' (the pipe character). There is no pipe character before the first field or following the last field.

FIG. 24 shows an example of what a task journal file would look like. This is the output from the task shane.t.1 that was run in the scenario journal file example from Section 8.2. The verbosity level was set to 7 when the task was run.

Report Filter

The report filter 64 gives a simple synopsis of the scenario at the different levels. The user may specify which level they would like the report generator to summarize. The information reported at 66 is the number of times that each particular item at the level specified has passed, how many times it failed, and a non-weighted percentage of success. The report generator 64 will report the same two tasks that run under different person scenarios as different tasks. This philosophy is carried out at each level. This implementation of the report generator will be useful to get a high-level feeling for how a scenario is executes one task 99 times which passed on all 99 doing, but will not weight percentages based on number of executions. For example, if a person scenario executes one task 99 times which passed on all 99 attempts, and another task that only executed once and failed, the person scenario would be marked as 0% successful, not 99%. Because of the non-weighting reporting currently, it is recommended that the report generator only be used at the task level, where there is no weighting necessary.

TABLE 33

| Usage |
|---|
| Usage: ausreport [ -t ! -p ! -m ! -e ] journal_file |
| -t, run the report on the task level. This is the default. |
| -p, run the report on the person level |
| -m, run the report on the machine level |

TABLE 34

| $ ausreport -t scen.journal | | | | |
|---|---|---|---|---|
| Task | Person | Machine | Environment | Pass Fail % |
| try1.t.2 | pers.p.1 | 1 | 0 | 100% |
| try2.t.1 | pers.p.1 | 2 | 1 | 67% |

This report was generated after a person scenario was run. This particular person scenario, pers.p.1, is comprised of two task instances, try1.t.2 and try2.t.1. Try2.t.1 was told to loop three times, and the try1.t.2 was told to only loop once. Verbosity was set to 0 for this scenario to decrease the size of the scenario journal file. FIG. 25 shows the scenario journal file that would be created at the runtime of this scenario.

Utilities

The pk Utility

The AIX utility pk is used to compress directory structures into a single file. The usage syntax follows:

Usage: pk<directory>

Figure 26:
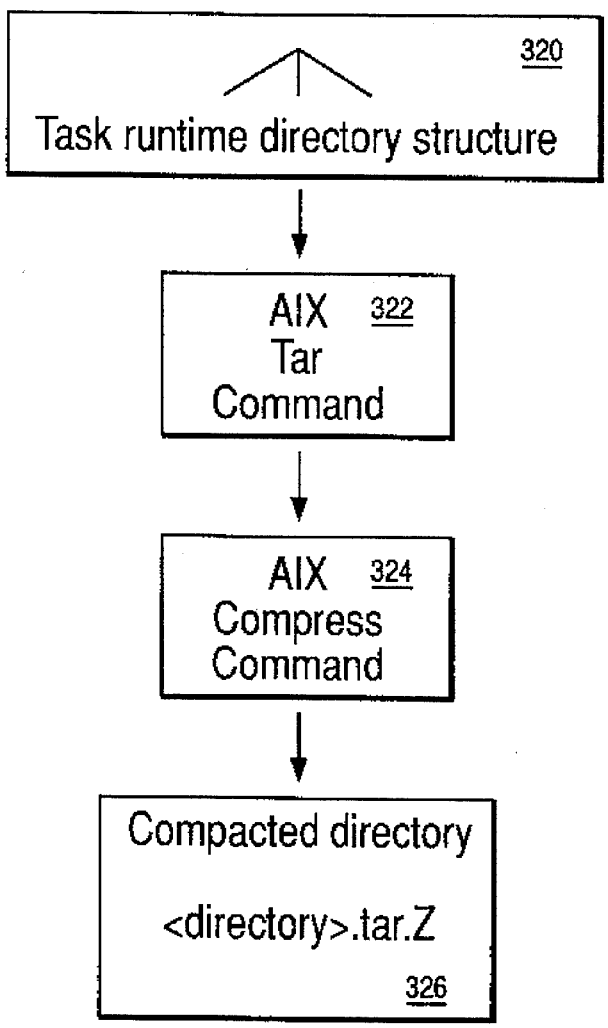
FIG. 26 shows the control flow for a pack (pk) command.

As shown in FIG. 26, the pk command will result in the directory structure 320 denoted by <directory> to be processed by the AIX tar 322 and compress 324 commands. This process will result in the all the files in the directory structure being combined into a single file and then that file being compressed. To denote that the file has been created by the pk command, it will be given the extension .tar.Z 326.

The main purpose of the pk command is to allow compression of the task scenario directory structures in the pass and fail directories of the scenario directory structure. The pk utility results in a more optimal storage mechanism with respect to system disk resources.

Sample Post-Execution Scenario Directory Structure

FIG. 10B shows a sample directory structure created from the execution of the environment scenario named engineering.e.1. This example demonstrates how to compress the rcp.t.2 task scenario directory structures in the scenario's pass directory.

TABLE 35

| |
|---|
| $ cd /austin/runtime/engineering.e.1.910311.11055/pass |
| $ pk rcp.t.2.* |

The pk command would result in the compression of the directory structures rcp.t.2.claussen.888.1. The old directory name would be changed to a file name, with the .tar.Z file name extension indicating that they have been packed with the pk command. One thing to notice about this FIG. 10B is that the rcp.t.1.claussen.999.1.tar.Z file 184 in the pass directory has already been through the pk process. This is because the rcp.t.1t.t.1 instance file instructed the task driver to compress it automatically following its execution if it passed. The new directory structure is depicted at 187 in FIG. 10C.

The unpk Utility

The utility unpk is used to uncompress files that have been through the pk process. The usage syntax follows:

Usage: unpk<packed_file_name>

Figure 27:
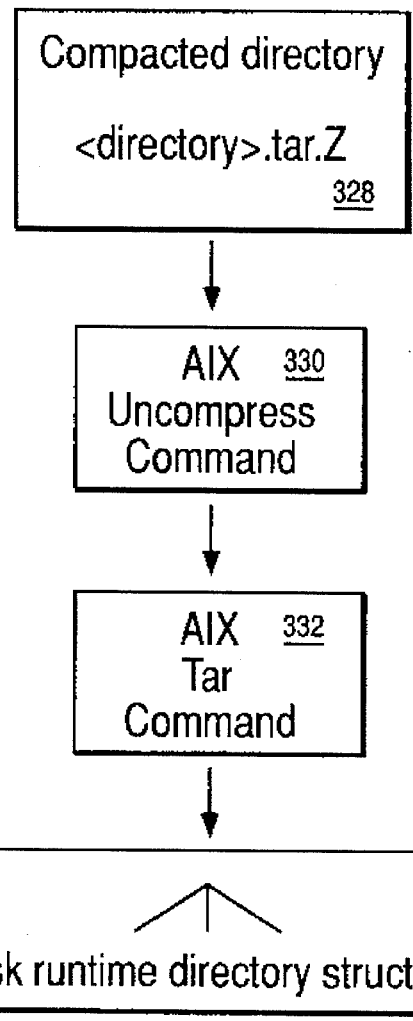
FIG. 27 shows the control flow for an unpack (unpk) command.

As shown in FIG. 27, the unpk command will result in the file name 328 denoted by <packed_file_name>to be run through the AIX uncompress 330 and tar 332 commands. This process will result in the file being uncompressed and then untarred producing a directory structure 334. The name of the directory structure 334 will be the name of the file name denoted by <packed_file_name> without the .tar.Z extension.

Figure 10C:
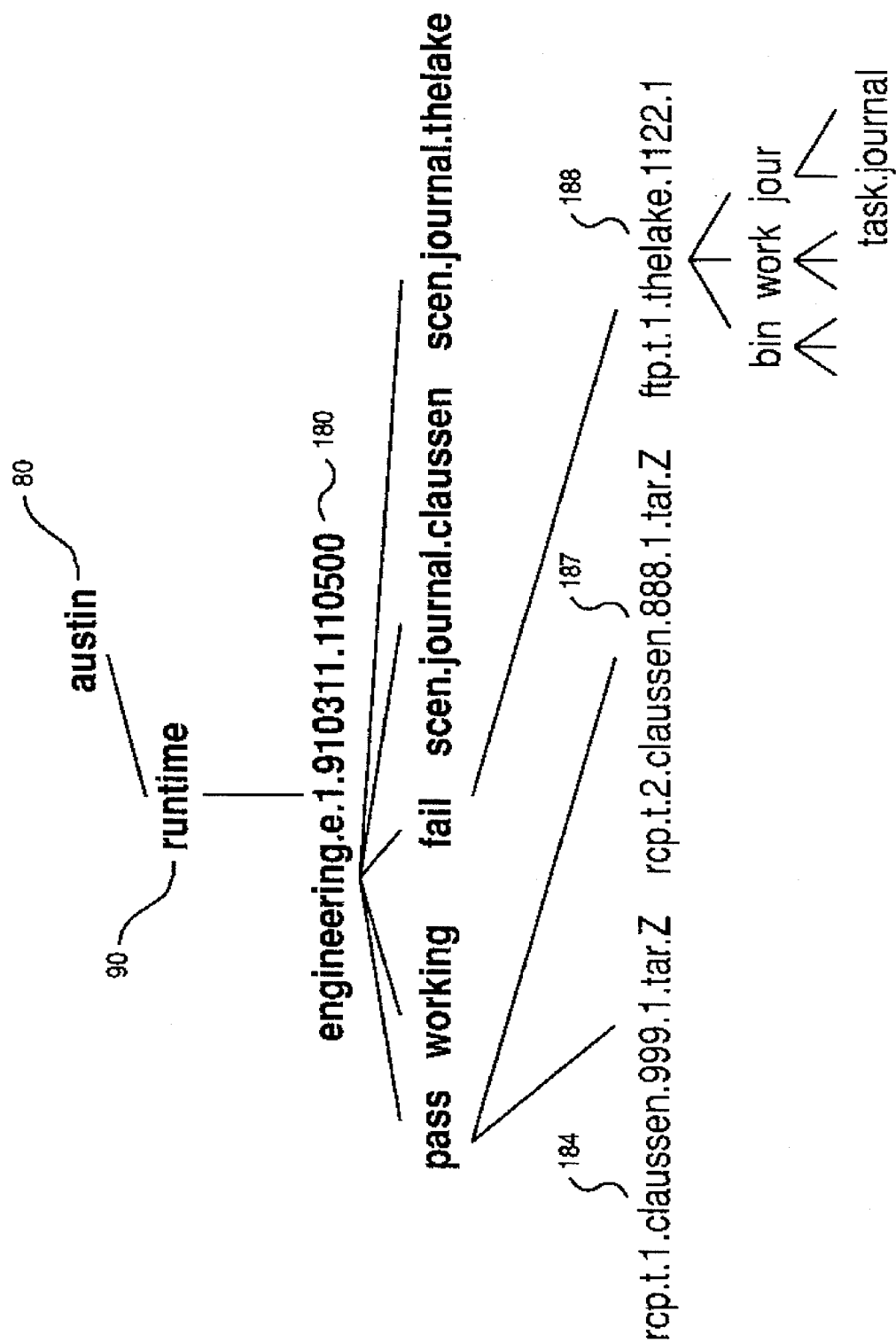

The main purpose of the unpk command is to unpack the information that has been previously packed, such as depicted in FIG. 10C, so that it can be examined. For instance, if a driver automatically packs a task directory structure that needs to be examined, the unpk command can be used to unpack it back to its normal size and structure.

Sample Post-Execution Scenario Directory Structure

This example illustrates the unpacking of one of the packed files in the scenario structure's pass directory.

TABLE 36

```
$ cd
/austin/runtime/engineering.e.1.910311.110500/pass
$ unpk *999*
```

Figure 10D:
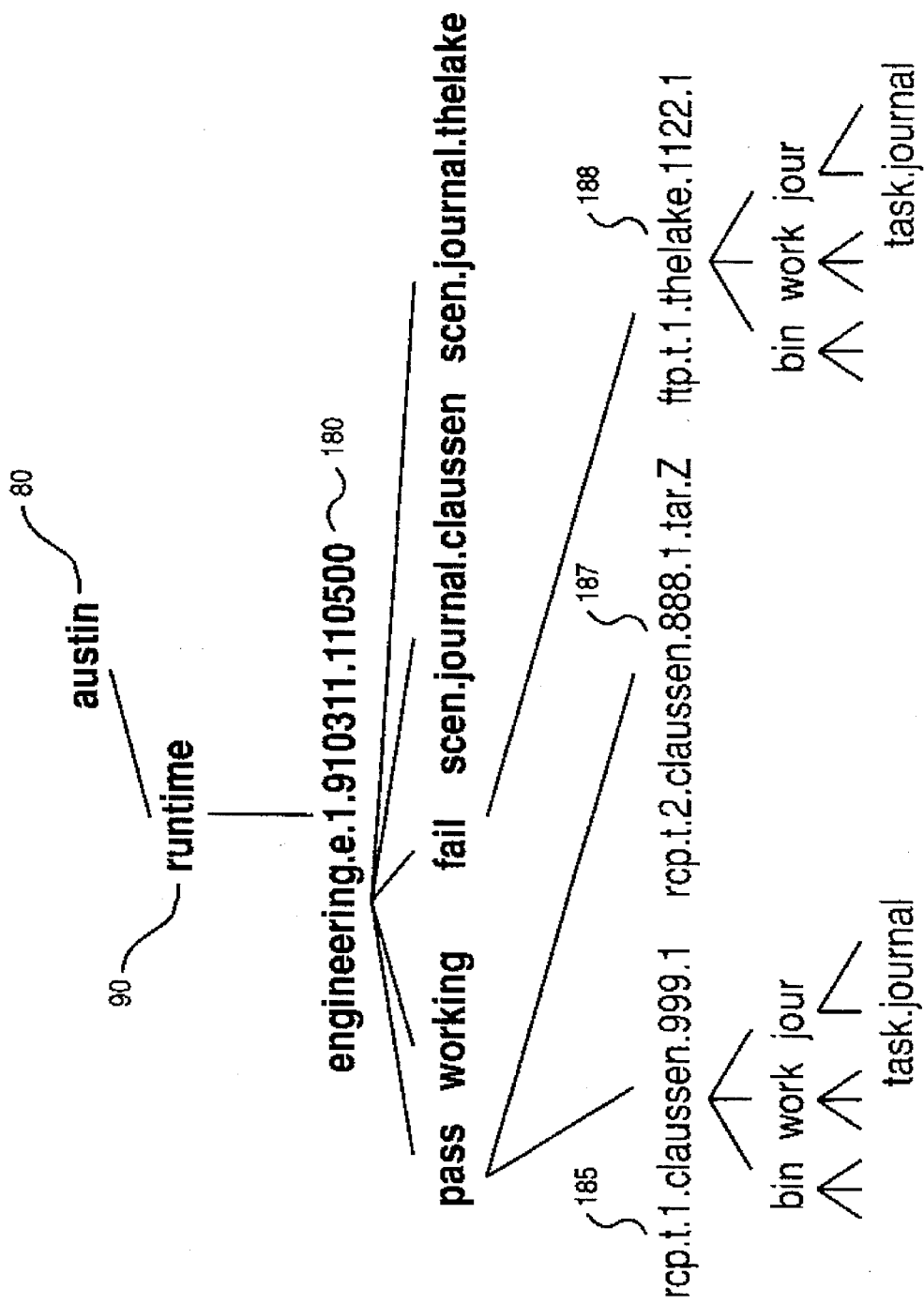

This unpk command causes the rcp.t.1.claussen.999.1 directory structure 184 of FIG. 10C to be restored. FIG. 10D depicts the structure 185 after the unpk command has finished.

The ausstat Utility

The ausstat utility returns the number of auserror and aussevere journal records that it found in the standard task journal. The main purpose of this utility is to assist task developers in determining their failure rate.

Since it is mandatory that the user task code pass a return code to the task driver, the ausstat command can be used at the end of the user task code for this purpose.

Note that precaution must be used if ausstat is to be used for this purpose since it counts every auserror and aussevere record in the journal file. If you want the number found by ausstat to be representative of the actual number of errors found, do not use two auserror commands to describe one error. If more than one line is necessary to describe an error, use an auserror or aussevere followed by one or more auslogs.

C Language Interface

The following is the ANSI C prototype definition for the C Language interface to the ausstat function:

int ausstat( void );

User task code can access the ausstat function by linking with the library /austin/tools/lib/libaus.a.

EXAMPLE

The following example shows how the ausstat command can be used in a sample task written in the C Language. The following code is a section out of a user's task code that uses the standard journal commands and then ausstat to return the number of errors and severe errors journalized to the task scenario driver.

TABLE 37

```
main( ) {
    auslog( "Doing test 1." );
    if( test1( ) == SUCCESS )
        auslog( "Test 1 successful." );
    else
        auserror( "Test 1 failed." );
    auslog( "Doing test 2." );
    if( test2( ) == SUCCESS )
        auslog( "Test 2 successful." );
    else {
        aussevere( "Test 2 failed, rest of tests are
            dependent." );
        auslog( "There was a total of %d error(s).",
            ausstat( ) );
        exit( ausstat( ) );
    }
    auslog( "Doing test 3." );
    if( test3( ) == SUCCESS )
        auslog( "Test 3 successful." );
```

TABLE 37-continued

```
    else
        auserror( "Test 3 failed." );
    auslog( "Exiting user task code." );
    auslog( "There was a total of %d error(s).",
        ausstat( ) );
    exit( ausstat( ) );
}
```

The following figure is a matrix representing the possible combinations of success or failure for the three test functions (test1(), test2(), and test3()) in the source code above. The value of the fourth column is the return code of the entire task which is calculated by ausstat.

TABLE 38

| test1( ) | test2( ) | test3( ) | Return Code |
|---|---|---|---|
| Pass | Pass | Pass | 0 |
| Pass | Pass | Fail | 1 |
| Pass | Fail | * | 1 |
| Fail | Pass | Pass | 1 |
| Fail | Pass | Fail | 2 |
| Fail | Fail | * | 1 |

*Did not get executed because test case aborted do to prior failure.

Shell Language Interface

The shell script interface of the ausstat command is used simply by issuing the ausstat command. The ausstat shell interfaces returns the number of auserror or aussevere journal entries in two ways, by echoing the value to stdout, and by setting its return code to the proper value.

EXAMPLE

The following example is the shell Language equivalent of the code in the example above.

TABLE 39

```
auslog "Doing test 1."
test1
if [ "$?" = "0" ]; then
    auslog "Test 1 successful."
else
    auserror "Test 1 failed."
fi
auslog "Doing test 2."
test2
if [ "$?" = "0" ]; then
    auslog "Test 2 successful."
else
    aussevere "Test 2 failed, rest of tests are
        dependent."
    auslog "There was a total of 'ausstat' error(s)."
    exit 'ausstat'
fi
auslog "Doing test 3."
test3
if [ "$?" = "0" ]; then
    auslog "Test 3 successful."
else
    auserror "Test 3 failed."
fi
auslog "Exiting user task code."
auslog "There was a total of 'ausstat' error(s)."
exit 'ausstat'
```

Notice that the line following the aussevere is an auslog, not another aussevere. If it were another aussevere, then the task would exit with a value of 2 (assuming test1 passed)

instead of one since ausstat just counts journal records, not actual problems.

Figure 33:
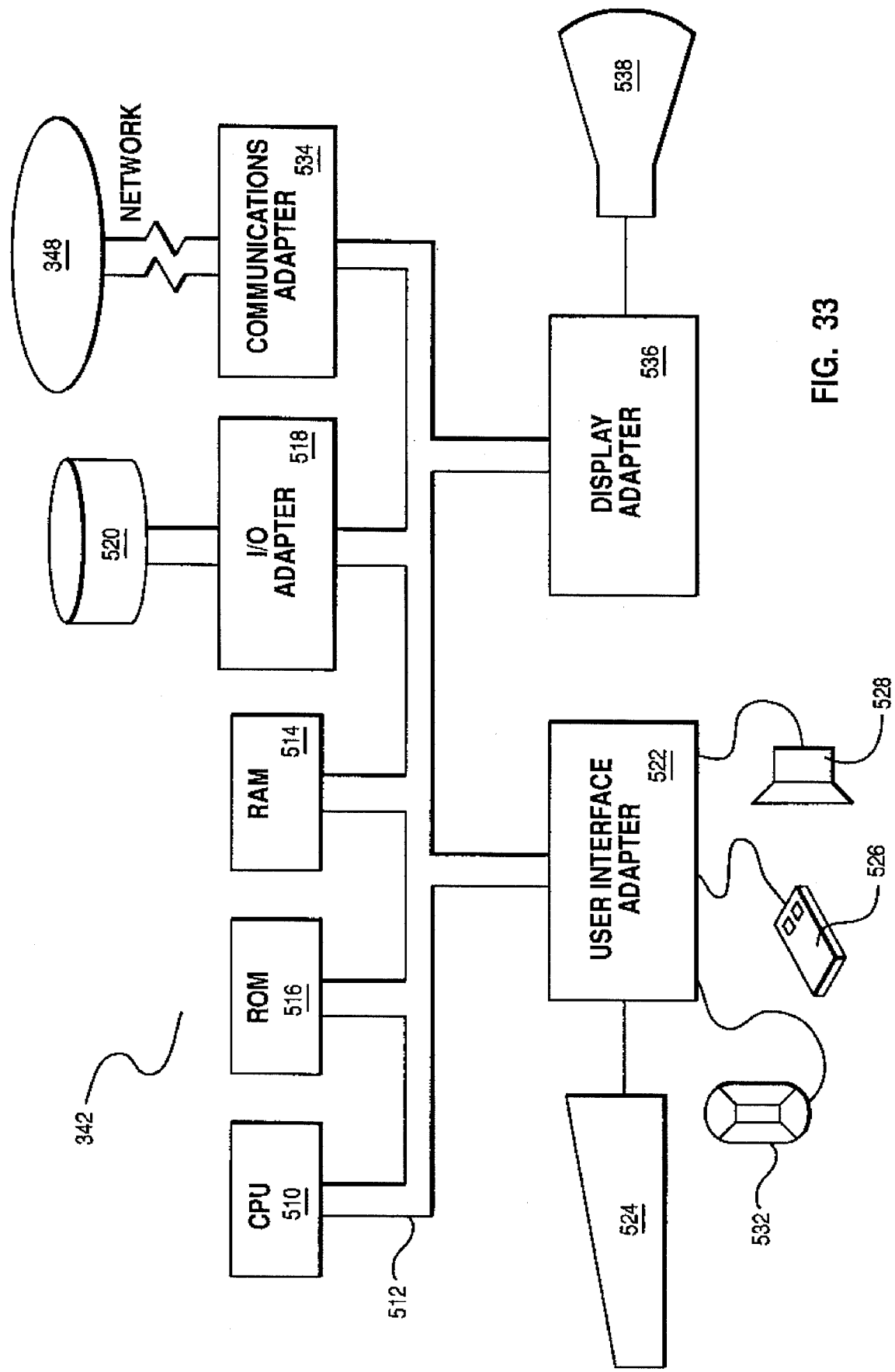
FIG. 33 shows a typical data processing computer.

Finally, FIG. 33 depicts the preferred embodiment of a data processing system 342 used in this multi-computer data processing system. A central processing unit (CPU) 510 is coupled via bus 512 to a read only memory (ROM) 516, a random access memory (RAM) 514, an input/output (I/O) adapter 518, a communication adapter 534, a user interface adapter 522, and a display adapter 536. The I/O adapter 518 allows for interfacing the bus 512 to various input/output devices, such as a non-volatile mass storage device 520 for storing data (e.g. a direct access storage device (DASD), tape, holographic storage, cartridge, etc.). The communications adapter 534 allows for providing a data flow from CPU 510, in conjunction with bus 512, to a communication network 348. The display adapter 536 allows for displaying data or other information on a display device 538. The user interface adapter 522 allows for controlling various user (person) input/output devices, such as a keyboard 524, mouse or pointing device 532, keypad 526, or speaker 528.

This data processing system 342 provides for interprocess communications as previously described, and can further be used in multi-computer data processing system as depicted in FIG. 28.

While the invention has been shown and described with reference to particular embodiments thereof, it will be understood by those skilled in the art that the foregoing and other changes in form and detail may be made therein without departing from the spirit and scope of the invention.

We claim:

1. A computer implemented method for allowing a plurality of computer child processes, each initiated by one of a plurality of computer parent processes, to participate in a single system semantic across a distributed data processing system having a plurality of machines, wherein at least one child process is initiated by a parent process executing on a remote machine, each machine executing a control daemon, comprising the steps of:

requesting registration by each local process with a corresponding local control daemon executing on the machine where the requesting process will be executing;

generating and recording in local memory by each local control daemon a handle for each process requesting registration;

determining by each local control daemon if each process requesting registration has a remote parent process;

if a first child process requesting registration with a first control daemon has a parent process executing on a remote machine with a remote control daemon, recording in memory by the first control daemon the handle assigned by the remote control daemon for the parent process and the remote machine executing the parent process;

if the first child process has a remote parent process, recording in memory the local control daemon as a local parent process of the first child process; and if the first process has a remote parent process, recording in remote memory by the remote control daemon the handle assigned by the first control daemon for the first child process and the machine executing the first child process.

\* \* \* \* \*